(12) United States Patent
Osai et al.

(10) Patent No.: US 11,630,194 B2
(45) Date of Patent: Apr. 18, 2023

(54) POSITION DETERMINATION SYSTEM

(71) Applicants: DENSO CORPORATION, Kariya (JP); SOKEN, INC., Nisshin (JP)

(72) Inventors: Hidenori Osai, Nisshin (JP); Kenichiro Sanji, Nisshin (JP); Taichi Yamaguchi, Kariya (JP); Kazunari Nakamura, Kariya (JP); Munenori Matsumoto, Kariya (JP); Takashi Shinoda, Kariya (JP)

(73) Assignees: DENSO CORPORATION, Kariya (JP); SOKEN, INC., Nisshin (JP)

( * ) Notice: Subject to any disclaimer, the term of this patent is extended or adjusted under 35 U.S.C. 154(b) by 422 days.

(21) Appl. No.: 16/843,719

(22) Filed: Apr. 8, 2020

(65) Prior Publication Data

US 2020/0233072 A1  Jul. 23, 2020

Related U.S. Application Data

(63) Continuation of application No. PCT/JP2018/026565, filed on Jul. 13, 2018.

(30) Foreign Application Priority Data

Oct. 19, 2017 (JP) .............................. JP2017-202734
Mar. 15, 2018 (JP) .............................. JP2018-048409

(51) Int. Cl.
*H04N 5/44* (2011.01)
*G01S 11/06* (2006.01)
(Continued)

(52) U.S. Cl.
CPC .............. *G01S 11/06* (2013.01); *B60R 25/10* (2013.01); *G07C 9/00309* (2013.01); *H01Q 1/3283* (2013.01); *G07C 2209/63* (2013.01)

(58) Field of Classification Search
CPC ....... G01S 11/06; B60R 25/10; B60R 25/245; G07C 9/00309; G07C 2209/63;
(Continued)

(56) References Cited

U.S. PATENT DOCUMENTS 9,894,492 B1\* 2/2018 Elangovan .............. H04W 4/40
10,471,931 B2\* 11/2019 Naitou .................. B60R 25/245
(Continued)

FOREIGN PATENT DOCUMENTS

| JP | 2005-213815 A | 8/2005 |
| JP | 2006104859 A | 4/2006 |

(Continued)

*Primary Examiner* — Munear T Akki
(74) *Attorney, Agent, or Firm* — Harness, Dickey & Pierce, P.L.C.

(57) ABSTRACT

A position determination system a determines whether a mobile terminal is present outside a vehicle compartment based on a reception strength of a radio signal transmitted from the mobile terminal through a vehicle interior antenna and a reception strength of a radio signal transmitted from the mobile terminal through a vehicle exterior antenna, and the vehicle exterior antenna is configured to be disposed in a predetermined region in a vicinity of a window of a vehicle in an outer surface portion of a vehicle.

27 Claims, 31 Drawing Sheets

(51) Int. Cl.
*B60R 25/10* (2013.01)
*H01Q 1/32* (2006.01)
*G07C 9/00* (2020.01)

(58) Field of Classification Search
CPC .............. H01Q 1/3283; G08C 2201/91; G08C 2201/93; G08C 17/02
See application file for complete search history.

(56) References Cited

U.S. PATENT DOCUMENTS

| | | | | |
|---|---|---|---|---|
| 2006/0273887 | A1* | 12/2006 | Yamamoto | B60R 25/33 340/426.36 |
| 2008/0048909 | A1* | 2/2008 | Ioffe | B60R 25/00 342/357.31 |
| 2009/0073049 | A1* | 3/2009 | Apostolos | H01Q 1/3275 343/700 MS |
| 2014/0308971 | A1* | 10/2014 | O'Brien | H04W 4/023 455/456.1 |
| 2015/0329081 | A1* | 11/2015 | Morita | H04B 17/318 701/2 |
| 2017/0200334 | A1 | 7/2017 | Buttolo et al. | |
| 2018/0316445 | A1 | 11/2018 | Hamada et al. | |
| 2019/0318563 | A1* | 10/2019 | Atsumi | B60R 25/25 |

FOREIGN PATENT DOCUMENTS

| | | |
|---|---|---|
| JP | 2007170162 A | 7/2007 |
| JP | 2008121256 A | 5/2008 |
| JP | 2009094767 A | 4/2009 |
| JP | 2012002031 A | 1/2012 |
| JP | 2012172334 A | 9/2012 |
| JP | 2014136894 A | 7/2014 |
| JP | 2015174482 A | 10/2015 |
| JP | 2015214316 A | 12/2015 |
| JP | 2015218501 A | 12/2015 |
| JP | 2016056667 A | 4/2016 |
| JP | 2016094801 A | 5/2016 |
| JP | 2016176782 A | 10/2016 |
| JP | 2017079430 A | 4/2017 |
| JP | 2017174338 A | 9/2017 |
| JP | 2017183835 A | 10/2017 |
| JP | 2018141771 A | 9/2018 |
| JP | 2019158765 A | 9/2019 |

* cited by examiner

POSITION DETERMINATION SYSTEM

CROSS REFERENCE TO RELATED APPLICATIONS

The present application is a continuation application of International Patent Application No. PCT/JP2018/026565 filed on Jul. 13, 2018, which designated the U.S. and claims the benefit of priority from Japanese Patent Application No. 2017-202734 filed on Oct. 19, 2017 and Japanese Patent Application No. 2018-048409 filed on Mar. 15, 2018. The entire disclosures of all of the above applications are incorporated herein by reference.

TECHNICAL FIELD

The present disclosure relates to a position determination system.

BACKGROUND

Conventionally, there has been known an in-vehicle device having a function as a position determination system for estimating a position of a mobile terminal with respect to a vehicle by performing a wireless communication with the mobile terminal carried.

SUMMARY

A position determination system according to one aspect of the present disclosure determines whether a mobile terminal is present outside a vehicle compartment based on a reception strength of a radio signal transmitted from the mobile terminal through a vehicle interior antenna and a reception strength of a radio signal transmitted from the mobile terminal through a vehicle exterior antenna, and the vehicle exterior antenna is configured to be disposed in a predetermined region in a vicinity of a window of a vehicle in an outer surface portion of a vehicle.

A position determination system according to another aspect of the present disclosure determines that a mobile terminal is present in a vehicle compartment based on a condition that an interior unit strength, which is a reception strength of a radio signal detected by a vehicle interior communication device, is equal to more than a predetermined interior equivalent value, and an exterior unit strength, which is a reception strength of a radio signal detected by a vehicle exterior communication device, is less than a predetermined exterior equivalent value.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
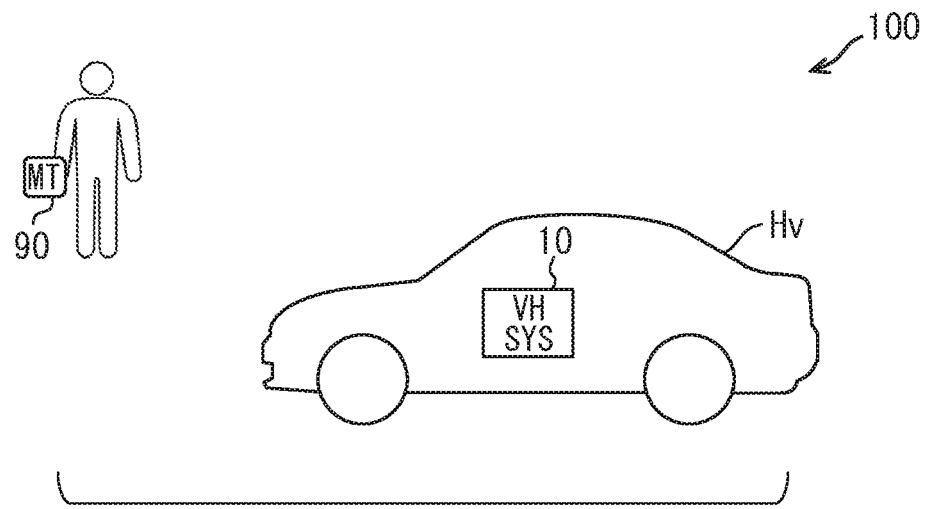
FIG. 1 is a conceptual diagram showing a schematic configuration of a communication system according to the present disclosure.

A certain in-vehicle device has a function as a position determination system for vehicles for estimating a position of a mobile terminal with respect to a vehicle by performing a wireless communication with a mobile terminal carried by a user of the vehicle. More specifically, the in-vehicle device sequentially transmits a request signal from one communication device provided in the vicinity of a driver's seat in a vehicle compartment, and when the mobile terminal receives the request signal requesting the return of the response signal from the in-vehicle device, the mobile terminal returns the response signal including an RSSI (Received Signal Strength Indication) of the request signal. When the in-vehicle device receives the response signal returned from the mobile terminal, the in-vehicle device stores the RSSI included in the response signal in the memory. The in-vehicle device determines that the mobile terminal is present in the vehicle compartment when the average value of the RSSIs for the last five times stored in the memory exceeds a predetermined threshold (hereinafter referred to as a vehicle interior determination threshold). On the other hand, when the average value of the RSSIs for the last five times is equal to or less than the vehicle interior determination threshold, the in-vehicle device determines that the vehicle is present outside the vehicle compartment.

The mobile terminal described above is a communication terminal having a communication function by Bluetooth (registered trademark), and a smartphone, a cellular phone, and the like are examples of the mobile terminal. The in-vehicle device performs a wireless communication based on Bluetooth. For the sake of convenience, hereinafter, a communication based on a predetermined wireless communication standard having a communication range of, for example, about several tens of meters, such as Bluetooth, will be referred to as a short-range communication.

The present inventors have examined a relationship between a reception strength of a signal transmitted from a mobile terminal in an in-vehicle device and a position of the mobile terminal in a configuration in which an antenna for the short-range communication is disposed in a vehicle compartment, and have obtained the following findings.

When the mobile terminal is present outside the vehicle compartment, the reception strength at a vehicle interior antenna (hereinafter, referred to as a vehicle interior strength) is relatively low in many regions outside the vehicle compartment. However, even when the mobile terminal is present outside the vehicle compartment, when the mobile terminal is present in the vicinity of a window of the vehicle, the signal from the mobile terminal easily enters the vehicle compartment through the window, and the vehicle interior strength is likely to become a relatively high level. In addition, even when the mobile terminal is present in the vehicle compartment, multiple radio waves generated by a multipath act to weaken each other, and there may be a place (hereinafter referred to as a lowering point) in which the vehicle interior strength is relatively much lower than that when the mobile terminal is disposed in another region in the vehicle compartment.

If a threshold for determining that the mobile terminal is present in the vehicle compartment (hereinafter referred to as determination threshold) is set to a sufficiently small value, the possibility of determining that the mobile terminal is present in the vehicle compartment can be increased even if the mobile terminal is present at the lowering point. However, on the other hand, even when the mobile terminal is actually present outside the vehicle compartment, the possibility of erroneously determining that the mobile terminal is present inside the vehicle compartment increases.

In addition, if the determination threshold is set to a sufficiently large value, the possibility of erroneously determining that the mobile terminal is present in the vehicle compartment when the mobile terminal is present outside the vehicle compartment can be reduced, but the possibility of erroneously determining that the mobile terminal is present outside the vehicle compartment increases even when the mobile terminal is present in the vehicle compartment such as the lowering point. In other words, it may be erroneously determined that the mobile terminal is present at a position different from an actual position.

A signal transmitted from a communication device (hereinafter referred to as a vehicle interior communication device) disposed in a vehicle compartment leaks out of the vehicle compartment through, for example, a window. In addition, since a propagation path of propagation is reversible, a signal transmitted from the mobile terminal present outside the vehicle compartment can enter the vehicle compartment through the window and can be received by a vehicle interior receiver. As a result, the in-vehicle device may erroneously determine that the mobile terminal is present in the vehicle compartment although the mobile terminal is present outside the vehicle compartment. In particular, when the mobile terminal is present in the vicinity of the window, the tendency of erroneous determination becomes remarkable.

Further, in the vehicle compartment, there is an object which obstructs the propagation of radio waves, for example, a backrest portion of a driver's seat or the like. In addition, in a case where the body of the vehicle is a metal body, multiple radio waves generated by the multipath act to weaken each other, and there may be a position (hereinafter referred to as a null point) at which the reception strength decreases relatively much more than other regions in the vehicle compartment. For that reason, the in-vehicle device may erroneously determine that the mobile terminal is present outside the vehicle compartment even though the mobile terminal is present in the vehicle compartment.

According to one aspect of the present disclosure, a position determination system for determining a position of a mobile terminal, includes a vehicle interior receiver, a vehicle interior strength detector, a vehicle exterior antenna, a vehicle exterior receiver, a vehicle exterior strength detector, and a position determination unit. The vehicle interior receiver is configured to receive a radio signal transmitted from the mobile terminal using a radio wave in a predetermined frequency band through a vehicle interior antenna installed in a vehicle compartment of a vehicle. The vehicle interior strength detector is configured to detect a reception strength of the radio signal received by the vehicle interior receiver as a vehicle interior strength. The vehicle exterior antenna is configured to receive the radio signal arriving from a vehicle exterior. The vehicle exterior receiver is configured to receive the radio signal transmitted from the mobile terminal through the vehicle exterior antenna. The vehicle exterior strength detector is configured to detect a reception strength of the radio signal received by the vehicle exterior receiver as a vehicle exterior strength. The position determination unit is configured to determine whether the mobile terminal is present outside the vehicle compartment based on the vehicle interior strength detected by the vehicle interior strength detector and the vehicle exterior strength detected by the vehicle exterior strength detector. The vehicle exterior antenna is configured to be disposed in a predetermined region in a vicinity of a window of the vehicle in an outer surface portion of the vehicle.

In the configuration described above, the vehicle exterior antenna is disposed in the vicinity of the window which is a passage of the radio wave from the outside of the vehicle compartment into the vehicle compartment. According to the configuration described above, when the radio signal from the mobile terminal present outside the vehicle compartment is received by the vehicle interior antenna, there is a high possibility that the radio signal is also received by the vehicle exterior antenna. In addition, since the vehicle exterior antenna is closer to the mobile terminal than the vehicle interior antenna, the vehicle exterior strength is likely to be higher than the vehicle interior strength. In other words, although the mobile terminal is present outside the vehicle compartment, a reverse rotation phenomenon in which the vehicle interior strength becomes higher than the vehicle exterior strength is less likely to occur.

The above-mentioned effects are also the same when the mobile terminal is present in the vicinity of the window outside the vehicle compartment. The position determination unit determines whether the mobile terminal is present outside the vehicle compartment on the basis of the vehicle interior strength and the vehicle exterior strength on the premise of the above configuration. According to the configuration described above, the possibility of erroneously determining that the mobile terminal is present in the vehicle compartment can be reduced even though the mobile terminal is present outside the vehicle compartment.

According to another aspect of the present disclosure, a position determination system for determining a position of a mobile terminal by performing a wireless communication with the mobile terminal, includes a vehicle interior communication device, a vehicle exterior communication device, and a position determination unit. The vehicle interior communication device is configured to be installed in a vehicle compartment of a vehicle, receive a radio signal transmitted from the mobile terminal, and detect a reception strength of the received radio signal. The vehicle exterior communication device is configured to be installed on an outer surface of the vehicle, receive the radio signal transmitted from the mobile terminal, and detect a reception strength of the received radio signal. The position determination unit is configured to determine a position of the mobile terminal based on at least one of an interior unit strength that is the reception strength detected by the vehicle interior communication device, and an exterior unit strength that is the reception strength detected by the vehicle exterior communication device. The position determination unit is configured to determine that the mobile terminal is present in the vehicle compartment based on a condition that the interior unit strength is equal to more than a predetermined interior equivalent value for determining that the mobile terminal is present in the vehicle compartment, and the exterior unit strength is less than a predetermined exterior equivalent value for determining that the mobile terminal is present outside the vehicle compartment.

In the configuration described above, even if the interior unit strength is equal to or higher than a predetermined interior determination value, it is not determined that the mobile terminal is present in the vehicle compartment. In addition to the interior unit strength being equal to or greater than the predetermined interior determination value, the mobile terminal is determined to be present in the vehicle compartment on the condition that the exterior unit strength is less than an exterior equivalent value.

According to the configuration described above, even when the interior equivalent value is set to a value small enough to be observed as the interior unit strength even when the mobile terminal is present outside the vehicle compartment, when the exterior unit strength becomes equal to or higher than the exterior equivalent value, it is not determined that the mobile terminal is present inside the vehicle compartment. Therefore, the possibility of erroneously determining that the mobile terminal is present in the vehicle compartment can be reduced even though the mobile terminal is present outside the vehicle compartment.

First Embodiment

Embodiments of the present disclosure will be described below with reference to the drawings. FIG. 1 is a diagram showing an example of a schematic configuration of a communication system 100 according to the present disclosure. As shown in FIG. 1, the communication system 100 includes an in-vehicle system 10 mounted on a vehicle Hv, and a mobile terminal 90 which is a communication terminal carried by a user of the vehicle Hv.

The mobile terminal 90 is a communication terminal having a function of performing a communication conforming to a predetermined short-range wireless communication standard in which a communication distance can be set to 10 meters or more (hereinafter, referred to as short-range communication). In this example, as the short-range wireless communication standard, for example, Bluetooth Low Energy (Bluetooth is a registered trademark, Wi-Fi (registered trademark), ZigBee (registered trademark), or the like can be adopted. According to those short-range wireless communication standards, the communication distance can be set up to about 100 m. As an example, it is assumed that the mobile terminal 90 and the in-vehicle system 10 are configured to perform a communication in accordance with the Bluetooth Low Energy standard.

The mobile terminal (MT) 90 and the in-vehicle system (VH SYS) 10 may be configured to perform a wireless communication by using an impulse signal used in an ultra-wideband (UWB: Ultra Wide Band) communication. The impulse signal used in the UWB communication is a signal having an extremely short pulse width (for example, 2 ns) and a bandwidth of 500 MHz or more (that is, an ultra-wide bandwidth). Examples of frequency bands (hereinafter, referred to as UWB bands) which can be used for the UWB communication include 3.1 GHz to 16 GHz, 3.4 GHz to 4.8 GHz, 7.25 GHz to 16 GHz, and 22 GHz to 29 GHz.

The standard for the mobile terminal 90 and the in-vehicle system 10 to perform the wireless communication and the frequency of the radio wave used for the wireless communication (hereinafter, referred to as the radio wave used in the system) may be appropriately selected. As an example, the mobile terminal 90 and the in-vehicle system 10 perform a communication with the use of a radio wave in a 2.4 GHz band, but the present disclosure is not limited to the above example. As another aspect, the radio wave used in the system may be a radio wave of 2.5 GHz to 10 GHz as described above. In addition, a radio wave of less than 2.4 GHz may be used. From the viewpoint of data transmission efficiency, the frequency of the radio wave used in the system is preferably 1 GHz or more.

The mobile terminal 90 may be provided with the function of performing the short-range communication described above, and for example, a smartphone can be used as the mobile terminal 90. It is needless to say that the mobile terminal 90 may be a tablet terminal, a wearable device, a portable music player, a portable game machine, a wireless tag, or the like. A general-purpose communication terminal can be employed as the mobile terminal 90. The mobile terminal 90 may be a communication device having a function as a key of the vehicle Hv (so-called portable device for a vehicle).

The mobile terminal 90 wirelessly transmits communication packets including transmission source information at a predetermined transmission interval, thereby notifying the surrounding communication terminal having the short-range communication function of the presence of the mobile terminal 90 itself (that is, advertising). The transmission source information is, for example, identification information assigned to the mobile terminal 90 (hereinafter, referred to as a terminal ID). The terminal ID functions as information for distinguishing between another communication terminal and the mobile terminal 90.

In the following description, for convenience, the communication packets periodically transmitted for advice are referred to as advertisement packets. The transmission interval of the advertisement packets may be a fixed value (for example, 100 milliseconds) or may be variable according to an operation state of the mobile terminal 90. For example, when a predetermined application using the short-range communication function is operating in a foreground in the mobile terminal 90, the transmission interval is set to a relatively short time (for example, 50 milliseconds). On the other hand, if the application is not operating in the foreground, the transmission interval is set to a relatively long time (200 milliseconds).

The in-vehicle system 10 also has the short-range communication function described above, and receives a signal (for example, the advertisement packet) transmitted from the mobile terminal 90 to detect that the mobile terminal 90 is present within a range in which the mobile terminal 90 can perform the short-range communication with the in-vehicle system 10. In the following description, a range in which the in-vehicle system 10 can perform a short-range communication with the mobile terminal 90 is also described as a vehicle communication area.

The in-vehicle system 10 may be configured to transmit a signal requesting the mobile terminal 90 to return a response signal (hereinafter referred to as a response request signal) at a predetermined timing, and receive the response signal from the mobile terminal 90, to thereby detect the presence of the mobile terminal 90 in the vehicle communication area of the in-vehicle system 10. In that case, the mobile terminal 90 returns the response signal in the short-range communication when receiving the response request signal transmitted from the in-vehicle system 10. It is assumed that the signal transmitted by the mobile terminal 90 includes the transmission source information as a more preferable mode.

<Configuration of Vehicle Hv>

Figure 2:
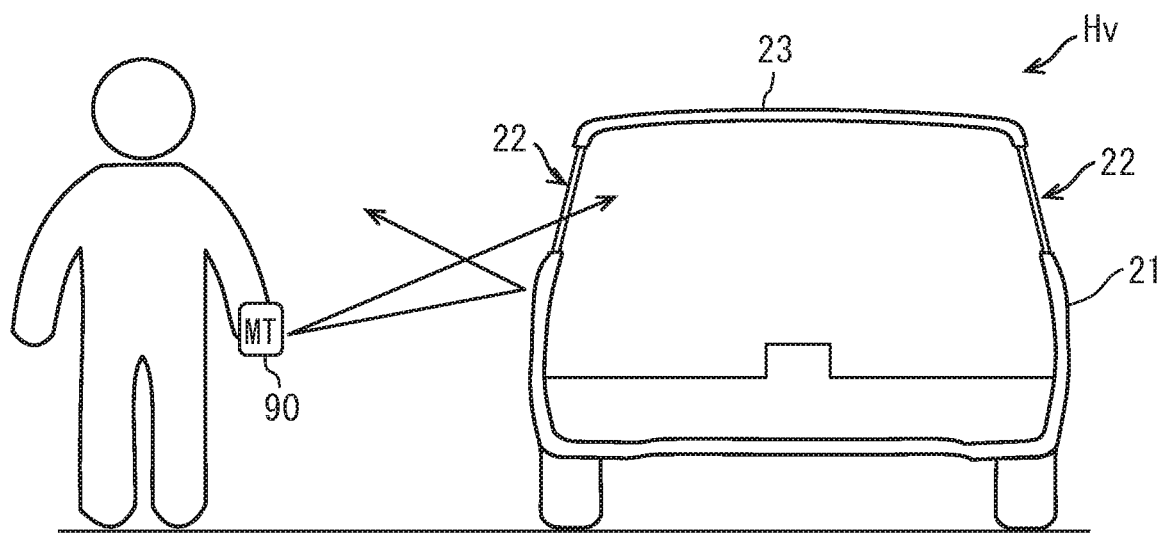
FIG. 2 is a diagram illustrating a configuration of a vehicle.

First, the configuration of the vehicle Hv will be described with reference to FIG. 2. In this example, the vehicle Hv is a private vehicle as an example, but may be a taxi, a bus, a truck, or the like as another mode. The vehicle may be a vehicle whose main purpose is other than the movement of an occupant.

Various body panels of the vehicle Hv are realized by using metal members. In this example, the body panel is a component group that provides an appearance shape of the vehicle Hv. The body panels include side body panels, a roof panel, a rear end panel, an engine hood panel, door panels, pillars, and the like which are assembled to a body shell. In the following description, a configuration including a combination of the various body panels is referred to as a body 21.

Since the metal plate has a property of reflecting radio waves, the body panel of the vehicle Hv reflects radio waves used in the system. In other words, the vehicle Hv includes the body 21 that blocks the linear propagation of the radio waves used in the system. The body shell itself may be formed of a metal member such as a steel plate, or may be made of a carbon-based resin. As a more preferable mode, the body shell is also made of metal.

The blocking referred to in the present specification is ideally reflection, but is not limited to the reflection. A configuration capable of attenuating the radio wave used in the system to a predetermined level (hereinafter, referred to as target attenuation level) or more corresponds to a configuration for blocking propagation of the radio wave used in the system. The target attenuation level may be a value at which a significant difference occurs between the signal strengths of the radio waves inside and outside the vehicle compartment, and is set to, for example, 5 dB. The various body panels configuring the body 21 of the vehicle Hv may be made of a carbon-based resin. However, in that case, the carbon-based resin serving as the material of the body has a composition in which carbon is sufficiently filled so as to attenuate the propagation of the radio wave used in the system by 5 dB or more.

Further, even in the case where the body panel of the vehicle Hv is made of a general-purpose resin containing no carbon, it is sufficient that a specific metal pattern which functions to block the propagation of the radio waves used in the system is provided on the surface of the body panel, thereby blocking the propagation of the radio waves used in the system. The metal pattern (hereinafter, referred to as a shield pattern) which functions to block the propagation of the radio wave used in the system is, for example, a pattern in which fine wire conductors such as silver nanowires are arranged in a lattice pattern at intervals of 1⁄2 wavelengths or less of the radio wave used in the system. In this example, the thin line indicates a line width of 50 μm or less.

The shield pattern can be realized with the use of a well-known meta surface structure. The meta surface structure is a structure in which artificial structures called unit cells (Unit Cell) are repeatedly arranged. According to the meta surface structure, only a radio wave of a specific frequency band (in this example, the radio wave used in the system) can be selectively reflected or attenuated (that is, blocked). In addition, the body 21 of the vehicle Hv may be configured to block the propagation of the radio wave used in the system by coating a paint containing metal powder or carbon powder on a body made of a general-purpose resin. Further, a film (hereinafter, referred to as a shield film) for blocking the propagation of the radio wave used in the system may be attached to the body 21.

The vehicle Hv has a roof portion 23 provided by the roof panel, and includes multiple pillars which are members for supporting the roof panel. The multiple pillars are called A pillars, B pillars, and C pillars in a stated order from a front end to a rear end. As an example, it is assumed that the vehicle Hv is a vehicle having a front seat and a rear seat, and includes A pillars 24A, B pillars 24B, and C pillars 24C as the pillars.

The A pillars 24A are pillars provided in front of the front seats. In other words, the A pillars 24A are pillars disposed obliquely in front of a driver seat and a front passenger seat. The B pillars 24B are pillars provided between the front seats and the rear seats. The C pillars 24C are pillars provided diagonally behind the rear seats. As another mode, the vehicle Hv may be a vehicle having D pillars, which are fourth pillars from the front, or E pillars, which are fifth pillars. Part or all of each pillar is formed of a metal member such as a high tensile strength steel plate. As another mode, the pillar may be made of carbon fiber or resin. In addition, the pillar may be made of the combination of various materials.

As described above, the vehicle Hv as a whole is configured such that, when all the doors are closed, the radio wave used in the system enters the vehicle compartment from the vehicle exterior through the windows 22, or leaks from the vehicle compartment to the vehicle exterior. In other words, the windows 22 are configured to act as paths for the radio wave used in the system. In this example, the windows 22 are a front window, windows provided on side surfaces of the vehicle Hv (so-called side windows), a rear window, or the like.

As another mode, window glasses provided on doors of the vehicle Hv or the like may also be configured to block the linear propagation of the radio wave used in the system. In this example, the window glasses are transparent members disposed in the windows 22 provided in the vehicle Hv, and a material of the window glasses do not have to be strictly glass. For example, the window glasses may be made of an acrylic resin or the like. In other words, the window glasses in this example are transparent members which function as a windshield.

<Configuration of In-Vehicle System 10>

Figure 3:
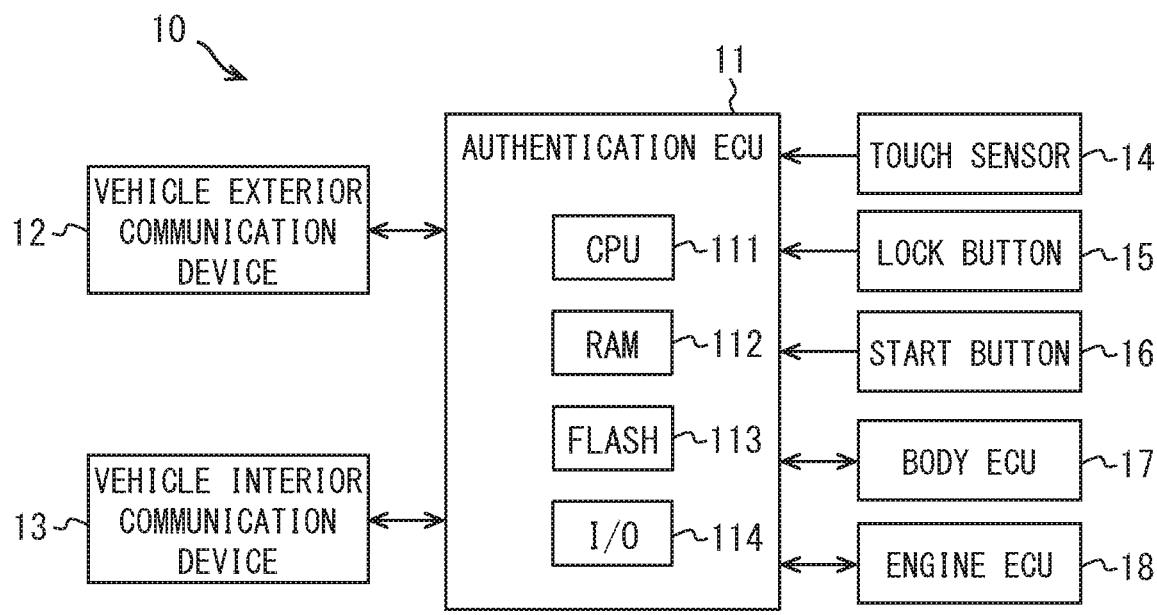
FIG. 3 is a block diagram showing a schematic configuration of an in-vehicle system.

Next, the electrical configuration and operation of the in-vehicle system 10 will be described. As shown in FIG. 3, the in-vehicle system 10 includes an authentication ECU 11, a vehicle exterior communication device 12, a vehicle interior communication device 13, a touch sensor 14, a lock button 15, a start button 16, a body ECU 17, and an engine ECU 18. The ECUs in the member names are abbreviations of Electronic Control Unit and mean electronic control units.

The in-vehicle system 10 corresponds to a position determination system for a vehicle.

Each of the vehicle exterior communication device 12, the vehicle interior communication device 13, the body ECU 17, and the engine ECU 18 is connected to the authentication ECU 11 through a communication network built in the vehicle or a dedicated signal line so as to be capable of performing a two-way communication. Each of the touch sensor 14, the start button 16, and the lock button 15 is configured such that an output signal is directly or indirectly input to the authentication ECU 11.

The authentication ECU 11 is generally an ECU that estimates the position of the mobile terminal 90 with respect to the vehicle Hv by cooperation (collaboration) with other components such as the vehicle exterior communication device 12 and performs a vehicle control according to the estimation result. The authentication ECU 11 is realized by use of a computer. In other words, the authentication ECU 11 includes a CPU 111, a RAM 112, a flash memory 113, and the like. The CPU 111 is an arithmetic processing unit that executes various calculation processing. The RAM 112 is a volatile storage medium, and the flash memory 113 is a rewritable non-volatile storage medium.

A terminal ID assigned to the mobile terminal 90 owned by the user is registered in the flash memory 113. For the sake of convenience, the terminal ID registered in the flash memory 113 as the terminal ID of the mobile terminal 90 is also referred to as a registration ID. The flash memory 113 stores a program (hereinafter, referred to as a position determination program) for causing a normal computer to function as the authentication ECU 11. It should be noted that the position determination program described above may be stored in a non-transitory substantial recording medium (non-transitory tangible storage medium). The execution of the position determination program by the CPU 111 corresponds to the execution of a process corresponding to the position determination program.

The detail of the authentication ECU 11 will be described later. It should be noted that even when a traveling power supply (for example, ignition power supply) of the vehicle Hv is turned off, the authentication ECU 11 is configured to be supplied with enough power from a vehicle-mounted battery in order to execute a position determination process (to be described later).

Figure 4:
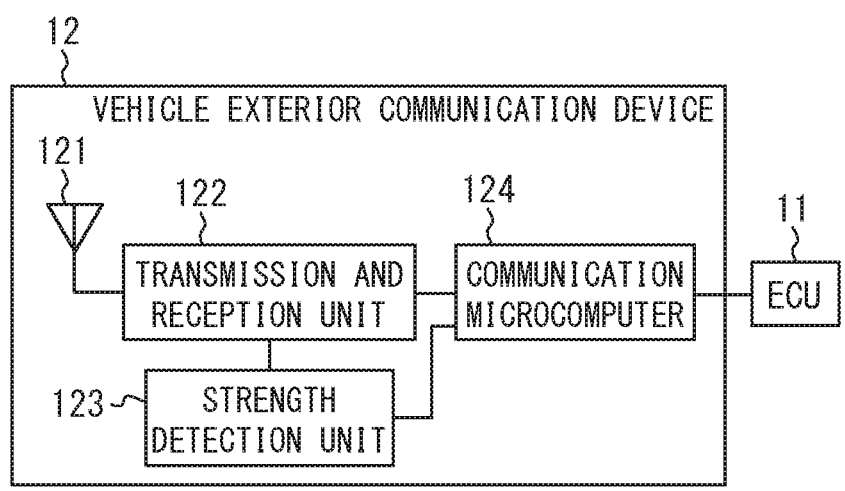
FIG. 4 is a block diagram showing a configuration of a vehicle exterior communication device.

The vehicle exterior communication device 12 is a communication module for performing a short-range communication with the mobile terminal 90 which is present outside the vehicle compartment. As shown in FIG. 4, the vehicle exterior communication device 12 includes a vehicle exterior antenna 121, a transmission and reception unit 122, a strength detection unit 123, and a communication microcomputer 124 as more detailed constituting elements. The vehicle exterior antenna 121 is an antenna for transmitting and receiving the radio wave in a frequency band used for communication with the mobile terminal 90 (that is, radio wave used in the system). In the present embodiment, as an example, the vehicle exterior antenna 121 is an antenna (so-called omnidirectional antenna) that provides omnidirectivity (in other words, isotropy) in a predetermined plane determined with respect to the posture of the antenna element. As another mode, the vehicle exterior antenna 121 may have directivity. It is assumed that the omnidirectional antenna as the vehicle exterior antenna 121 is disposed in a posture that provides omni-directivity on a horizontal plane of the vehicle. The vehicle horizontal plane is a plane orthogonal to a height direction of the vehicle Hv.

The transmission and reception unit 122 demodulates a signal received by the vehicle exterior antenna 121 and provides the demodulated signal to the communication microcomputer 124. In addition, the transmission and reception unit 122 modulates a signal input from the authentication ECU 11 through the communication microcomputer 124, outputs the modulated signal to the vehicle exterior antenna 121, and radiates the signal as a radio wave. The transmission and reception unit 122 corresponds to a vehicle exterior receiver. An amplification factor of the received signal and a transmission power of the transmission signal determine a communication area for the vehicle exterior communication device 12.

The communication area of the vehicle exterior communication device 12 corresponds to a range in which the vehicle exterior communication device 12 can communicate mutually with the mobile terminal 90. In other words, the communication area of the vehicle exterior communication device 12 is a range in which the signal transmitted from the mobile terminal 90 can be received at a level demodulatable by the vehicle exterior communication device 12, and the signal transmitted by the vehicle exterior communication device 12 is reachable while maintaining a demodulatable strength in the mobile terminal 90. The larger the transmission power and the amplification factor of the received signal are, the larger the communication area of the vehicle exterior communication device 12 becomes. As an example, it is assumed that the vehicle exterior communication device 12 is configured such that the communication area falls within 10 m from the vehicle exterior antenna 121.

The strength detection unit 123 successively outputs data (so-called RSSI: Received Signal Strength Indication) indicating the strength of signal received by the transmission and reception unit 122 through the vehicle exterior antenna 121. The strength detected by the strength detection unit 123 (hereinafter, referred to as a reception strength) is sequentially provided to the communication microcomputer 124 in association with the terminal ID included in the reception data. The reception strength may be expressed by, for example, a unit [dBm] of power. For convenience, data in which the reception strength and the terminal ID are associated with each other is referred to as reception strength data. The strength detection unit 123 corresponds to a vehicle exterior strength detector.

The communication microcomputer 124 is a microcomputer that controls the transfer of data to and from the authentication ECU 11, and is realized by use of an MPU, a RAM, and the like. The communication microcomputer 124 provides the reception data input from the transmission and reception unit 122 to the authentication ECU 11 sequentially or based on a request from the authentication ECU 11. In other words, the data received by the transmission and reception unit 122 is provided to the authentication ECU 11 through the communication microcomputer 124.

When the communication microcomputer 124 acquires the reception strength data from the strength detection unit 123, the communication microcomputer 124 stores the reception strength data in a RAM (not shown). The reception strength data sequentially acquired may be sorted in chronological order and stored in the RAM so that the reception strength of the latest reception data becomes a head, for example. The data that has been stored for a certain period of time may be sequentially discarded. In other words, the reception strength data is held in the RAM for a predetermined time. The communication microcomputer 124 provides the reception strength data stored in the RAM based on a request from the authentication ECU 11. The reception strength data provided to the authentication ECU 11 may be deleted from the RAM. A storage period of the reception strength data in the communication microcomputer 124 may be appropriately designed.

In the present embodiment, the reception strength data output by the transmission and reception unit 122 is once held in the RAM, and the communication microcomputer 124 provides the reception strength data accumulated in the RAM to the authentication ECU 11 based on a request from the authentication ECU 11, but the present disclosure is not limited to the above configuration. The reception strength data may be sequentially provided to the authentication ECU 11.

Figure 5:
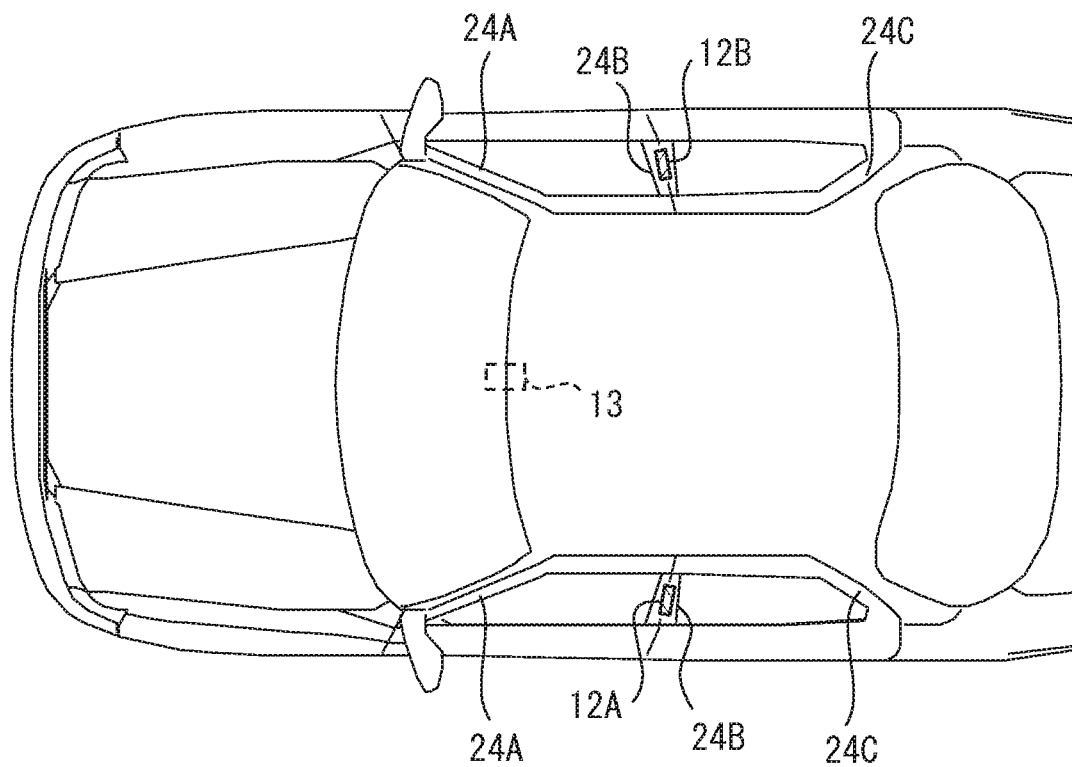
FIG. 5 is a conceptual top view of a vehicle Hv illustrating a mounting position of the vehicle exterior communication device.

At least one vehicle exterior communication device 12 having the configuration described above is disposed at a predetermined position on the outer surface of the vehicle Hv so as to provide a predetermined communication area outside the vehicle compartment. In this example, the outer surface is a body portion which is in contact with a vehicle exterior space of the vehicle Hv, and includes a side surface, a rear surface, and a front surface of the vehicle Hv. As an example, the in-vehicle system 10 includes a left communication device 12A and a right communication device 12B as the vehicle exterior communication device 12 as shown in FIG. 5.

Figure 6:
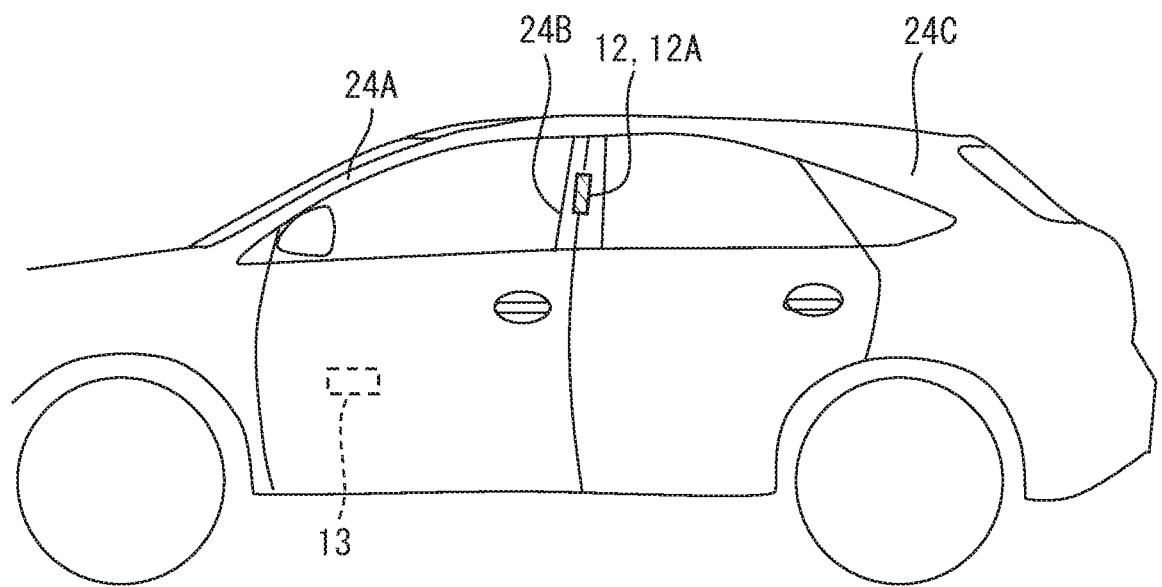
FIG. 6 is a conceptual side view of the vehicle Hv illustrating a mounting position of the vehicle exterior communication device.

As shown in FIG. 6, the left communication device 12A is disposed in such a posture that the left side of the vehicle Hv is in sight on a surface on the vehicle exterior side in a middle portion of the B pillar 24B located on the left side of the vehicle. The surface on the vehicle exterior side is a surface facing in a direction in which the vehicle exterior space is provided as viewed from the vehicle compartment. In order to clearly indicate the position of the left communication device 12A in FIGS. 5 to 6, a size of the left communication device 12A is exaggerated and hatched by oblique lines The middle portion of the B pillar 24B corresponds to a portion positioned at the center when the B pillar 24B is divided into three equal portions in the vehicle height direction. The region in sight for the left communication device 12A is a region in which the signal transmitted by the left communication device 12A is directly reachable. In addition, since the propagation path of the radio signal is reversible, the region in sight for the left communication device 12A corresponds to a region in which the signal transmitted from the mobile terminal 90 is directly receivable. Incidentally, the region in which the radio signal is directly reachable is a region in which the radio signal is reachable substantially rectilinearly, and includes, for example, a region in which the radio signal is reachable through an object such as glass.

Figure 7:
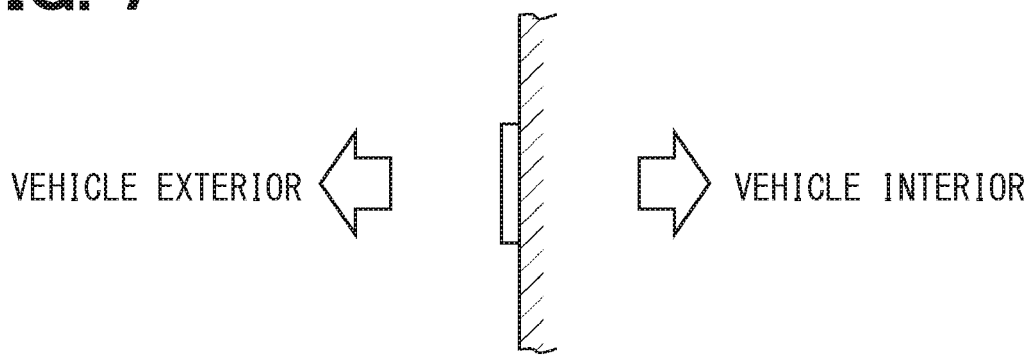
FIG. 7 is a conceptual diagram illustrating a configuration of a mounting portion of the vehicle exterior communication device.

The B pillar 24B is formed of a metal member. In other words, as shown in FIG. 7, a metal body is present on a rear surface which is the vehicle interior side as viewed from the left communication device 12A. As a result, most of the vehicle interior space is out of sight for the left communication device 12A, which makes it difficult to receive a signal from the mobile terminal 90 present in the vehicle compartment.

The region out of sight for the left communication device 12A is a region in which the signal transmitted by the left communication device 12A is not directly reachable. The out-of-sight for the left communication device 12A corresponds to a region in which the signal transmitted from the mobile terminal 90 cannot be directly received because the propagation path of the radio signal is reversible according to another aspect. Even when the mobile terminal 90 is present out of sight of the left communication device 12A, the signal transmitted from the mobile terminal 90 may reach the left communication device 12A by being reflected by various structures.

The right communication device 12B is a vehicle exterior communication device 12 paired with the left communication device 12A. The right communication device 12B is disposed at a position opposite to the left communication device 12A in the side surface on the right side of the vehicle Hv. In other words, in the middle portion of the B pillar 24B on the right side of the vehicle, the right side of the vehicle Hv is disposed in a sight on the surface of the vehicle exterior side of the B pillar 24B. As described above, with the provision of the left communication device 12A and the right communication device 12B as the vehicle exterior communication device 12, the in-vehicle system 10 forms a communication area outside the vehicle compartment with the side region of the vehicle Hv as the center.

The vehicle interior communication device 13 is also a communication module for performing a short-range communication with the mobile terminal 90. However, while the vehicle exterior communication device 12 described above is a communication module intended for performing the short-range communication with the mobile terminal 90 present outside the vehicle compartment, the vehicle interior communication device 13 is a communication module intended for performing the communication with the mobile terminal 90 present inside the vehicle compartment. Accordingly, the vehicle interior communication device 13 differs from the vehicle exterior communication device 12 in the installation position and the like.

At least one vehicle interior communication device 13 is provided in the vehicle compartment so that the vehicle interior space becomes a communication area. The communication area for the vehicle interior communication device 13 corresponds to a range in which the vehicle interior communication device 13 can mutually communicate with the mobile terminal 90, similarly to the communication area for the vehicle exterior communication device 12. The vehicle communication area described above is an area defined by combining a communication area provided by the multiple vehicle exterior communication devices 12 and a communication area provided by at least one vehicle interior communication device 13.

In the present embodiment, as an example, it is assumed that the vehicle interior communication device 13 is disposed in the vicinity of a center console so that the entire area of the vehicle interior space becomes a communication area. Needless to say, the installation position of the vehicle interior communication device 13 is not limited to the above example. The vehicle interior communication device 13 may be disposed at a position having a height substantially equal to that of door handles in the vicinity of the center portion of the instrument panel in the vehicle width direction. The vehicle interior communication device 13 may be disposed in the vicinity of a boundary between the center console and the instrument panel. In addition, the vehicle interior communication device 13 may be disposed, for example, at a foot of a driver's seat or on the side surface of the door for the driver's seat on the vehicle interior side. The vehicle interior communication device 13 may be disposed at the center of a vehicle interior ceiling portion. Multiple vehicle interior communication devices 13 may be provided in the vehicle compartment. For example, the vehicle interior communication device 13 for the front seat and the vehicle interior communication device 13 for the rear seat may be provided. The vehicle interior communication device 13 for the rear seat may be disposed inside the seat of the rear seat.

Figure 8:
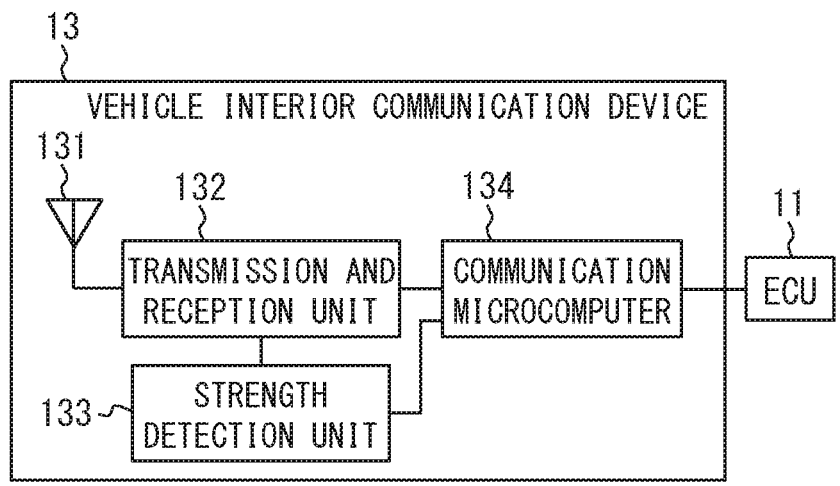
FIG. 8 is a block diagram showing a configuration of the vehicle interior communication device.

A specific configuration of the communication module of the vehicle interior communication device 13 can be the same as that of the vehicle exterior communication device 12. In other words, as shown in FIG. 8, the vehicle interior communication device 13 includes an antenna 131 for transmitting and receiving radio waves used in the system (hereinafter, referred to as a vehicle interior antenna), a transmission and reception unit 132, a strength detection unit 133, and a communication microcomputer 134, as more detailed constituting elements. The functions of those various configurations are the same as those of the vehicle exterior communication device 12, and therefore a description of the above functions will be omitted. The reception strength detected by the strength detection unit 133 is provided to the authentication ECU 11 through the communication microcomputer 134. The transmission and reception unit 132 corresponds to a vehicle interior receiver. The strength detection unit 123 corresponds to a vehicle interior strength detector.

For the sake of convenience, hereinafter, when the vehicle exterior communication device 12 and the vehicle interior communication device 13 are not distinguished from each other, those communication devices 12 and 13 are also referred to as communication devices. The transmission and reception units 122 and 132 are also referred to as transmission and reception units when the transmission and reception units 122 and 132 are not distinguished from each other. The same applies to the strength detection units 123 and 133 and the communication microcomputers 124 and 134. Further, when the vehicle exterior antenna 121 and the vehicle interior antenna 131 are not distinguished from each other, those antennas 121 and 132 are referred to as antennas.

The touch sensor 14 is mounted on each door handle of the vehicle Hv, and detects that the user touches the door handle. The detection results of the touch sensors 14 are sequentially output to the authentication ECU 11. The lock button 15 is a button for the user to lock the doors of the vehicle Hv. The lock button 15 may be provided on the handle of each door of the vehicle Hv. Upon being depressed by the user, the lock button 15 outputs an electric signal indicating the depression of the lock button 15 to the authentication ECU 11.

The start button 16 is a push switch for a user to start a driving source (for example, an engine). When the user performs a push operation on the start button 16, the start button 16 outputs an electric signal indicating the push operation to the authentication ECU 11. As an example, the vehicle Hv is a vehicle provided with an engine as a power source, but the present disclosure is not limited to the above example. The vehicle Hv may be an electric vehicle or a hybrid vehicle. When the vehicle Hv is a vehicle provided with a motor as a driving source, the start button 16 is a switch for starting the motor for driving.

The body ECU 17 is an ECU that controls various actuators mounted on the vehicle Hv based on signals input from various vehicle-mounted sensors and the authentication ECU 11. In this example, the vehicle-mounted sensors are courtesy switches or the like disposed for the respective doors. The courtesy switches are sensors for detecting opening and closing of the door. For example, the body ECU 17 outputs predetermined control signals to door lock motors configuring locking mechanisms of the doors based on instructions from the authentication ECU 11, thereby locking and unlocking the doors. The engine ECU 18 is an ECU for controlling the operation of an engine mounted on the vehicle Hv.

<Function of Authentication ECU 11>

Figure 9:
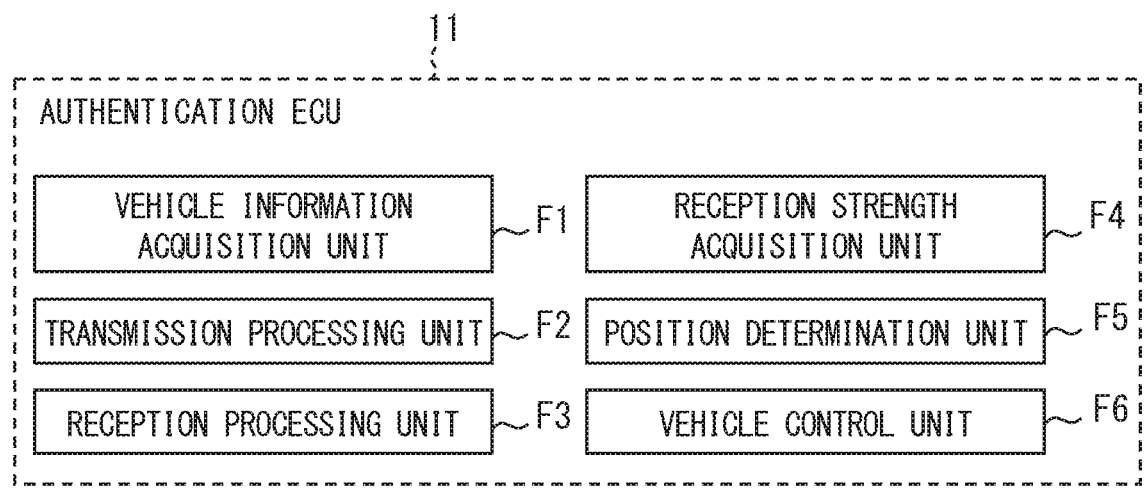
FIG. 9 is a functional block diagram showing a configuration of an authentication ECU.

Next, the function of the authentication ECU 11 will be described with reference to FIG. 9. The authentication ECU 11 provides functions corresponding to various functional blocks shown in FIG. 9 by causing the CPU 111 to execute the position determination program described above. In other words, the authentication ECU 11 includes, as functional blocks, a vehicle information acquisition unit F1, a transmission processing unit F2, a reception processing unit F3, a reception strength acquisition unit F4, a position determination unit F5, and a vehicle control unit F6.

Some or all of the functions of the authentication ECU 11 may be implemented as hardware using logic circuits or the like. A mode implemented as hardware also include a mode implemented by using one or more ICs. In addition, some or all of the functional blocks of the authentication ECU 11 may be implemented by a combination of software executed by the CPU 111 and a hardware member.

The vehicle information acquisition unit F1 acquires various information (hereinafter, referred to as vehicle information) indicating a state of the vehicle Hv from various sensors and devices (for example, the touch sensor 14) mounted on the vehicle Hv. The vehicle information includes, for example, the presence or absence of a touch on the door handle, the presence or absence of depression of the start button 16, the presence or absence of depression of the lock button 15, and the like.

The information included in the vehicle information is not limited to that described above. The vehicle information also includes a shift position detected by a shift position sensor (not shown), a detection result of a brake sensor for detecting whether a brake pedal is depressed, and the like. The vehicle information acquired by the vehicle information acquisition unit F1 is given a time stamp indicating an acquisition time and stored in the RAM 112 or the like. The vehicle information may be stored in the flash memory 113.

The transmission processing unit F2 generates data addressed to the mobile terminal 90, and outputs the data to at least one of the vehicle exterior communication device 12 and the vehicle interior communication device 13. As a result, the transmission processing unit F2 transmits a signal corresponding to desired data as a radio wave. For example, the transmission processing unit F2 generates a response request signal based on a request from the reception strength acquisition unit F4, which will be described later, and causes each communication device to transmit the response request signal. The reception processing unit F3 is configured to acquire reception data from each of the vehicle exterior communication device 12 and the vehicle interior communication device 13.

The reception strength acquisition unit F4 is configured to acquire reception strength data from each of the vehicle exterior communication device 12 and the vehicle interior communication device 13. The reception strength acquisition unit F4 according to the present embodiment requests the transmission processing unit F2 to transmit a response request signal at a predetermined sampling cycle. As a result, a response request signal is periodically transmitted from each communication device at a predetermined sampling cycle.

In addition, the reception strength acquisition unit F4 requests each communication device to provide reception strength data at a timing when a predetermined response waiting time has elapsed since the request of the transmission of the response request signal. The response waiting time is a parameter determined in accordance with a time taken from transmission of the response request signal by the transmission processing unit F2 to reception of the response signal from the mobile terminal 90 by the reception processing unit F3.

When the reception strength data provided from the vehicle exterior communication device 12 includes the reception strength of the signal transmitted from the mobile terminal 90, the reception strength acquisition unit F4 stores the reception strength data as the vehicle exterior strength in the RAM 112. The reception strength data acquired from the left communication device 12A and the reception strength data acquired from the right communication device 12B may be stored separately.

In the same manner, when the reception strength data provided from the vehicle interior communication device 13 includes the reception strength data of the signal transmitted from the mobile terminal 90, the reception strength acquisition unit F4 stores the reception strength data as the vehicle interior strength in the RAM 112. In other words, the reception strength at each communication device (in other words, each antenna) is handled separately for each communication device. The reception strength acquisition unit F4 corresponds to a configuration for acquiring the reception strength of the signal transmitted from the mobile terminal 90 at each antenna.

Whether or not the reception strength of a certain received signal is the reception strength of the signal transmitted from the mobile terminal 90 can be determined based on the terminal ID associated with the reception strength and the registration ID. The reception strength of the signal from other than the mobile terminal 90 may be discarded. The process of discarding the reception strength of a signal from a device other than the mobile terminal 90 may be performed in the communication device. In that case, it is assumed that the terminal ID of the mobile terminal 90 is also registered in the communication device. In the case where the multiple mobile terminals 90 are registered in the in-vehicle system 10 and the reception strengths from the multiple mobile terminals 90 can be acquired, the reception strength acquisition unit F4 may store the reception strengths of the respective mobile terminals 90 separately for each terminal ID.

The position determination unit F5 is configured to determine the position of the mobile terminal 90 based on the reception strength of the mobile terminal 90 acquired by the reception strength acquisition unit F4. For example, the position determination unit F5 compares the vehicle exterior strength acquired by the reception strength acquisition unit F4 with the vehicle interior strength, and when the vehicle exterior strength is higher than the vehicle interior strength, the position determination unit F5 determines that the mobile terminal 90 is present outside the vehicle compartment. On the other hand, when the vehicle interior strength is higher than the vehicle exterior strength, it is determined that the mobile terminal 90 is present in the vehicle compartment. The determination result of the position determination unit F5 is provided to the vehicle control unit F6.

When both the left communication device 12A and the right communication device 12B can receive the signal from the mobile terminal 90, the higher value of the multiple vehicle exterior strengths corresponding to the vehicle exterior communication devices 12 may be adopted as a comparison object with the vehicle interior strength. The case in which the signals from the mobile terminal 90 can be received by both the left communication device 12A and the right communication device 12B corresponds to the case in which the vehicle exterior strength of each of the multiple vehicle exterior communication devices 12 can be acquired as the vehicle exterior strength.

In the present embodiment, as an example, the authentication ECU 11 acquires the reception strength of the response signal transmitted from the mobile terminal 90 by transmitting the response request signal, and executes the position determination process by use of the reception strength, but the present disclosure is not limited to the above example. When the mobile terminal 90 is configured to sequentially transmit a predetermined signal (for example, an advertisement packet), the position of the mobile terminal 90 may be determined by use of the reception strength of the periodically transmitted signal.

The vehicle control unit F6 is configured to perform a vehicle control according to the user operation based on the determination result of the position determination unit F5 and the user operation on the vehicle Hv. For example, when the door of the vehicle Hv is locked and it is determined by the position determination unit F5 that the mobile terminal 90 is present outside the vehicle compartment, the vehicle control unit F6 unlocks the door in cooperation with the door lock motor when the operation of touching the handle by the user is detected by the touch sensor 14. Further, for example, when the engine is stopped and it is determined by the position determination unit F5 that the mobile terminal 90 is present in the vehicle compartment, if the start button 16 is pressed by the user, the engine is started in cooperation with the engine ECU 18. In addition, the content of the vehicle control performed by the vehicle control unit F6 may be appropriately designed in accordance with the content of the user's operation and the state of the vehicle Hv.

As the execution condition of the vehicle control, it is preferable to separately use a result of performing authentication as to whether the user is an authorized user. In other words, it is preferable that the vehicle control is performed only when the user is successfully authenticated. The authentication of the user itself may be performed by use of biometric information such as a fingerprint, an iris, a vein pattern, or the like of the user. Alternatively, the user may be indirectly authenticated by authenticating the mobile terminal 90 without directly authenticating the user itself. The authentication of the mobile terminal 90 by a wireless communication may be performed according to a well-known method such as a challenge response method. The function for authenticating the user (hereinafter referred to as a user authentication function may be provided in the authentication ECU 11 or in a separate ECU.

<Effects of the Present Embodiment>

In this example, the effects of the present embodiment will be described by introducing a first comparison configuration. In this example, the first comparison configuration is a configuration in which it is determined whether the mobile terminal 90 is present outside the vehicle compartment by comparing the reception strength in the vehicle interior communication device with one determination threshold. In the first comparison configuration, it is determined that the mobile terminal is present in the vehicle compartment when the vehicle interior strength is equal to or greater than the determination threshold, and it is determined that the mobile terminal is present outside the vehicle compartment when a mean strength of an RSSI is less than the determination threshold.

Figure 10:
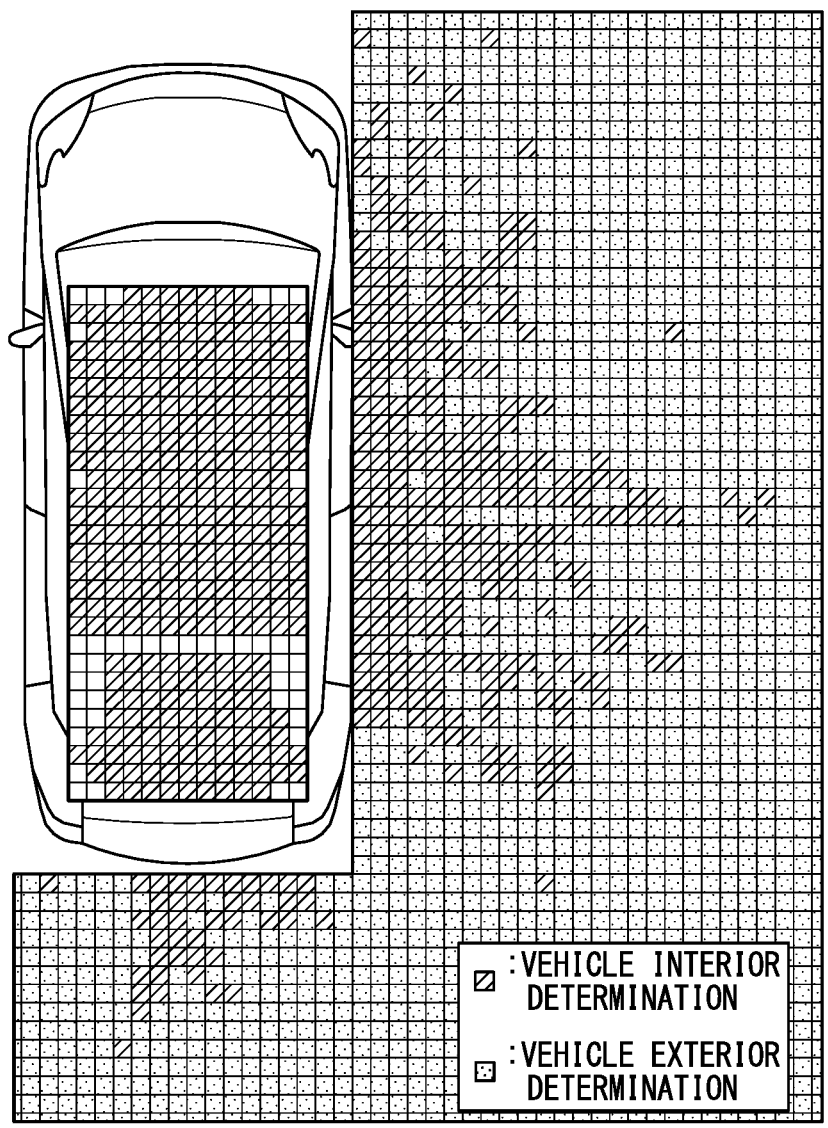
FIG. 10 is a diagram illustrating an operation of a first comparison configuration.

In the first comparison configuration described above, if a set value of the determination threshold value is too low, the possibility of erroneously determining that the mobile terminal is present in the vehicle compartment increases despite the fact that the mobile terminal is actually present outside the vehicle compartment. For example, if the determination threshold is set to a value low enough to determine that the mobile terminal is present in the vehicle compartment in the entire area of the vehicle compartment, as shown in FIG. 10, although the mobile terminal is actually present outside the vehicle compartment, some points may be erroneously determined to be present in the vehicle compartment. On the other hand, if the set value of the determination threshold is too high in the first comparison configuration, the possibility of erroneously determining that the mobile terminal is present outside the vehicle compartment increases despite the fact that the mobile terminal is actually present inside the vehicle compartment. Therefore, in view of the above circumstances, in the first comparison configuration, there is a need to set the determination threshold to a value at which erroneous determination is unlikely to occur.

On the other hand, according to the configuration of the present embodiment, it is determined whether the mobile terminal 90 is present in the vehicle compartment by comparing the vehicle interior strength with the vehicle exterior strength. In other words, the determination threshold may not be set. For that reason, there is no difficulty in designing the determination threshold.

Further, in the present embodiment, since the vehicle exterior communication device 12 is disposed in the vicinity of a window frame, that is, along a path of the radio wave from the vehicle exterior to the vehicle interior, when the signal from the mobile terminal 90 present outside the vehicle compartment is received by the vehicle interior communication device 13, there is a high possibility that the signal is also received by the vehicle exterior communication device 12. In addition, since the vehicle exterior communication device 12 is closer to the mobile terminal 90 than the vehicle interior communication device 13, the vehicle exterior strength tends to be higher than the vehicle interior strength.

Figure 11:
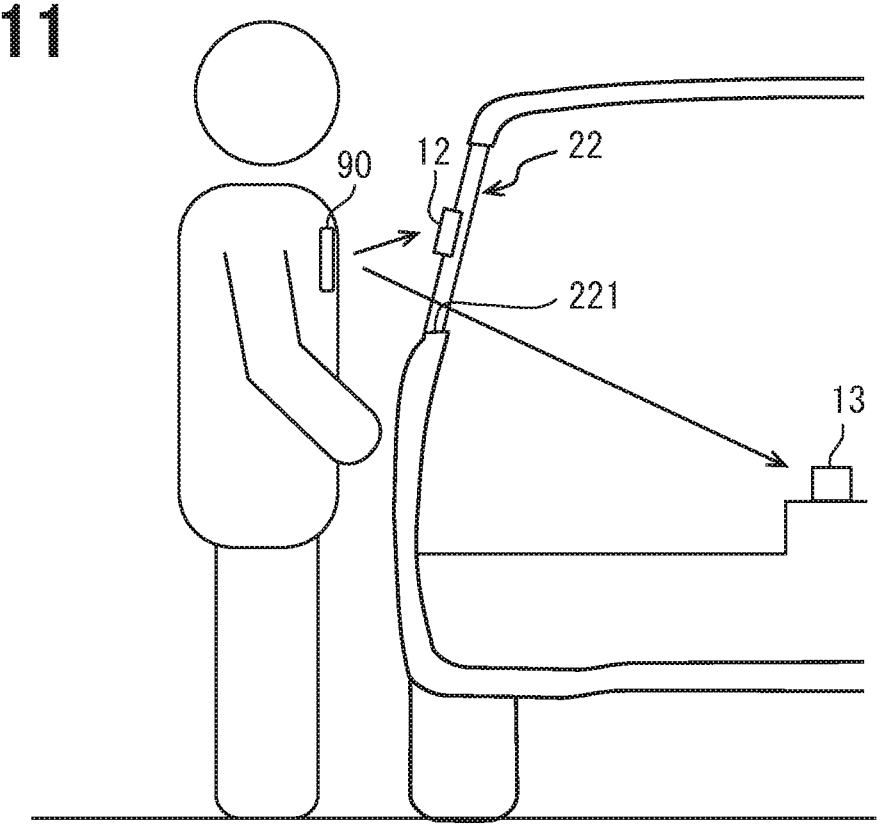
FIG. 11 is a diagram illustrating effects of the present embodiment.

It should be noted that the case in which the signal from the mobile terminal 90 present outside the vehicle compartment is received by the vehicle interior communication device 13 is the case in which the mobile terminal 90 is present in the vicinity of the window 22 outside the vehicle compartment as shown in FIG. 11. More specifically, for example, the case in which the user who accommodates the mobile terminal 90 in a chest pocket of a clothing stands in the vicinity of the door. In other words, when the user puts his hand on the door handle in a state in which the mobile terminal 90 is accommodated in the chest pocket of the clothing, the signal from the mobile terminal 90 present outside the vehicle compartment is likely to be received by the vehicle interior communication device 13.

However, as described above, since the vehicle exterior communication device 12 is closer to the mobile terminal 90 than the vehicle interior communication device 13, even when the signal from the mobile terminal 90 present outside the vehicle compartment is received by the vehicle interior communication device 13, the vehicle exterior strength becomes higher than the vehicle interior strength. In other words, the possibility of erroneously determining that the mobile terminal 90 is present in the vehicle compartment even though the mobile terminal 90 is present outside the vehicle compartment can be reduced.

Figure 12:
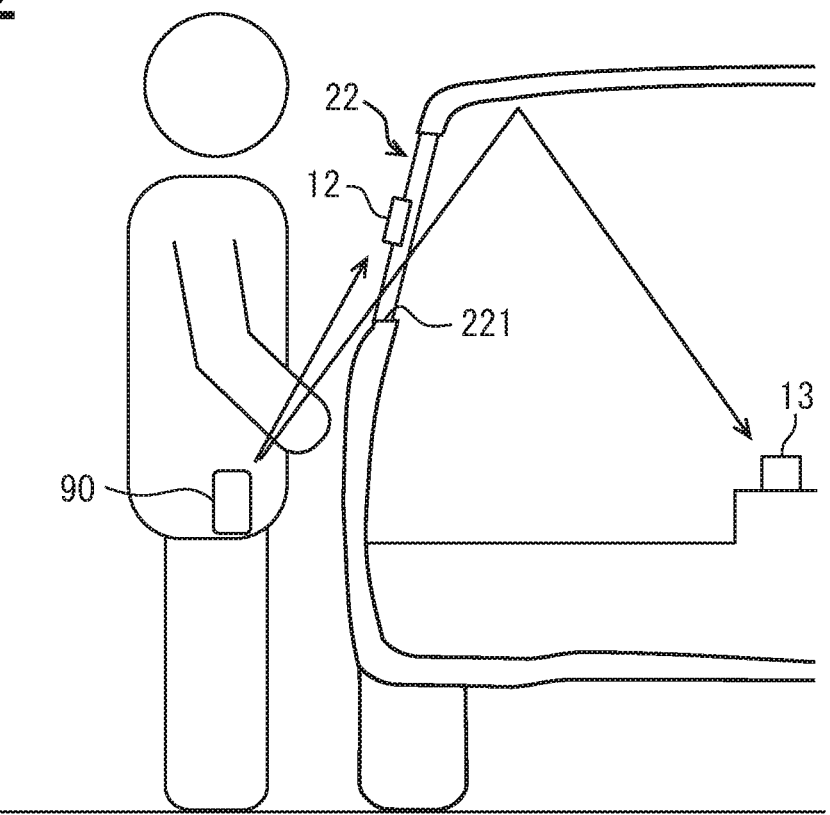
FIG. 12 is a diagram illustrating effects of the present embodiment.

As shown in FIG. 12, when the user has the mobile terminal 90 in a possession mode in which the mobile terminal 90 is located below a lower end of the window 22, the mobile terminal 90 is present out of sight of the vehicle interior communication device 13, and therefore, the vehicle interior communication device 13 cannot directly receive a signal from the mobile terminal 90. In the case where the mobile terminal 90 is located below the lower end of the window 22 outside the vehicle compartment, the signal from the mobile terminal 90 received by the vehicle interior communication device 13 is a signal (hereinafter, referred to as a reflected wave) reflected by a surface of the roof portion 23 on the vehicle interior side.

On the other hand, the vehicle exterior communication device 12 can directly receive the radio signal from the mobile terminal 90 even when the mobile terminal 90 is located below the lower end of the window 22 outside the vehicle compartment. The mode of directly receiving the radio signal from the mobile terminal 90 includes a mode of receiving the radio signal through a human body or clothing. Naturally, it is expected that the reception strength of a signal (hereinafter, referred to as a direct wave) which has propagated directly without being reflected by another object will be larger than the reception strength of a signal (that is, a reflected wave) that has been reflected by another object. Further, since the vehicle exterior communication device 12 is disposed in the vicinity of the window frame, that is, along the path of the radio wave from the vehicle exterior to the vehicle interior, when the signal from the mobile terminal 90 present outside the vehicle compartment is received by the vehicle interior communication device 13, there is a high possibility that the signal is also received by the vehicle exterior communication device 12.

Therefore, as shown in FIG. 12, even when the user possesses the mobile terminal 90 in a possession mode in which the mobile terminal 90 is located below the lower end of the window 22, the possibility of erroneously determining that the mobile terminal 90 is present in the vehicle compartment even though the mobile terminal 90 is present outside the vehicle compartment can be reduced. The case in which the mobile terminal 90 is positioned below the lower end of the window 22 is, for example, a case in which the user accommodates the mobile terminal 90 in a hand-held bag or a trouser pocket.

Figure 13:
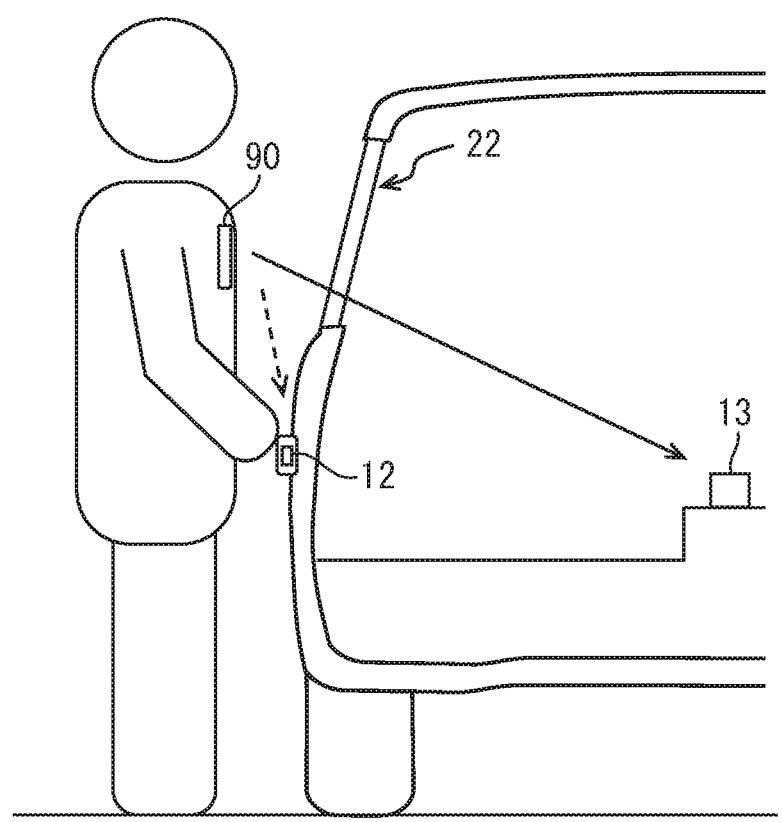
FIG. 13 is a diagram illustrating an operation of a second comparison configuration.

As another configuration (hereinafter, referred to as a second comparison configuration) for determining the position of the mobile terminal 90 by comparing the vehicle exterior strength with the vehicle interior strength, a configuration in which the vehicle exterior communication device 12 is disposed inside the door handle as shown in FIG. 13 is conceivable.

However, radio waves generally used in a short-range communication are high-frequency signals of 2.4 GHz or the like, and have a stronger rectilinearity than radio waves in a low-frequency (so-called LF: Low Frequency) band of 300 kHz or less. In other words, the propagation due to rounding (in other words, diffraction) is unlikely to occur.

Further, it is preferable that the vehicle exterior communication device 12 is disposed in such a posture that the directivity is substantially parallel to the horizontal plane of the vehicle. According to the above attachment posture, a wide communication area can be provided around the vehicle, and the short-range communication with the mobile terminal 90 in the process of the user approaching the vehicle can be performed. A placement mode in which the directivity is substantially parallel to the horizontal plane of the vehicle includes a mode in which the plane providing the omni-directivity in the omnidirectional antenna is disposed parallel to the horizontal plane of the vehicle. However, in the above attachment posture, the sensitivity of the vehicle exterior communication device 12 in an upward direction is deteriorated.

Further, in the mode in which the vehicle exterior communication device 12 is disposed inside the door handle, when the mobile terminal 90 is present in the vicinity of the window 22 outside the vehicle compartment, a distance from the mobile terminal 90 to the vehicle exterior communication device 12 becomes long as compared with the configuration of the present embodiment, and the reception strength tends to become a small value.

Figure 14:
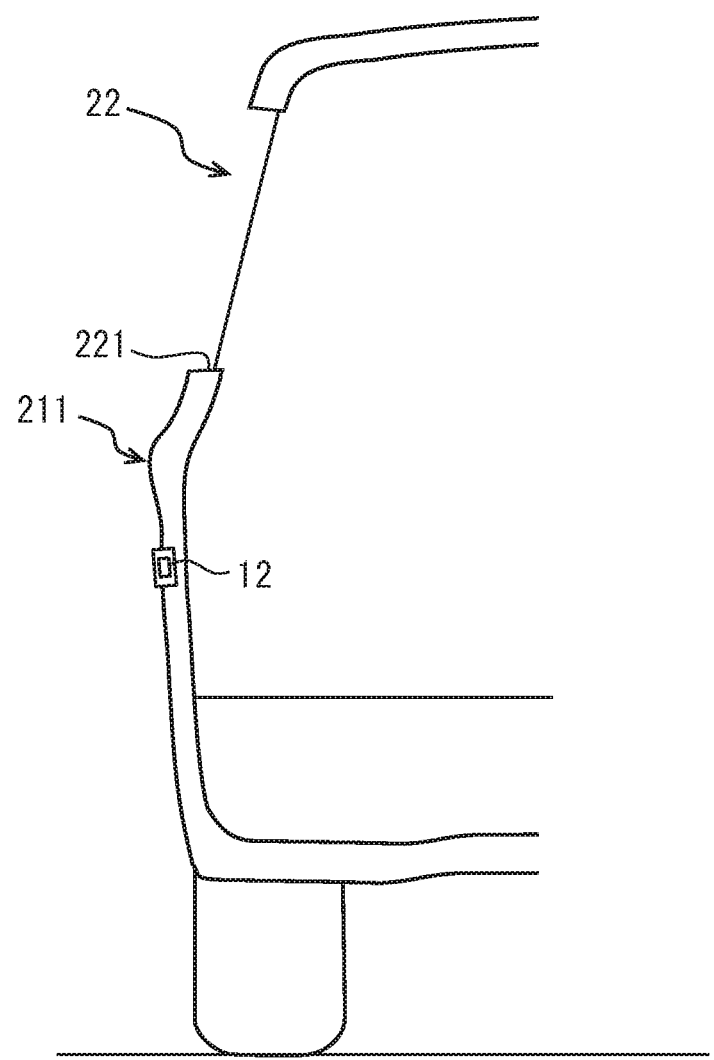
FIG. 14 is a diagram showing an example of a body shape in the case where the characteristics of the second comparison configuration remarkably appear.

In view of the above circumstances, in the second comparison configuration, the vicinity of the window is likely to be a region out of sight for the vehicle exterior communication device 12. Further, as shown in FIG. 14, such a tendency becomes remarkable in the case of a body shape in which a projection portion 211 is provided between the lower end 221 of the window 22 and the door handle. The projection portion 211 is a portion of the body 21 which protrudes outward in the vehicle width direction from the vehicle exterior communication device 12 (in other words, the vehicle exterior side).

As a result, when the mobile terminal 90 is present in the vicinity of the window 22 outside the vehicle compartment, in the second comparison configuration, the vehicle exterior strength tends to be relatively low. Therefore, when the mobile terminal 90 is present in the vicinity of the window 22 outside the vehicle compartment, the possibility that a magnitude relationship between the vehicle exterior strength and the vehicle interior strength is reversed becomes relatively high, and the possibility of erroneously determining that the mobile terminal 90 is present inside the vehicle compartment despite being present outside the vehicle compartment becomes high.

On the other hand, in the present embodiment, since the vehicle exterior communication device 12 is disposed in the vicinity of the window frame, that is, along the path of the radio wave from the vehicle exterior to the vehicle interior, the possibility that the vehicle exterior strength becomes lower than the vehicle interior strength is small, and the possibility of erroneously determining the position of the mobile terminal 90 can be reduced compared with the second comparison configuration. Further, in the second comparison configuration, the region in sight for the vehicle exterior communication device 12 is affected by the body shape, while in the present embodiment, the region in sight is not affected by the body shape of the vehicle Hv as in the second comparison configuration. Therefore, the present embodiment is suitable for application to various vehicle models.

In addition, in the configuration in which the vehicle exterior communication device 12 is provided in the door handle, when the user places his hand on the door handle, the signal from the mobile terminal 90 is attenuated by the user's hand, and there is a possibility that the vehicle exterior strength is further deteriorated. On the other hand, in the configuration of the present embodiment, even when the user is holding his/her hand on the door handle, there is no possibility that the signal from the mobile terminal 90 is attenuated by the user's hand. Therefore, the present embodiment is also suitable for a configuration in which the position of the mobile terminal 90 is estimated with the detection of the user touching the door handle by the touch sensor 14 as a trigger.

While the embodiments of the present disclosure have been described above, the present disclosure is not limited to the embodiments described above, and various modifications to be described below are included in the technical scope of the present disclosure, and may be implemented by various modifications within a scope not departing from the spirit in addition to the modifications to be described below. For example, various modifications to be described below can be implemented in combination as appropriate within a scope that does not cause technical inconsistency.

Members having the same functions as those described in the above embodiment are denoted by the same reference numerals, and a description of the same members will be omitted. When only a part of the configuration is referred to, the configuration of the embodiment described above can be applied to other parts.

(Modification 1)

In the embodiment described above, the mode in which the vehicle exterior communication device 12 is disposed in the middle portion of the B pillar 24B has been disclosed, but the present disclosure is not limited to the above example. The mounting position of the vehicle exterior communication device 12 may be a lower portion or an upper portion of the B pillar 24B. The lower portion of the B pillar 24B corresponds to a portion located on a lower side of three sections obtained by dividing the B pillar 24B into three equal portions in the vehicle height direction. The upper portion of the B pillar 24B corresponds to a portion located on an upper side of three sections obtained by dividing the B pillar 24B into three equal portions in the vehicle height direction.

Figure 15:
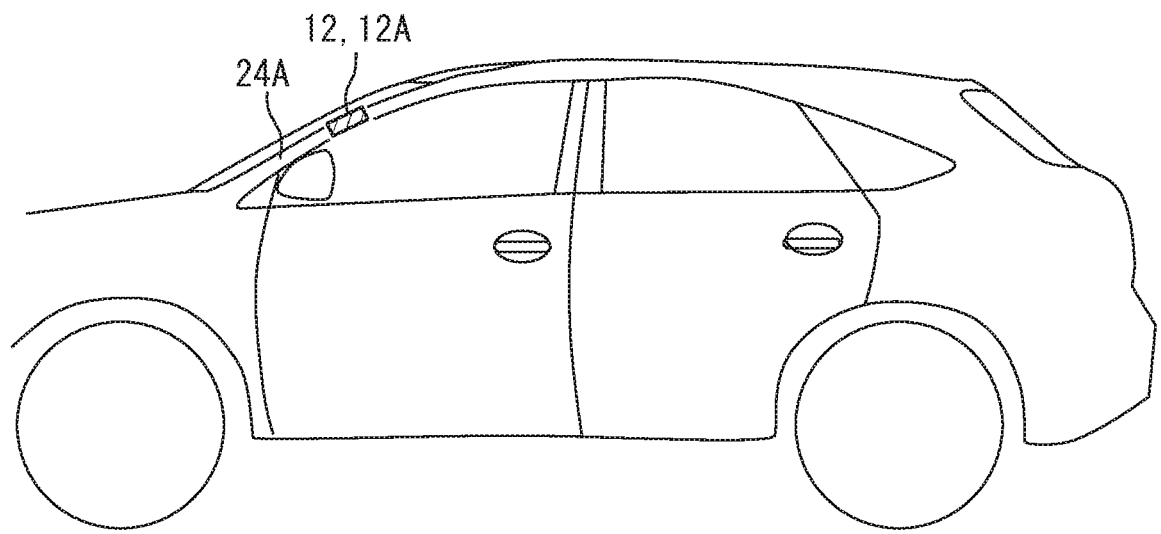
FIG. 15 is a diagram showing one modification of a mounting position of the vehicle exterior communication device.

The mounting position of the vehicle exterior communication device 12 may be the A pillar 24A as shown in FIG. 15. A specific installation position of the vehicle exterior communication device 12 in the A pillar 24A is preferably a middle portion, but may be a lower portion or an upper portion. Further, the mounting position of the vehicle exterior communication device 12 may be the C pillar 24C. In addition, the vehicle exterior communication devices 12 may be disposed in multiple pillars, such as the A pillar 24A and the B pillar 24B, the A pillar 24A and the C pillar 24C, and the like. The various pillars correspond to members present in a predetermined region in the outer surface portion of the vehicle Hv which can be regarded as the vicinity of the windows 22 of the vehicle Hv.

(Modification 2)

Figure 16:
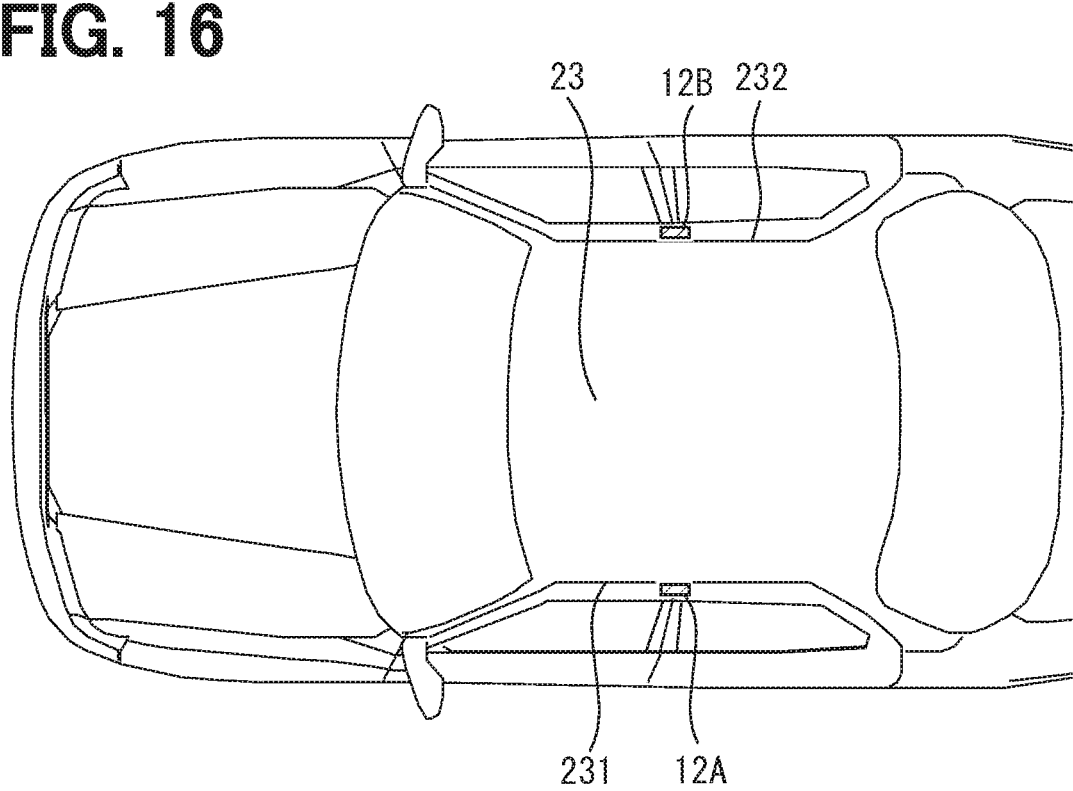
FIG. 16 is a diagram showing another modification of the mounting position of the vehicle exterior communication device.
Figure 17:
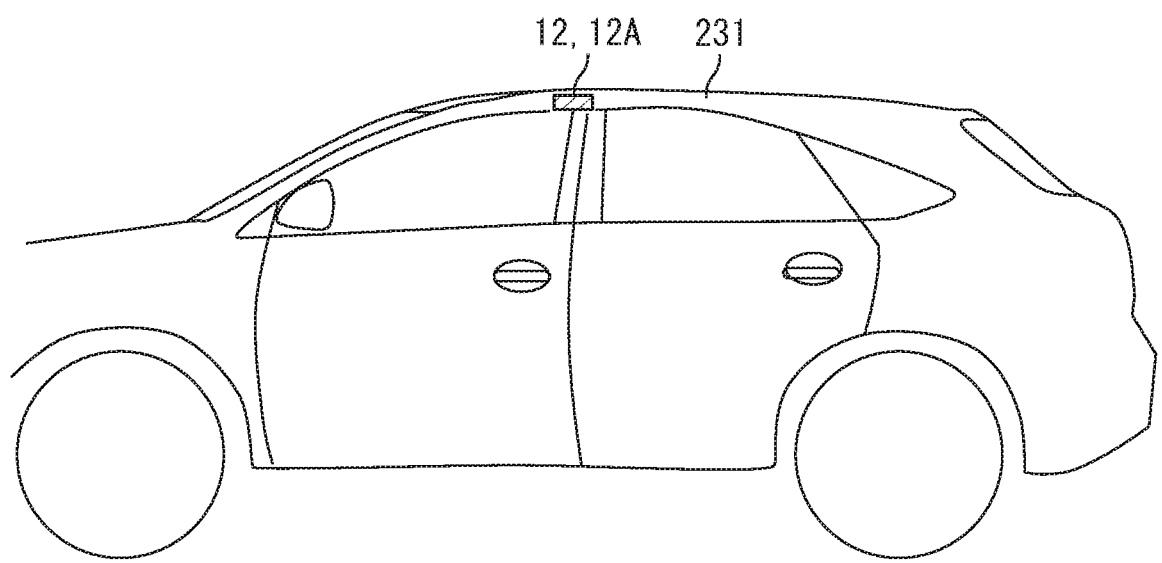
FIG. 17 is a diagram showing a modification of the mounting position of the vehicle exterior communication device.

As shown in FIGS. 16 and 17, the mounting position of the vehicle exterior communication device 12 may be disposed at a left roof end 231, which is a left end of the vehicle, and a right roof end 232, which is a right end of the vehicle, among the ends of the roof portion 23.

The left roof end 231 is a region corresponding to a boundary between the roof portion 23 and the side surface on the left side of the vehicle Hv. The left roof end 231 corresponds to a side surface on the left side of the roof portion 23. In addition, according to another aspect, the left roof end 231 corresponds to a portion that is in contact with the upper end of the door provided on the left side of the vehicle Hv. Further, the left roof end 231 corresponds to a portion located on the upper side of the window 22 provided on the left side of the vehicle Hv in the side surface on the left side of the vehicle Hv.

The right roof end 232 is a region corresponding to a boundary between the roof portion 23 and the side surface on the right side of the vehicle Hv. The right roof end 232 corresponds to the side surface on the right side of the roof portion 23. Further, according to another aspect, the right roof end 232 corresponds to a portion which is in contact with the upper end of the door provided on the right side of the vehicle Hv. Further, the right roof end 232 corresponds to a portion located on the upper side of the window 22 provided on the right side of the vehicle Hv in the side surface on the right side of the vehicle Hv.

In other words, the vehicle exterior communication device 12 may be disposed in a region corresponding to a boundary portion between the roof portion 23 and the side surface. In the mode described above, when the omnidirectional antenna is employed as the vehicle exterior antenna 121, it is preferable that the vehicle exterior communication device 12 is disposed outside the vehicle compartment in the portion where the metal member is disposed in the region corresponding to the boundary portion between the roof portion 23 and the side surface. When the vehicle exterior communication device 12 is disposed at the position described above, it is preferable that the vehicle exterior communication device 12 is amounted in a posture where the center of the directivity is directed downward by about several degrees to 30 degrees from the horizontal plane of the vehicle.

The same effects as those of the embodiment described above can be obtained by the configuration described above. The left roof end 231 and the right roof end 232 correspond to a portion in which a distance from the upper end of the window 22 falls within a preset distance which can be regarded as the vicinity of the window 22 in the outer surface of the vehicle Hv. The distance that can be regarded as the vicinity of the window 22 may be appropriately designed, and is set to, for example, 10 cm or the like. Further, the distance that can be regarded as the vicinity of the window 22 may be set to, for example, about 1 time of the wavelength of the radio wave used in the system. If a radio wave in the 2.4 GHz band is employed as the radio wave used in the system, a wavelength of the radio wave in the 2.4 GHz band is about 12.5 cm, and therefore the distance that can be regarded as the vicinity of the window 22 may be set to 12.5 cm. It is needless to say that the distance that can be regarded as the vicinity of the window 22 may be 5 cm or the like.

(Modification 3)

In the embodiments and various modifications described above, although the vehicle exterior communication device 12 is disposed outside the vehicle compartment of the portion where the metal member is disposed in the region where the distance from the window 22 falls within the predetermined distance that can be regarded as the vicinity of the window 22 (hereinafter, referred to as a window vicinity region), the present disclosure is not limited to the above configuration.

Figure 18:
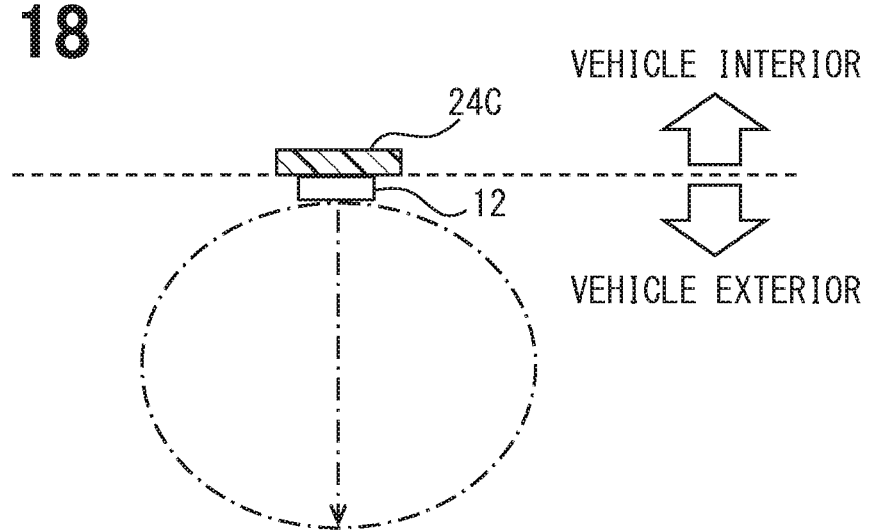
FIG. 18 is a conceptual diagram illustrating an attachment posture of a vehicle exterior communication device using a directional antenna.

In the case where the vehicle exterior antenna 121 is a directional antenna, in the window vicinity region, as shown in FIG. 18, the center of the directivity of the vehicle exterior antenna 121 may be disposed in a posture facing the vehicle exterior, and the material of the portion to which the vehicle exterior communication device 12 is attached may not be metal. According to the configuration described above, even if the C pillar 24C is made of resin, the C pillar 24C can be adopted as a mounting destination of the vehicle exterior communication device 12. FIG. 18 is a diagram conceptually showing an attachment posture and directivity of the vehicle exterior communication device 12 to the C pillar 24C, which is a diagram when the C pillar 24C and the like are viewed from above the vehicle Hv. An ellipse of a one-point chain line in FIG. 18 indicates the directivity of the vehicle exterior communication device 12, and an arrow of a chain line indicates the center of the directivity. The window vicinity region corresponds to a predetermined region which can be regarded as the vicinity of the window 22 in the outer surface of the vehicle Hv.

(Modification 4)

As described above, a mode in which the vehicle exterior communication device 12 is provided in the vicinity of the side window, such as a pillar, has been disclosed, but the present disclosure is not limited to the above example. The vehicle exterior communication device 12 may be provided in the vicinity of the front window or in the vicinity of the rear window.

Second Embodiment

Figure 19:
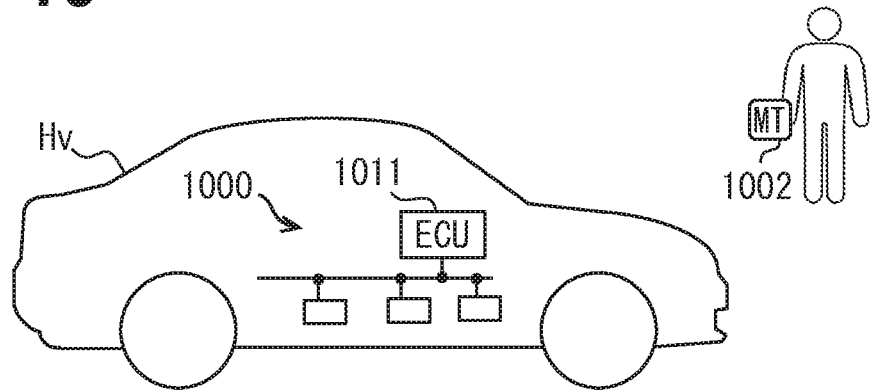
FIG. 19 is a diagram illustrating a schematic configuration of a vehicle electronic key system.

Hereinafter, an example of an embodiment of the position determination system for a vehicle according to the present disclosure will be described with reference to the drawings. FIG. 19 is a diagram showing an example of a schematic configuration of a vehicle electronic key system to which the position determination system for a vehicle according to the present disclosure is applied. As shown in FIG. 19, the vehicle electronic key system includes an in-vehicle system 1000 mounted on a vehicle Hv, and a mobile terminal (MT) 1002 which is a communication terminal carried by a user of the vehicle Hv.

Each of the in-vehicle system 1000 and the mobile terminal 1002 is configured to be capable of performing a communication conforming to a predetermined short-range wireless communication standard whose communication range is, for example, at most about several tens of meters (hereinafter, referred to as short-range wireless communication). In this example, as the short-range wireless communication standard, for example, Bluetooth Low Energy (Bluetooth is a registered trademark, Wi-Fi (registered trademark), ZigBee (registered trademark), or the like can be adopted.

The mobile terminal 1002 is associated with the in-vehicle system 1000 and functions as an electronic key of the vehicle Hv. The mobile terminal 1002 may be any device that can be carried by a user and has the short-range communication function described above. For example, a smartphone can be used as the mobile terminal 1002. It is needless to say that the mobile terminal 1002 may be a tablet terminal, a wearable device, a portable music player, a portable game machine, or the like. The signal transmitted by the mobile terminal 1002 as the short-range communication includes transmission source information. The transmission source information is, for example, unique identification information (hereinafter, referred to as a terminal ID) assigned to the mobile terminal 1002. The terminal ID functions as information for identifying another communication terminal and the mobile terminal 1002.

The mobile terminal 1002 wirelessly transmits communication packets including transmission source information at a predetermined transmission interval, thereby notifying the surrounding communication terminal having the short-range communication function of the presence of the mobile terminal 90 itself (that is, advertising). In the following description, for convenience, the communication packets periodically transmitted for advice are referred to as advertisement packets.

A transmission interval of the advertisement packet may be variable according to the operation state of the mobile terminal 1002. For example, when a predetermined application using the short-range communication function is operating in a foreground in the mobile terminal 1002, the transmission interval is set to a relatively short time (for example, 50 milliseconds). On the other hand, if the application is not operating in the foreground, the transmission interval is set to a relatively long time (200 milliseconds). The mobile terminal 1002 may be configured to transmit the advertisement packet at least once in a predetermined time (for example, 200 milliseconds) defined by the vehicle electronic key system.

The in-vehicle system 1000 receives a signal (for example, an advertisement packet) transmitted from the mobile terminal 1002 by the short-range communication function described above, thereby detecting that the mobile terminal 1002 is present within a range in which the in-vehicle system 1000 can perform a short-range communication. In the following description, a range in which the in-vehicle system 1000 can mutually communicate data with the mobile terminal 1002 by the short-range communication function is also called a communication area.

In the present embodiment, as an example, the in-vehicle system 1000 is configured to detect the presence of the mobile terminal 1002 in the communication area by receiving the advertisement packets sequentially transmitted from the mobile terminal 1002, but the present disclosure is not limited to the above configuration. As another aspect, the in-vehicle system 1000 may be configured to sequentially transmit advertisement packets and detect the presence of the mobile terminal 1002 in the communication area based on the establishment of a communication connection (so-called connection) with the mobile terminal 1002.

<Configuration of Vehicle Hv>

First, a configuration of the vehicle Hv will be described. The vehicle Hv is, for example, a passenger vehicle. As an example, the vehicle Hv includes a front seat and a rear seat, and a driver's seat (in other words, a steering wheel) is provided on the right side. At a rear end of a vehicle interior space of the vehicle Hv, a space functioning as a trunk (in other words, boot) is disposed. In other words, a space for the rear seat of the vehicle Hv communicates with the trunk through an upper part of a backrest portion 1042 for the rear seat.

The vehicle Hv may have a structure other than the example described above. For example, the vehicle Hv may be a vehicle provided with the driver's seat on the left side. The vehicle Hv may be a vehicle without a rear seat. In addition, the vehicle Hv may be provided with a trunk independent of the vehicle interior space. The vehicle may include multiple rows of rear seats. The vehicle Hv may be a motor truck such as a truck. The vehicle Hv may be a camping vehicle.

In addition, the vehicle Hv may be a vehicle provided for a vehicle rental service (so-called rental vehicle) or a vehicle provided for a car-sharing service (so-called share vehicle). The share car also includes a vehicle used for a service of lending a personally owned vehicle to another person during a time period when the administrator of the vehicle is not using the vehicle. In the case where the vehicle Hv is a vehicle provided with the above service (hereinafter, referred to as a service vehicle), a person who is contracting to use the service may be a user. In other words, a person who has the right to use the vehicle Hv can be a user.

Various body panels of the vehicle Hv are realized by using metal members. In this example, the body panel is a component group that provides an appearance shape of the vehicle Hv. The body panels include side body panels, a roof panel, a rear end panel, an engine hood panel, door panels, pillars, and the like which are assembled to a body shell. In the following description, a configuration including a combination of the various body panels is referred to as a body.

Since the metal plate has a property of reflecting radio waves, the body panel of the vehicle Hv reflects radio waves used. In other words, the vehicle Hv includes the body that blocks the linear propagation of the radio waves. In this example, the radio wave refers to a radio wave in a frequency band (here, a GH band) used for a wireless communication between the in-vehicle system 1000 and the mobile terminal 1002. The body shell itself may be formed of a metal member such as a steel plate, or may be made of a carbon-based resin. As a more preferable mode, the body shell is also made of metal.

The blocking referred to in the present specification is ideally reflection, but is not limited to the reflection. A configuration capable of attenuating the radio wave to a predetermined level (hereinafter, referred to as target attenuation level) or more corresponds to a configuration for blocking propagation of the radio wave. The target attenuation level may be a value at which a significant difference occurs between the signal strengths of the radio waves inside and outside the vehicle compartment, and is set to, for example, 10 dB. The target attenuation level can be set to an arbitrary value from 5 dB to 20 dB.

The vehicle Hv has a roof portion provided by the roof panel, and includes multiple pillars which are members for supporting the roof panel. The multiple pillars are called A pillars, B pillars, and C pillars in a stated order from a front end to a rear end. The vehicle Hv includes A pillars, B pillars, and C pillars as pillars. The A pillars are pillars provided in front of the front seat. The B pillars are pillars provided between the front seat and the rear seat. The C pillars are pillars provided obliquely behind the rear seat.

As another mode, the vehicle Hv may include D pillars, which are fourth pillars from the front, and E pillars, which are fifth pillars. Part or all of each pillar is formed of a metal member such as a high tensile strength steel plate. As another mode, the pillar may be made of carbon fiber or resin. In addition, the pillar may be made of the combination of various materials.

<Configuration of In-Vehicle System 1000>

Figure 20:
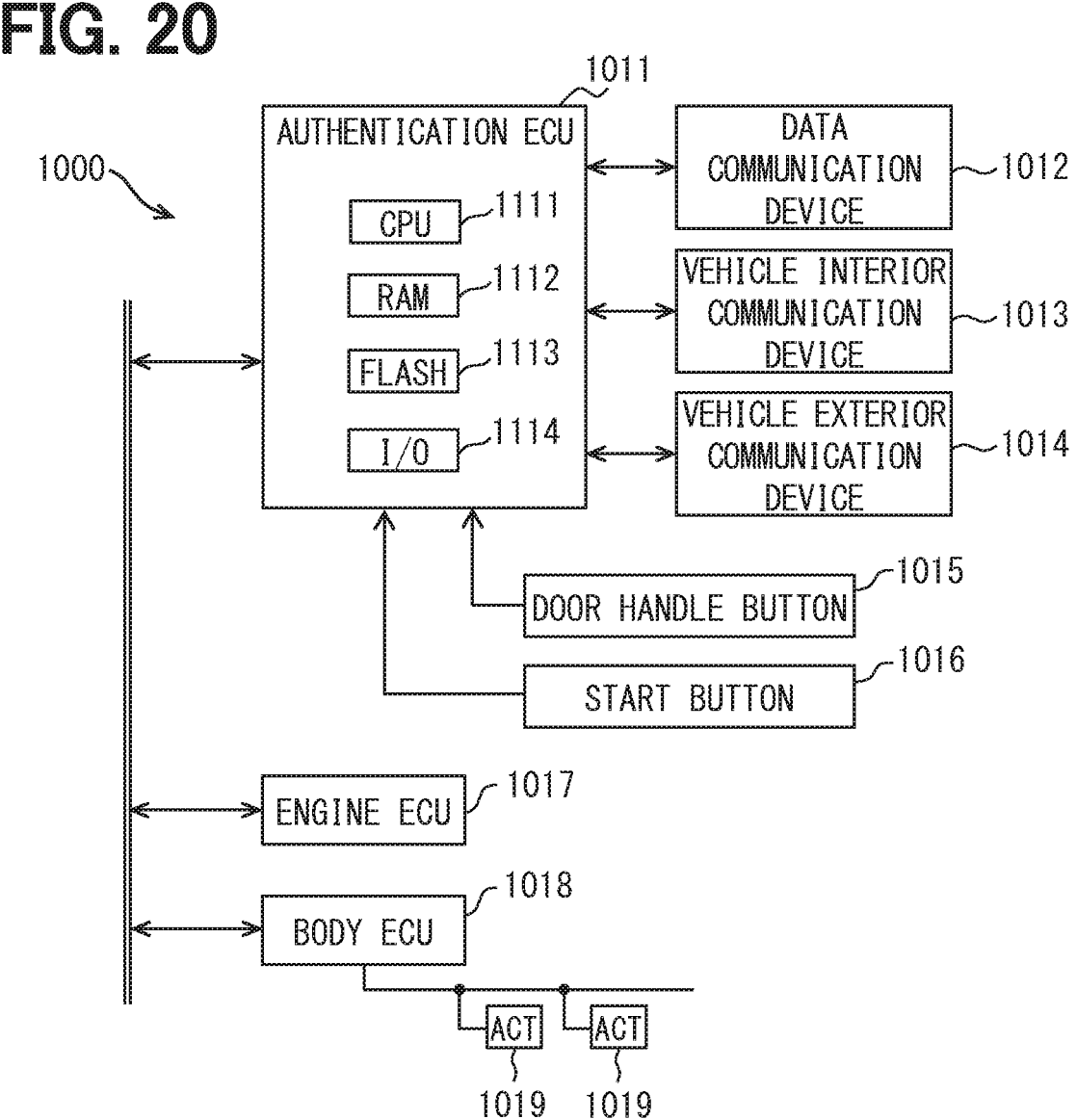
FIG. 20 is a block diagram showing a schematic configuration of the in-vehicle system.

Next, the configuration and operation of the in-vehicle system 1000 will be described. As shown in FIG. 20, the in-vehicle system 1000 includes an authentication ECU 1011, a data communication device 1012, a vehicle interior communication device 1013, a vehicle exterior communication device 1014, a door handle button 1015, a start button 1016, an engine ECU 1017, and a body ECU 1018. The ECUs in the member names are abbreviations of Electronic Control Unit and mean electronic control units.

The authentication ECU 1011 is generally an ECU that determines the position of the mobile terminal 1002 by cooperation (in other words, collaboration) with the data communication device 1012 or the like and realizes a vehicle control according to the determination result by cooperation with other ECUs. The authentication ECU 1011 is implemented by use of a computer. In other words, the authentication ECU 1011 includes a CPU 1111, RAM 1112, a flash memory 1113, an I/O 1114, a bus line for connecting those components, and the like. The authentication ECU 1011 may be realized by use of an MPU or a GPU instead of the CPU 1111. The authentication ECU 1011 may be realized by a combination of the CPU 1111, an MPU, and a GPU.

The CPU 1111 is an arithmetic processing unit that executes various calculation processing. The RAM 1112 is a volatile storage medium, and the flash memory 1113 is a rewritable non-volatile storage medium. The I/O 1114 is a circuit module that functions as an interface for the authentication ECU 1011 to communicate with other devices mounted on the vehicle Hv, such as the data communication device 1012. The I/O 1114 may be realized by use of an analogue circuit element, an IC, or the like.

A terminal ID assigned to the mobile terminal 1002 owned by the user is registered in the flash memory 1113. The flash memory 1113 stores a program (hereinafter, referred to as a position determination program) for causing a normal computer to function as the authentication ECU 1011. It should be noted that the position determination program described above may be stored in a non-transitory substantial recording medium (non-transitory tangible storage medium). The execution of the position determination program by the CPU 1111 corresponds to the execution of a process corresponding to the position determination program.

Further, the flash memory 1113 stores two parameters, that is, an interior equivalent value Pin and an exterior equivalent value Pout, as determination thresholds for determining whether the mobile terminal 1002 is present in the vehicle compartment based on the reception strength of a signal from the mobile terminal 1002 by the authentication ECU 1011. The interior equivalent value Pin is a threshold for determining that the mobile terminal 1002 is present in the vehicle compartment. The exterior equivalent value Pout is a threshold for determining that the mobile terminal 1002 is present outside the vehicle compartment. The technical significance and setting method of the interior equivalent value Pin and the exterior equivalent value Pout will be described later.

The authentication ECU 1011 will be described in detail later. It should be noted that even when a traveling power supply (for example, ignition power supply) of the vehicle Hv is turned off, the authentication ECU 1011 is configured to be supplied with enough power from a vehicle-mounted battery in order to execute a position determination process (to be described later).

Each of the data communication device 1012, the vehicle interior communication device 1013, and the vehicle exterior communication device 1014 is a communication module for performing a short-range communication (hereinafter, referred to as a short-range communication device). The data communication device 1012 is responsible for transmitting and receiving data to and from the mobile terminal 1002 by the authentication ECU 1011. The vehicle interior communication device 1013 and the vehicle exterior communication device 1014 serve to provide the reception strength of the signals transmitted from the mobile terminal 1002 to the authentication ECU 1011.

The data communication device 1012, the vehicle interior communication device 1013, and the vehicle exterior communication device 1014 differ only in the service to be handled, and can be realized by use of the short-range communication device 1003 having the same configuration. In the following description, when the data communication device 1012, the vehicle interior communication device 1013, and the vehicle exterior communication device 1014 are distinguished from each other, those communication devices are described as the short-range communication devices 1003. The short-range communication devices 1003 are connected to the authentication ECU 1011 through a dedicated communication line or an in-vehicle network so as to be able to communicate with each other.

Figure 21:
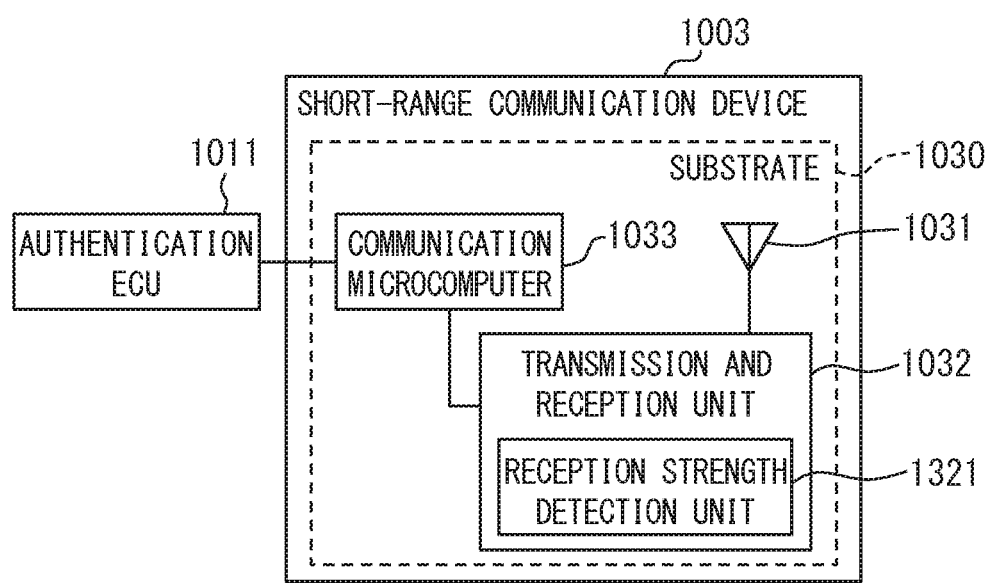
FIG. 21 is a block diagram showing a schematic configuration of a short-range communication device.

FIG. 21 schematically shows an electrical configuration of the short-range communication device 1003. As shown in FIG. 21, the short-range communication device 1003 includes a substrate 1030, an antenna 1031, a transmission and reception unit 1032, and a communication microcomputer 1033. The substrate 1030 is, for example, a printed circuit board. The substrate 1030 is provided with electronic components configuring the short-range communication device 1003 such as the antenna 1031, for example.

The antenna 1031 is an antenna for transmitting and receiving radio waves in a frequency band (for example, GHz band) used in the short-range communication. In the present embodiment, as an example, the antenna 1031 is an omnidirectional antenna. As another mode, the antenna 1031 may have directivity. The antenna 1031 is preferably a patterned antenna formed on the substrate 1030 in order to reduce a thickness of the short-range communication device 1003. The antenna 1031 is electrically connected to the transmission and reception unit 1032.

The transmission and reception unit 1032 demodulates a signal received by the antenna 1031 and provides the demodulated signal to the communication microcomputer 1033. Further, the transmission and reception unit 1032 modulates the signal input from the authentication ECU 1011 through the communication microcomputer 1033, and outputs the modulated signal to the antenna 1031, and radiates the output signal as a radio wave. The transmission and reception unit 1032 is connected to the communication microcomputer 1033 so as to be able to communicate with each other.

In addition, the transmission and reception unit 1032 includes a reception strength detection unit 1321 that sequentially detects the strength of the signal received by the antenna 1031. The reception strength detection unit 1321 can be realized by various circuit configurations. The reception strength detected by the reception strength detection unit 1321 is sequentially provided to the communication microcomputer 1033 in association with the terminal ID included in the reception data. The reception strength may be expressed by, for example, a unit [dBm] of power. For convenience, data in which the reception strength and the terminal ID are associated with each other is referred to as reception strength data.

The communication microcomputer 1033 is a microcomputer for controlling the transfer of data with the authentication ECU 1011. The communication microcomputer 1033 is realized by use of an MPU, a RAM, a ROM, or the like. The communication microcomputer 1033 provides the reception data input from the transmission and reception unit 1032 to the authentication ECU 1011 sequentially or on the basis of a request from the authentication ECU 1011. In other words, the data received by the transmission and reception unit 1032 is provided to the authentication ECU 1011 through the communication microcomputer 1033.

The communication microcomputer 1033 also has a function of authenticating the terminal ID of the mobile terminal 1002, and performing a cryptographic communication with the mobile terminal 1002 on the basis of a request from the authentication ECU 1011. As an encryption method, various methods such as a method specified by Bluetooth can be used. Various methods, such as the method specified in Bluetooth, can also be used for the ID-authentication method.

In addition, when the communication microcomputer 1033 acquires the reception strength data from the reception strength detection unit 1321, the communication microcomputer 1033 accumulates the reception strength data in a RAM (not shown). The reception strength data sequentially acquired may be sorted in chronological order and stored in the RAM so that the reception strength of the latest reception data becomes a head, for example. The data that has been stored for a certain period of time may be sequentially discarded. In other words, the reception strength data is held in the RAM for a predetermined time. The communication microcomputer 1033 provides the reception strength data accumulated in the RAM based on the request from the authentication ECU 1011. The reception strength data provided to the authentication ECU 1011 may be deleted from the RAM.

In the present embodiment, the reception strength data output by the transmission and reception unit 1032 is once held in the RAM, and the communication microcomputer 1033 provides the reception strength data accumulated in the RAM to the authentication ECU 1011 based on a request from the authentication ECU 1011, but the present disclosure is not limited to the above configuration. The reception strength data may be sequentially provided to the authentication ECU 1011.

The data communication device 1012 is a short-range communication device 1003 that has already executed a key exchange protocol (so-called pairing) with the mobile terminal 1002 based on the operation by the user or the like. Information about the mobile terminal 1002 acquired by pairing (hereinafter, referred to as terminal information) is stored in a non-volatile memory included in the communication microcomputer 1033. The terminal information is, for example, a key exchanged by pairing, a terminal ID, or the like. Storage of the exchanged keys is also referred to as bonding. When the vehicle Hv is used by multiple users, the terminal information of the mobile terminal 1002 held by each user is stored.

When the data communication device 1012 receives the advertisement packet from the mobile terminal 1002, the data communication device 1012 automatically establishes a communication connection with the mobile terminal 1002 by use of the storage terminal information. Then, the authentication ECU 1011 transmits and receives data to/from the mobile terminal 1002. Incidentally, when establishing the communication connection with the mobile terminal 1002, the data communication device 1012 provides the terminal ID of the mobile terminal 1002 which is in a communication connection to the authentication ECU 1011.

According to the Bluetooth standard, an encrypted data communication is performed by a frequency hopping method. The frequency hopping method is a communication system in which channels to be used for a communication are successively switched to another with time. Specifically, in the Bluetooth standard, the data communication is performed by a frequency hopping spread spectrum (FHSS) method.

In the Bluetooth Low Energy (hereinafter, referred to as Bluetooth LE), 40 channels from No. 0 to No. 39 are prepared, and 37 channels from No. 0 to No. 36 are available for a data communication. The three channels from No. 37 to No. 39 are used for transmission of the advertisement packets.

In a state where the communication connection with the mobile terminal 1002 is established, the data communication device 1012 performs transmission and reception of data with the mobile terminal 1002 while sequentially changing 37 channels. At that time, the data communication device 1012 sequentially provides information indicating a channel used for a communication with the mobile terminal 1002 (hereinafter, referred to as channel information) to the authentication ECU 1011. The channel information may be a specific channel number, or may be a parameter (so-called hopincrement) indicating a transition rule of a used channel. The Hopincrement is a number from 5 to 16 that is randomly determined during the communication connection. The channel information preferably includes a present channel number and a Hopincrement.

It is preferable that the data communication device 1012 is disposed at a position where the vicinity of the door in the vehicle interior and the vehicle exterior can come in sight. The position at which the vicinity of the door in the vehicle interior and the vehicle exterior can come in sight is, for example, a ceiling portion in the vehicle compartment. Further, if the vehicle Hv is provided with a pillar made of resin, the pillar portion also corresponds to a position at which the vicinity of the door in the vehicle interior and the vehicle exterior can come in sight. As an example, the data communication device 1012 according to the present embodiment is disposed in the vicinity of the center of the ceiling portion in the vehicle compartment.

An area in sight for the short-range communication device 1003 is a region in which a signal transmitted from the short-range communication device 1003 is directly reachable. Since the propagation path of the radio signal is reversible, the area in sight for a certain short-range communication device 1003 corresponds to a region in which the short-range communication device 1003 can directly receive the signal transmitted from the mobile terminal 1002.

An area out of sight for the short-range communication device 1003 is a region in which the signal transmitted from the short-range communication device 1003 is not directly reachable. Since the propagation path of the radio signal is reversible, the out-of-sight for a certain short-range communication device 1003 corresponds to a region in which the short-range communication device 1003 cannot directly receive a signal transmitted from the mobile terminal 1002. Even when the mobile terminal 1002 is present out of sight of the short-range communication device 1003, the signal transmitted from the mobile terminal 1002 can reach the area out of sight by being reflected by various structures. In other words, even when the mobile terminal 1002 is present out of sight of the data communication device 1012, the mobile terminal 1002 and the data communication device 1012 can perform a wireless communication with each other due to reflection in a structure or the like.

In the present embodiment, the number of data communication devices 1012 provided in the vehicle Hv is one, but the present disclosure is not limited to the above example. Multiple short-range communication devices 1003 as the data communication device 1012 may be provided in the vehicle Hv. In addition, a part of a vehicle interior communication device 1013 and a vehicle exterior communication device 1014, which will be described later, may be set so as to function as the data communication device 1012.

Figure 22:
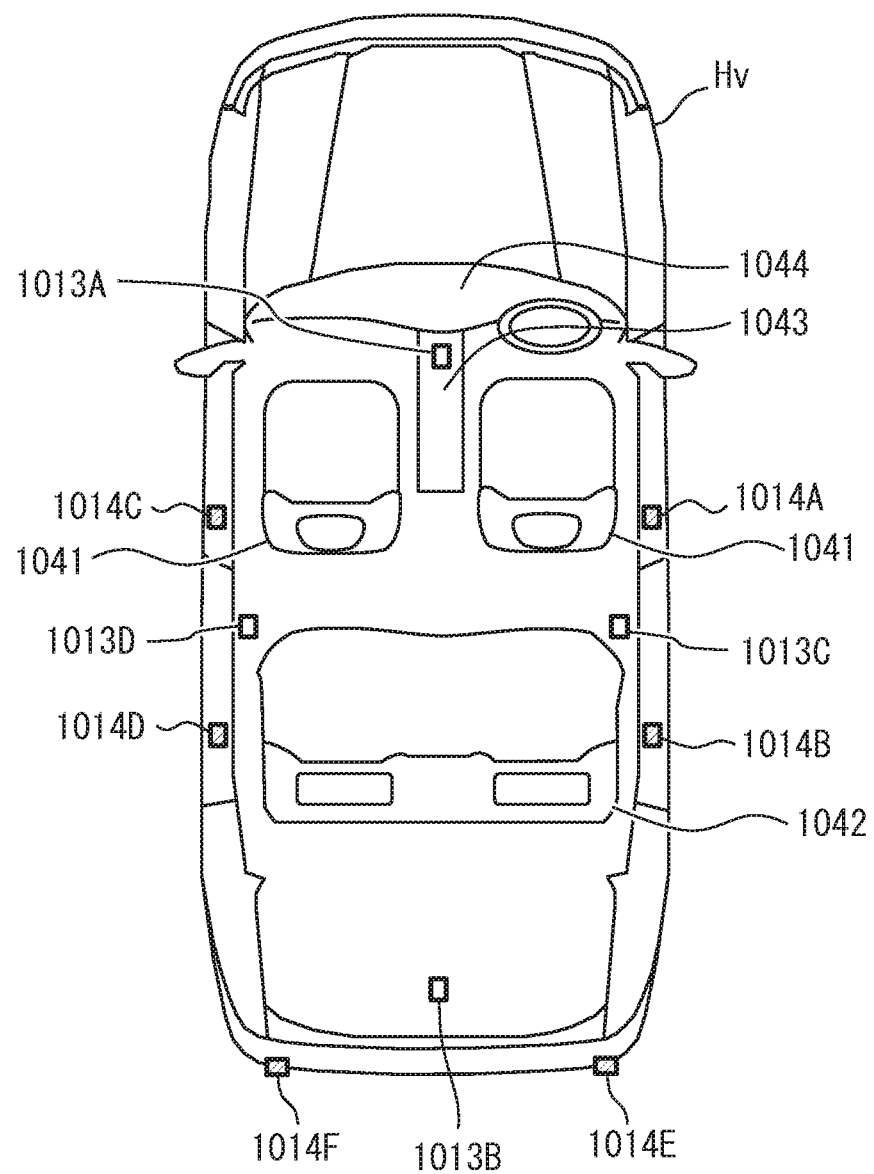
FIG. 22 is a conceptual diagram showing an example of the mounting position of the short-range communication device.

At least one vehicle interior communication device 1013 is provided in the vehicle compartment. Although only one vehicle interior communication device 1013 is illustrated in FIG. 20 for convenience, the in-vehicle system 1000 may include multiple vehicle interior communication devices 1013. As shown in FIG. 22, the in-vehicle system 1000 according to the present embodiment includes a front area communication device 1013A, a trunk area communication device 1013B, a rear area first communication device 1013C, and a rear area second communication device 1013D as the vehicle interior communication devices 1013. FIG. 22 is a conceptual top view of the vehicle Hv, and shows a roof portion in a transparent manner in order to describe the installation positions of various vehicle interior communication devices 1013 and various vehicle exterior communication devices 1014.

In the present specification, for convenience, a vehicle interior space, which is located forward of backrest portions 1041 of the front seats in the vehicle, is referred to as a front area. The front area also includes a vehicle interior space above an instrument panel 1044. In addition, a vehicle interior space, which is located rearward of the backrest portions 1041 of the front seats and forward of backrest portions 1042 of the rear seats in the vehicle, is referred to as a rear area. Further, a vehicle interior space, which is located rearward of the backrest portions 1042 of the rear seats in the vehicle, is referred to as a trunk area. The trunk area is an area corresponding to the trunk.

The front area communication device 1013A is a vehicle interior communication device 1013 for bringing the front area into a strong electric field area. Here, the strong electric field area is an area in which a signal transmitted from the short-range communication device 1003 propagates while maintaining a strength equal to or higher than a predetermined threshold (hereinafter, referred to as a strong electric field threshold). The strong electric field threshold is set to a sufficiently strong level as a signal for the short-range communication. For example, the strong electric field threshold is −35 dBm (−0.316 μW). Since the propagation path of the radio signal is reversible, according to another aspect, the strong electric field area is also an area in which the reception strength of the signal transmitted from the mobile terminal 1002 in the short-range communication device 1003 is equal to or higher than the strong electric field threshold. A region of 0.8 m or less from the short-range communication device 1003 tends to be a strong electric field area. When the mobile terminal 1002 is present in the strong electric field area of the front area communication device 1013A, the reception strength of the signal from the mobile terminal 1002 becomes a sufficiently strong level.

In the front area communication device 1013A, it is preferable that the vehicle interior communication device 1013 is provided at a position where the vehicle exterior is out of sight. The front area communication device 1013A is disposed, for example, in the vicinity of a boundary between a center console 1043 and the instrument panel 1044. The installation position of the front area communication device 1013A is not limited to the above example. For example, the front area communication device 1013A may be disposed on the foot of the driver's seat or on the side surface of the door for the driver's seat inside the vehicle compartment. The front area communication device 1013A may be disposed at a position appropriately designed around the front seat so that the front area becomes a strong electric field area.

The trunk area communication device 1013B is a vehicle interior communication device 1013 for bringing the trunk area into a strong electric field area. The trunk area communication device 1013B is also preferably disposed at a position where the vehicle exterior is likely to be out of sight. For example, the trunk area communication device 1013B is disposed at the center of the floor of the trunk.

Both the rear area first communication device 1013C and the rear area second communication device 1013D are the vehicle interior communication devices 1013 for mainly bringing the rear area into a strong electric field area. It is preferable that the rear area first communication device 1013C and the rear area second communication device 1013D are also disposed at positions where the vehicle exterior is likely to be out of sight. For convenience, the vehicle interior communication device 1013 disposed in the rear area is also referred to as a rear area communication device.

The rear area first communication device 1013C is installed, for example, on surface of a door (hereinafter, referred to as a rear right door) provided on the right side of the vehicle Hv, on the vehicle interior side, as a door for the rear seat. A specific installation position of the rear area first communication device 1013C on the surface of the rear right door on the vehicle interior side may be appropriately designed. In the present embodiment, the rear area first communication device 1013C is disposed at a position lower than a portion corresponding to the rear side of the door handle disposed outside the vehicle compartment of the rear right door by 5 cm or more (for example, in the vicinity of the foot). The rear area first communication device 1013C may be disposed on the right side portion of a floor surface of the rear seat, or may be buried in the right side portion of a seating surface of the rear seat. Further, the rear area first communication device 1013C may be disposed in the vicinity of a lower end of the surface on the rear seat side of the backrest portion 1041.

The rear area second communication device 1013D is installed, for example, on surface of a door (hereinafter, referred to as a rear left door) provided on the left side of the vehicle Hv, on the vehicle interior side, as a door for the rear seat. The installation position of the rear area second communication device 1013D on the surface of the rear left door on the vehicle interior side may be appropriately designed. In the present embodiment, the rear area second communication device 1013D is disposed at a position (for example, in the vicinity of the foot) lower than a portion corresponding to the rear side of the door handle (hereinafter, referred to as the rear outer left door handle) disposed outside the vehicle compartment of the rear left door by 5 cm or more. The rear area second communication device 1013D may be disposed on the left side portion of the floor surface of the rear seat, or may be buried in the left side portion of the seating surface of the rear seat. Further, the rear area second communication device 1013D may be disposed in the vicinity of the lower end of the rear seat side surface of the backrest portion 1041. The rear area first communication device 1013C and the rear area second communication device 1013D may be disposed on a surface portion of the B pillar on the interior side.

Although the in-vehicle system 1000 according to the present embodiment includes two vehicle interior communication devices 1013 for bringing the rear area into a strong electric field area, the placement mode of the vehicle interior communication devices 1013 is not limited to the above example. The in-vehicle system 1000 may be configured such that the rear area is brought into the strong electric field area by one vehicle interior communication device 1013. The vehicle interior communication device 1013 for the rear area may be buried in the seating surface, for example, at the center of the rear seat in the vehicle width direction.

Figure 23:
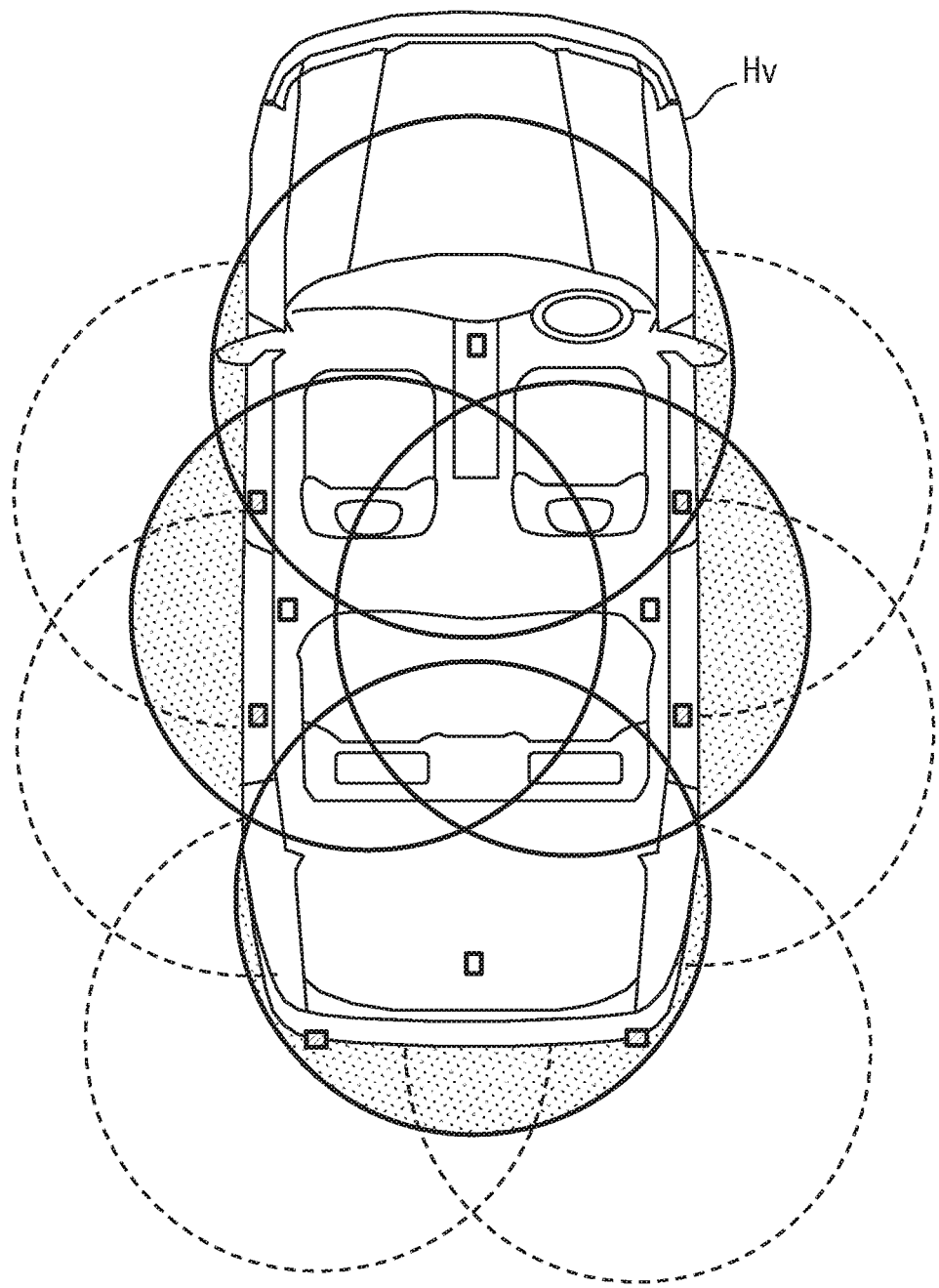
FIG. 23 is a diagram conceptually showing a strong electric field area formed by each short-range communication device.

According to the placement mode of the vehicle interior communication device 1013 described above, as shown in FIG. 23, the entire region of the vehicle compartment becomes the strong electric field area. In other words, the entire vehicle compartment is filled with radio waves equal to or higher than the strong electric field threshold. FIG. 23 conceptually shows a strong electric field area provided by each short-range communication device 1003 in the configuration shown in FIG. 22. Solid line circles in FIG. 23 represent a strong electric field area provided by the vehicle interior communication device 1013. Arcs of dashed lines represent a strong electric field area provided by the vehicle exterior communication device 1014 described below. In FIG. 23, in order to ensure visibility of the drawing, the reference numerals and lead lines of various vehicle interior communication devices 1013 and vehicle exterior communication devices 1014 are omitted.

In FIG. 23, hatched regions of a dot pattern conceptually represent leakage regions formed by the vehicle interior communication device 1013. The leakage region formed by the vehicle interior communication device 1013 is a region in which the strong electric field area provided by the vehicle interior communication device 1013 protrudes outside the vehicle compartment. In other words, the leakage region is a region in which the signal transmitted by the vehicle interior communication device 1013 reaches the outside of the vehicle compartment while maintaining a strength equal to or higher than a predetermined strong electric field threshold.

The installation position of each vehicle interior communication device 1013 can be changed as appropriate. The number of vehicle interior communication devices 1013 included in the in-vehicle system 1000 may be one, two, three, or the like, four or less. The number of vehicle interior communication devices 1013 may be five or more.

Incidentally, the configuration described above corresponds to a configuration in which the vehicle interior communication device 1013 is disposed so that a strong electric field area is provided for each area divided by the vehicle interior structure which can inhibit the propagation of the radio wave of the frequency used for the short-range communication. The vehicle interior structure which can inhibit the propagation of the radio wave of the frequency used for the short-range communication is the backrest portion 1041 of the front seat and the backrest portion 1042 of the rear seat. The areas partitioned by the vehicle interior structure are a front area, a rear area, and a trunk area.

At least one vehicle exterior communication device 1014 is disposed, for example, on the outer side surface of the driver's seat door, on the roof portion, an engine hood, the pillars, or the like of the vehicle Hv so that a predetermined range outside the vehicle compartment becomes a strong electric field area. Although only one vehicle exterior communication device 1014 is illustrated in FIG. 20 for convenience, the in-vehicle system 1000 may include multiple vehicle exterior communication devices 1014. As shown in FIG. 22, the in-vehicle system 1000 according to the present embodiment includes a right side first communication device 1014A, a right side second communication device 1014B, a left side first communication device 1014C, a left side second communication device 1014D, a rear first communication device 1014E, and a rear second communication device 1014F as the vehicle exterior communication devices 1014.

The right side first communication device 1014A is a vehicle exterior communication device 1014 for bringing the periphery of the door for the front seat (hereinafter, referred to as a front right door) provided on the right side of the vehicle Hv into the strong electric field area. In this example, since the driver's seat is disposed on the right side of the vehicle Hv, the front right door corresponds to the driver's seat door. The periphery of the front right door is a region that falls within a predetermined distance (for example, 1 m) from the door handle disposed on the outer side surface of the front right door. The right side first communication device 1014A is disposed in the vicinity of, for example, the door handle of the door panel of the front seat door. The inside of the door handle is also included in the vicinity of the door handle. As another mode, the right side first communication device 1014A may be disposed in the vicinity of the right side front wheel. In addition, the right side first communication device 1014A may be disposed in a rocker portion below the front right door, a portion where the upper end of the front right door comes into contact with the roof portion of the vehicle Hv, or the like.

The right side second communication device 1014B is a vehicle exterior communication device 1014 for bringing the periphery of the rear right door into the strong electric field area. The periphery of the rear right door is a region that falls within a predetermined distance (for example, 1 m) from the door handle disposed on the outer side surface of the rear right door. The right side second communication device 1014B is disposed in the vicinity of, for example, the door handle of the door panel of the rear seat door. The inside of the door handle is also included in the vicinity of the door handle. As another mode, the right side second communication device 1014B may be disposed in the vicinity of a right rear wheel. The right side second communication device 1014B may be disposed in a rocker portion below the rear right door, a portion where the upper end of the rear right door comes into contact with the roof portion of the vehicle Hv, or the like.

The left side first communication device 1014C and the left side second communication device 1014D are vehicle exterior communication devices 1014 paired with the right side first communication device 1014A and the right side second communication device 1014B, respectively, which have already been described. The left side first communication device 1014C is disposed at a position opposite to the right side first communication device 1014A in the left side surface of the vehicle Hv. In the same manner, the left side second communication device 1014D is disposed at a position opposite to the right side second communication device 1014B in the left side surface of the vehicle Hv.

The rear first communication device 1014E is a vehicle exterior communication device 1014 disposed in the vicinity of a right corner of the rear end of the vehicle. The rear second communication device 1014F is a vehicle exterior communication device 1014 disposed in the vicinity of a left corner of the rear end of the vehicle. The rear first communication device 1014E and the rear second communication device 1014F are vehicle exterior communication devices 1014 for forming a strong electric field area in the rear of the vehicle (that is, for the rear of the vehicle). In this example, a configuration including two vehicle exterior communication devices 1014 for the rear of the vehicle is disclosed, but the present disclosure is not limited to the above configuration. One vehicle exterior communication device 1014 for the rear of the vehicle may be used. In that case, it is preferable that the vehicle exterior communication device 1014 for the rear of the vehicle is disposed at the center of a trunk door, a rear bumper, or the like in the vehicle width direction. The vehicle exterior communication device 1014 for the rear of the vehicle may be provided in the vicinity of the door handle of the trunk door or a license plate.

The installation position of each vehicle exterior communication device 1014 is not limited to the mode described above. The vehicle exterior communication device 1014 may be disposed on the outer surface of the vehicle Hv so as to cover the leakage region formed by the vehicle interior communication device 1013 with a strong electric field area. In this example, the outer surface is a body portion which is in contact with a vehicle exterior space of the vehicle Hv, and includes a side surface, a rear surface, and a front surface of the vehicle Hv. The vehicle exterior communication device 1014 according to the present embodiment is not provided at a position paired with the vehicle interior communication device 1013 across a body such as a door.

The vehicle exterior communication device 1014 is preferably disposed on the surface of a metallic body panel. In other words, it is preferable that a metal plate is present on the rear surface of the vehicle exterior communication device 1014. The rear surface of the vehicle exterior communication device 1014 is a direction toward the vehicle interior when viewed from the vehicle exterior communication device 1014. According to the mode in which the vehicle exterior communication device 1014 is disposed on the surface of the body panel made of metal, the body panel functions as a reflection plate, and the center of the directivity of the vehicle exterior communication device 1014 can be directed to the vehicle exterior. In addition, since the body panel acts as the reflection plate, the possibility can be reduced that the vehicle interior becomes out of sight for the vehicle exterior communication device 1014, the radio wave of the vehicle exterior communication device 1014 enters the vehicle interior, and the vehicle exterior communication device 1014 receives the radio wave from the mobile terminal 1002 that is present in the vehicle compartment.

In the present embodiment, the various body panels are made of metal. For that reason, according to the mode of installing the vehicle exterior communication device 1014 on the door panel or the like as described above, the vehicle interior is out of sight for various vehicle exterior communication devices 1014, and the center of the directivity faces the vehicle exterior direction. In this example, the vehicle exterior direction is a direction parallel to the horizontal plane of the vehicle and directed from the center of the vehicle to the vehicle exterior side. The vehicle horizontal plane is a plane orthogonal to a height direction of the vehicle Hv.

When the vehicle exterior communication device 1014 is disposed on the metal body, a gain in the vehicle exterior direction may be changed according to a distance between the metal body and the antenna 1031. This is because a phase difference between a reflected wave and a direct wave in the metal body changes according to the distance between the metal body and the antenna 1031, and the radio waves are strengthened or weakened. Points at which radio waves are attenuated may occur at every half wavelength.

Figure 24:
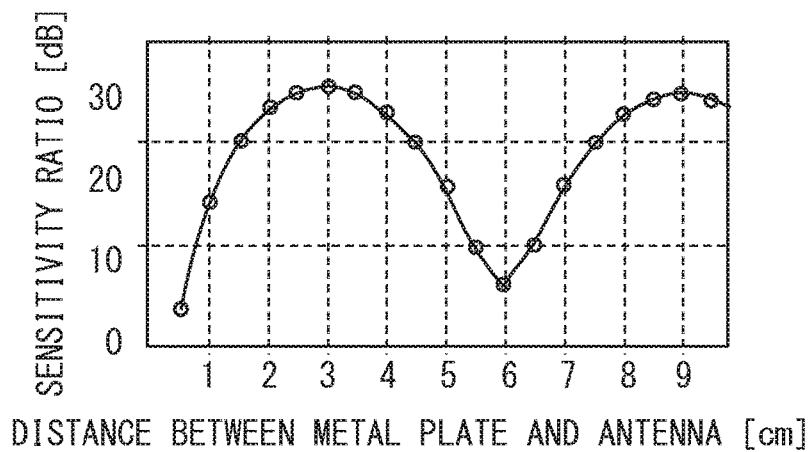
FIG. 24 is a diagram illustrating a suitable installation position of the vehicle exterior communication device.

Since the wavelength of the radio wave of 2.4 GHz is about 12 cm, as shown in FIG. 24, when the distance between the metal body and the antenna 1031 is 6 cm, the reflected wave and the direct wave in the vehicle exterior direction are weakened, and the radiation gain in the vehicle exterior direction is lowered. On the other hand, when the distance between the metal body and the antenna 1031 is 1.5 cm to 4.5 cm, a sensitivity ratio between the vehicle exterior direction and the vehicle interior direction is 20 dB or more, which is preferable in the present embodiment. Therefore, it is preferable that the various vehicle exterior communication devices 1014 are disposed so that a separation between the built-in antenna 1031 and the metal body present on the rear surface of the vehicle exterior communication device 1014 is about 1.5 cm.

The number of vehicle exterior communication devices 1014 included in the in-vehicle system 1000 may be six or less, such as two, three, or four, or may be eight or more. Each of the vehicle exterior communication devices 1014 is connected to the authentication ECU 1011 through a dedicated communication line or an in-vehicle network so as to be able to communicate with each other.

Both the vehicle interior communication device 1013 and the vehicle exterior communication device 1014 are configured to mainly report the reception strength of the signal from the mobile terminal 1002 to the authentication ECU

1011. Therefore, hereinafter, various types of the vehicle interior communication device 1013 and the vehicle exterior communication device 1014 are also referred to as strength observation devices. The respective strength observation devices provide the reception strength of the signals transmitted from the mobile terminal 1002 to the authentication ECU 1011. As described above, part or all of the strength observation devices may play a role as the data communication device 1012.

The door handle button 1015 is a button for the user to unlock and lock the door of the vehicle Hv. The door handle button 1015 may be provided in each door handle of the vehicle Hv. When depressed by the user, the door handle button 1015 outputs an electric signal indicative of the depression to the authentication ECU 1011. The door handle button 1015 corresponds to a configuration in which the authentication ECU 1011 accepts a user's instruction to unlock and lock. A touch sensor may be employed as a configuration for receiving at least one of the unlocking instruction and the locking instruction from the user. The touch sensor is a device that detects that the user is touching the door handle. The touch sensor as a configuration for accepting the unlocking instruction or the locking instruction by the user may be provided in each door handle of the vehicle Hv.

The start button 1016 is a push switch for the user to start a driving source (for example, an engine). When the user performs a push operation on the start button 1016, the start button 16 outputs an electric signal indicating the push operation to the authentication ECU 1011. As an example, the vehicle Hv is a vehicle provided with an engine as a power source, but the present disclosure is not limited to the above example. The vehicle Hv may be an electric vehicle or a hybrid vehicle. When the vehicle Hv is a vehicle provided with a motor as a driving source, the start button 1016 is a switch for starting the motor for driving.

The engine ECU 1017 is an ECU for controlling the operation of an engine mounted on the vehicle Hv. For example, when the engine ECU 1017 acquires a start instruction signal instructing starting of the engine from the authentication ECU 1011, the engine ECU 1017 starts the engine.

The body ECU 1018 is an ECU that controls in-vehicle actuators (ACT) 1019 based on a request from the authentication ECU 1011. The body ECU 1018 is communicatively coupled to various in-vehicle actuators (ACT) 1019 and various vehicle-mounted sensors. In this example, the in-vehicle actuators 1019 include, for example, a door lock motor configuring a locking mechanism of each door, an actuator for adjusting a seat position (hereinafter, referred to as a seat actuator), and the like. The vehicle-mounted sensors in this example are a courtesy switch and the like disposed for each door. The courtesy switches are sensors for detecting opening and closing of the door. The body ECU 1018, for example, outputs a predetermined control signal to the door lock motors provided on the respective doors of the vehicles Hv based on a request from the authentication ECU 1011, thereby locking and unlocking the doors of the vehicles Hv.

<Function of Authentication ECU 1011>

Figure 25:
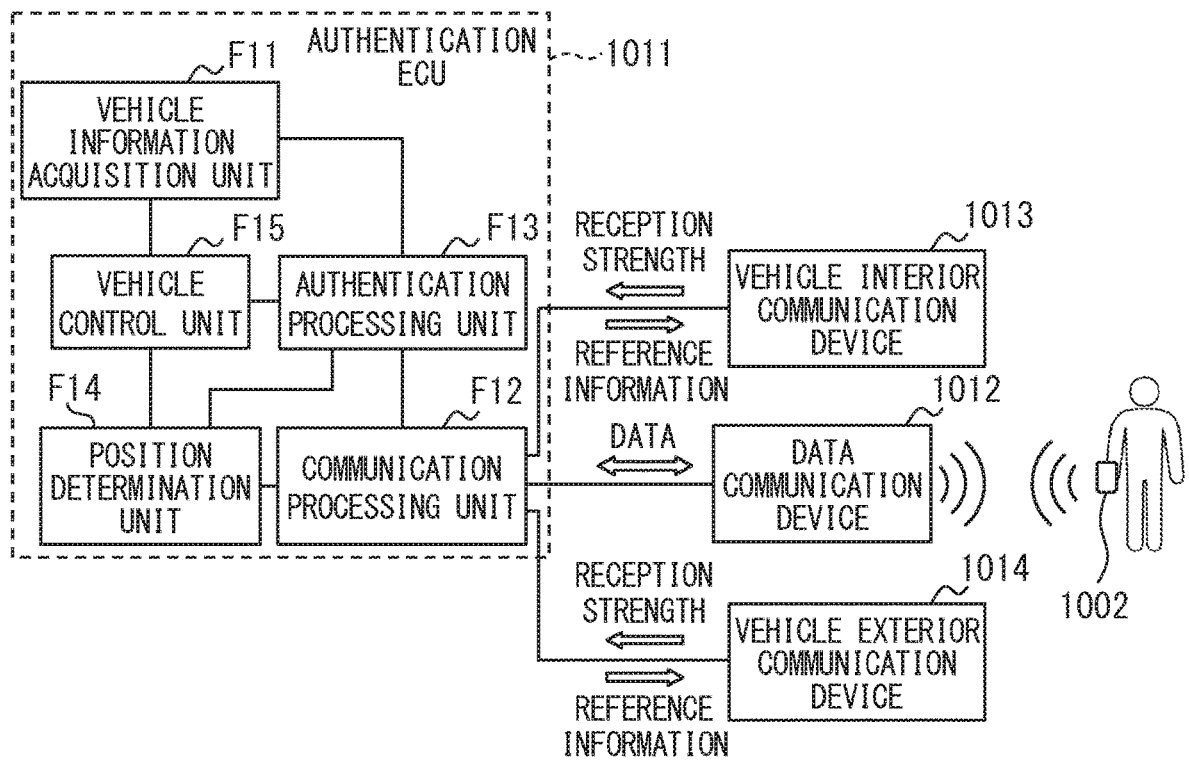
FIG. 25 is a diagram illustrating the function of the authentication ECU.

The authentication ECU 1011 executes the position determination programs described above to provide functions corresponding to various functional blocks shown in FIG. 25. In other words, the authentication ECU 1011 includes, as functional blocks, a vehicle information acquisition unit F11, a communication processing unit F12, an authentication processing unit F13, a position determination unit F14, and a vehicle control unit F15.

Part or all of the functions executed by the authentication ECU 1011 may be implemented as hardware using logic circuits or the like. A mode implemented as hardware also include a mode implemented by using one or more ICs. Part or all of the functional blocks included in the authentication ECU 1011 may be implemented by a combination of the execution of software executed by the CPU 1111 with electronic circuits.

The vehicle information acquisition unit F11 acquires various pieces of information indicating the state of the vehicle Hv (hereinafter, referred to as vehicle information) from sensors, ECUs (for example, body ECU 1018), switches, and the like mounted on the vehicle Hv. The vehicle information includes, for example, an open/closed state of the door, a locked/unlocked state of each door, whether the door handle button 1015 is pressed, whether the start button 1016 is pressed, and the like.

The acquisition of the information indicating the locked/unlocked state of each door corresponds to the determination of the locked/unlocked state of each door and the detection of the locking operation/unlocking operation of the door by the user. Also, the acquisition of electric signals from the door handle button 1015 and the start button 1016 corresponds to detection of the user operation on those buttons. In other words, the vehicle information acquisition unit F11 corresponds to a configuration for detecting the user's operation on the vehicle Hv, such as opening and closing of the door, pressing of the door handle button 1015, pressing of the start button 1016, and the like. Hereinafter, the vehicle information includes the user operation on the vehicle Hv. The information included in the vehicle information is not limited to that described above. The vehicle information also includes a shift position detected by a shift position sensor (not shown), a detection result of a brake sensor for detecting whether a brake pedal is depressed, and the like. The operation state of the parking brake can also be included in the vehicle information.

In addition, the vehicle information acquisition unit F11 specifies a current state of the vehicle Hv based on the various information described above. For example, when the engine is off and all the doors are locked, the vehicle information acquisition unit F11 determines that the vehicle Hv is parked. It is needless to say that the condition for determining that the vehicle Hv is parked may be designed as appropriate, and various determination conditions and the like can be applied.

The communication processing unit F2 is configured to perform transmission and reception of data to and from the mobile terminal 1002 in cooperation with the data communication device 1012. For example, the communication processing unit F12 generates data addressed to the mobile terminal 1002, and outputs the data to the data communication device 1012. As a result, the transmission processing unit F2 transmits a signal corresponding to desired data as a radio wave. In addition, the communication processing unit F12 receives data from the mobile terminal 1002 received by the data communication device 1012.

In the present embodiment, as a more preferable mode, the wireless communication between the authentication ECU 1011 and the mobile terminal 1002 is configured to be executed in an encrypted manner. The authentication ECU 1011 as the communication processing unit F12 acquires channel information from the data communication device 1012. As a result, the authentication ECU 1011 specifies a channel used by the data communication device 1012 for a communication with the mobile terminal 1002.

The authentication ECU 1011 acquires the terminal ID of the mobile terminal 1002 to which the data communication device 1012 is communicatively connected from the data communication device 1012. According to the configuration described above, even in the vehicle in which the vehicle Hv is shared by multiple users, the authentication ECU 1011 can specify a user who is present in the vicinity of the vehicle Hv based on the terminal ID of the mobile terminal 1002 to which the data communication device 1012 is communicatively connected.

In addition, the communication processing unit F12 distributes the channel information and the terminal ID acquired from the data communication device 1012 to each of the strength observation devices as reference information. The channel information shown in the referenced information enables the respective strength observation devices to recognize which channel of the many channels included in the Bluetooth standard can receive the signal from the mobile terminal 1002. In addition, even when the strength observation device receives signals from the multiple devices, the strength observation device can specify which device should report the reception strength of the signal to the authentication ECU 1011, based on the terminal ID indicated in the reference information.

The authentication processing unit F13 performs a process of authenticating the mobile terminal 1002 in cooperation with the data communication device 1012 (hereinafter, referred to as an authentication process). The short-range communication for authentication is performed after being encrypted by the data communication device 1012. In other words, the authentication process is performed by a cryptographic communication. The authentication process itself may be performed by use of various methods such as a challenge-response method. A detailed description of the authentication process will be omitted in this example. It is assumed that data (for example, encryption key) required for the authentication process is stored in each of the mobile terminal 1002 and the authentication ECU 1011.

A timing at which the authentication processing unit F13 performs the authentication process may be, for example, a timing at which the communication connection between the data communication device 1012 and the mobile terminal 1002 is established. The authentication processing unit F13 may be configured to perform the authentication process at a predetermined cycle while the data communication device 1012 and the mobile terminal 1002 are in communication connection. Further, the authentication processing unit F13 may be configured such that a cryptographic communication for the authentication process is performed by using a predetermined user operation on the vehicle Hv as a trigger, for example, when the start button 1016 is pressed by the user.

In the present embodiment, the authentication ECU 1011 and the mobile terminal 1002 are configured to encrypt and execute a data communication for authentication or the like in order to improve security, but the present disclosure is not limited to the above configuration. As another aspect, the authentication ECU 1011 and the mobile terminal 1002 may be configured to perform a data communication for authentication or the like without encrypting the data communication.

The situation that the communication connection between the data communication device 1012 and the mobile terminal 1002 is established means that a communication partner of the data communication device 1012 is the mobile terminal 1002 registered in advance. Therefore, the authentication ECU 1011 may be configured to determine that the mobile terminal 1002 has been successfully authenticated based on the condition that the communication connection between the data communication device 1012 and the mobile terminal 1002 has been established.

The position determination unit F14 is configured to determine whether the mobile terminal 1002 is present in the vehicle compartment based on the reception strength of the signal from the mobile terminal 1002 provided from each of the multiple strength observation devices. Since the mobile terminal 1002 is basically carried by the user, the determination of the position of the mobile terminal 1002 corresponds to the determination of the position of the user. As a preparatory process for determining the position of the mobile terminal 1002, the position determination unit F14 sequentially acquires the reception strengths of the signals from the mobile terminal 1002 from the multiple strength observation devices included in the in-vehicle system 1000, and stores the acquired reception strengths in the RAM 1112 by distinguishing the acquired reception strengths for each acquisition source.

Then, the position determination unit F14 determines whether the mobile terminal 1002 is present in the vehicle compartment based on the reception strength for each strength observation device stored in the RAM 1112 and various determination thresholds registered in the flash memory 1113. The specific operation of the position determination unit F14, that is, the method of determining the position of the mobile terminal 1002 based on the reception strength of each strength observation device by the position determination unit F14 will be described in detail later. The determination result of the position determination unit F14 is referred to by the vehicle control unit F15.

The vehicle control unit F15 is configured to execute a vehicle control according to the position of the mobile terminal 1002 (in other words, the user) and the state of the vehicle Hv in cooperation with the body ECU 1018 or the like when the authentication of the mobile terminal 1002 by the authentication processing unit F13 is successful. The state of the vehicle Hv is determined by the vehicle information acquisition unit F11. The position of the mobile terminal 1002 is determined by the position determination unit F14.

For example, when the mobile terminal 1002 is present outside the vehicle compartment and the user presses the door handle button 1015 while the vehicle Hv is parked, the vehicle control unit F15 unlocks the door locking mechanism in cooperation with the body ECU 1018. Further, for example, when the mobile terminal 1002 is determined to be present in the vehicle compartment by the position determination unit F14 and it is detected that the start button 1016 has been depressed by the user, the vehicle control unit F15 starts the engine in conjunction with the engine ECU 1017.

Basically, the vehicle control unit F15 is configured to execute a vehicle control according to the position of the user and the state of the vehicle Hv with the user operation on the vehicle Hv as a trigger. However, some vehicle controls that can be executed by the vehicle control unit F15 may be automatically executed according to the position of the user without requiring the user's operation on the vehicle Hv.

<Connection-Related Process>

Figure 26:
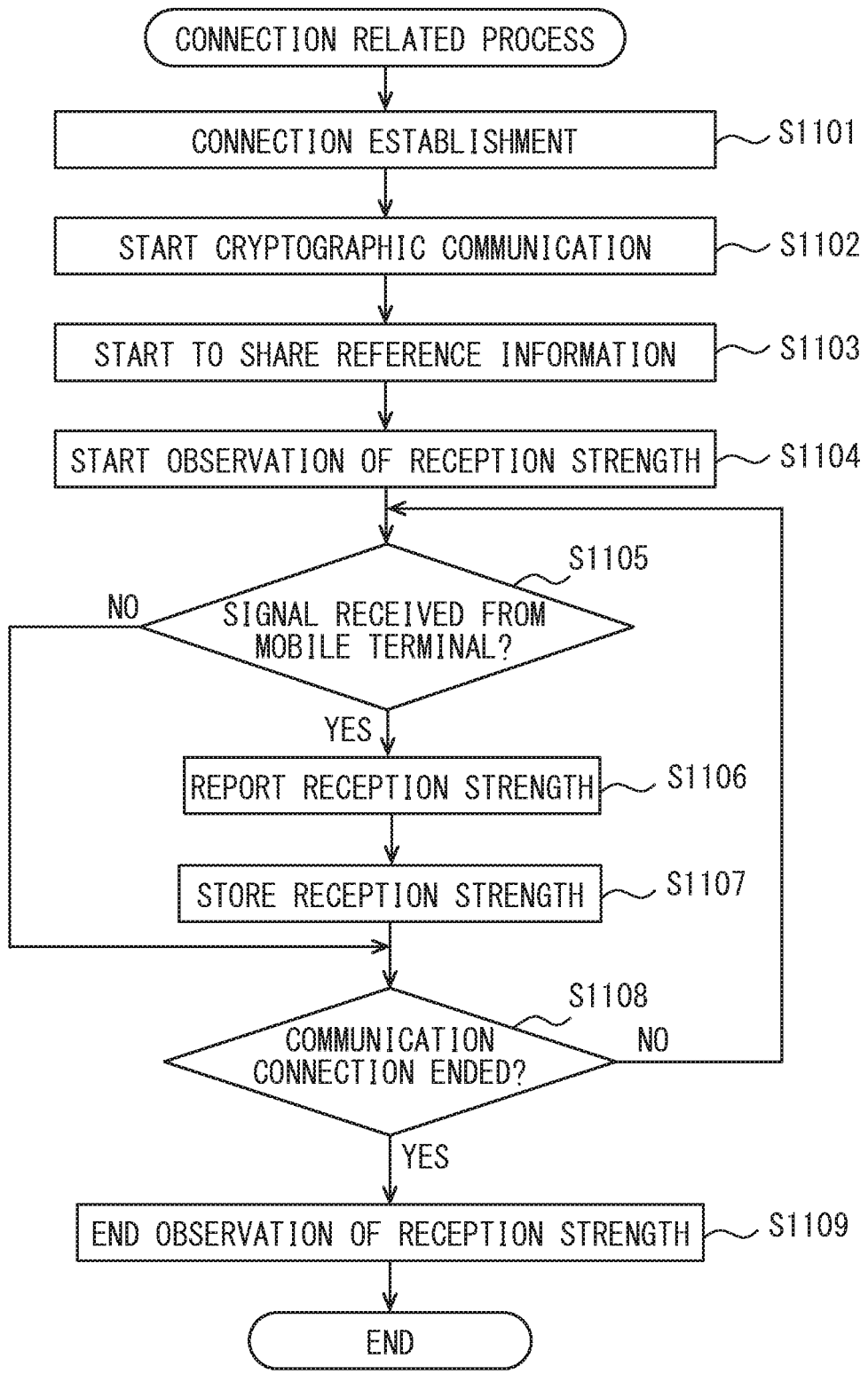
FIG. 26 is a flowchart of a connection related process to be executed by the in-vehicle system.

Next, a connection-related process performed by the in-vehicle system 1000 will be described with reference to a flowchart shown in FIG. 26. The connection-related process is a process relating to the establishment of the communication connection with the mobile terminal 1002 by the in-vehicle system 1000. The connection-related process shown in FIG. 26 may be started, for example, when the data communication device 1012 receives an advertisement packet from the mobile terminal 1002.

When the communication connection between the data communication device 1012 and the mobile terminal 1002 is not established, the operation of the strength observation device may be stopped in order to inhibit a dark current. The data communication device 1012 preferably always operates in a standby state in order to improve the responsiveness to the approach of the user. The standby state is a state in which a signal (for example, an advertisement packet) from the mobile terminal 1002 can be received.

First, in S1101, the data communication device 1012 establishes a communication connection (in other words, a connection) with the mobile terminal 1002, and proceeds to S1102. When the communication connection with the mobile terminal 1002 is established, the data communication device 1012 provides the terminal ID of the mobile terminal 1002 communicatively connected to the data communication device 1012 to the authentication ECU 1011. Further, in the authentication ECU 1011, when the strength observation device is in an idle mode at the time when the communication connection with the mobile terminal 1002 is established, the data communication device 1012 outputs a predetermined control signal to the strength observation device and shifts to the standby mode. A pause mode is, for example, a state in which the receiving function of a signal is stopped. The pause mode includes a state in which the power is turned off.

In S1102, the data communication device 1012 periodically performs an encrypted communication based on an instruction from the authentication ECU 1011. The content of the data exchanged at this time may be any content as long as the content requests the mobile terminal 1002 to return a response signal. The data content may be data for authenticating the mobile terminal 1002, such as a challenge code. The wireless communication with the mobile terminal 1002 is periodically executed so that the authentication ECU 1011 can confirm that the mobile terminal 1002 is present in the communication area.

In S1103, the data communication device 1012 and the authentication ECU 1011 cooperate with each other to start sharing the reference information. Specifically, the data communication device 1012 sequentially provides the terminal ID and the channel information of the mobile terminal 1002 connected by communication to the authentication ECU 1011. In addition, the authentication ECU 1011 sequentially distributes the channel information and the terminal ID provided from the data communication device 1012 to the respective strength observation devices as reference information.

In S1104, the respective strength observation devices start observing the reception strength of signals from the mobile terminal 1002 by use of the reference information provided from the authentication ECU 1011. In other words, the strength observation device sets a channel having a number indicated in the channel information as a reception target among a large number of channels included in the Bluetooth standard. The strength observation device sequentially changes the channel to be received in accordance with the channel information provided from the authentication ECU 1011.

According to the configuration described above, even when the mobile terminal 1002 and the data communication device 1012 perform the wireless communication of the frequency hopping system with each other, the reception strength of the signal from the mobile terminal 1002 is acquired, and the reception strength is sequentially reported to the authentication ECU 1011. In other words, various short-range communication devices 1003 included in the in-vehicle system 1000 can detect the reception strength of a signal from the mobile terminal 1002 in a state in which the confidentiality (in other words, security) of a communication between the in-vehicle system 1000 and the mobile terminal 1002 is ensured.

In S1105, the strength observation device determines whether a signal including the terminal ID indicated in the reference information has been received by the strength observation device. When a signal including the terminal ID indicated in the reference information has been received, the process proceeds to S1106. In S1106, the reception strength of the received signal is reported to the authentication ECU 1011. In other words, in S1105 to S1106, the various strength observation devices report the reception strength of the signal including the terminal ID indicated in the reference information among the signals received in the channel indicated in the channel information to the authentication ECU 1011. If the signal from the mobile terminal 1002 has not been received for a predetermined period in S1105, S1108 may be performed.

In S1107, the authentication ECU 1011 executes a process of storing the reception strength provided from each strength observation device in the RAM 1112 while distinguishing the reception strength from each other for each location specifying communication serving as a provider, and proceeds to S1108. In S1108, the authentication ECU 1011 and the data communication device 1012 cooperate with each other to determine whether the communication connection with the mobile terminal 1002 has been completed. The case in which the communication connection with the mobile terminal 1002 is terminated is, for example, a case in which the data communication device 1012 cannot receive a signal from the mobile terminal 1002. When the communication with the mobile terminal 1002 is terminated, an affirmative determination is made in S1108, and S1109 is executed. On the other hand, when the communication with the mobile terminal 1002 is still maintained, the process returns to S1105.

In S1109, the authentication ECU 1011 outputs a predetermined control signal to the strength observation device, and ends the process of observing the reception strength of the signal from the mobile terminal 1002. For example, the authentication ECU 1011 may cause, for example, the strength observation device to transition to the pause mode. When the process in S1109 is completed, the present flow ends.

<Position Determination Process>

Figure 27:
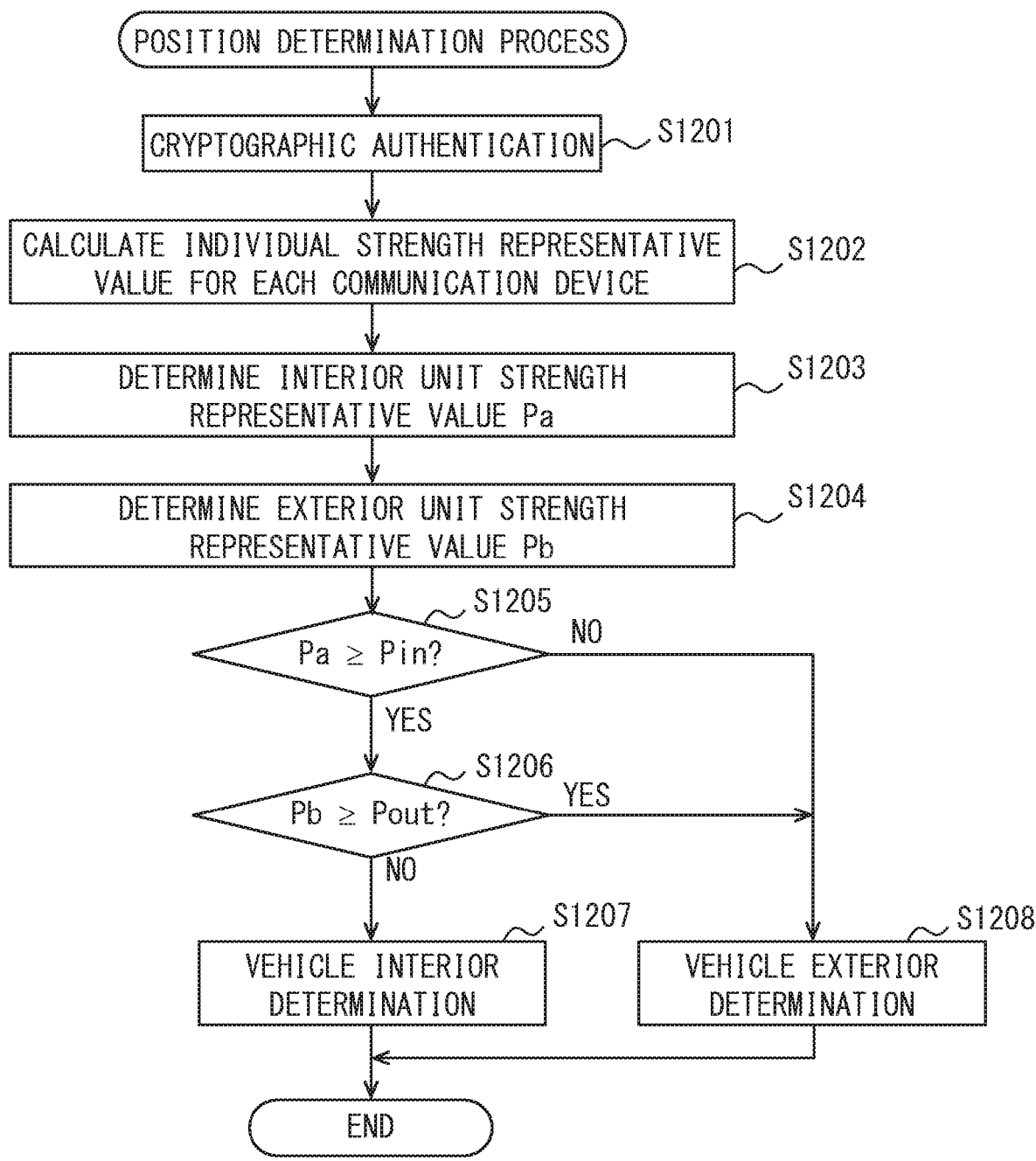
FIG. 27 is a flowchart of a position determination process to be executed by the authentication ECU.

Next, the position determination process performed by the authentication ECU 1011 will be described with reference to a flowchart shown in FIG. 27. The position determination process is a process for determining the position of the mobile terminal 1002. The position determination process is performed, for example, at a predetermined position determination cycle in a state in which the communication connection between the data communication device 1012 and the mobile terminal 1002 is established. The position determination cycle is, for example, 200 milliseconds. It is needless to say the position determination cycle may be 100 milliseconds or 300 milliseconds.

First, in S1201, the authentication processing unit F13 executes a process of authenticating the mobile terminal 1002 in cooperation with the data communication device 1012, and proceeds to S1202. S1201 can be omitted. In addition, the authentication process can be appropriately changed at a timing at which the authentication of the mobile terminal 1002 is performed.

In S1202, the position determination unit F14 calculates individual strength representative values for the strength observation devices based on the reception strength for each strength observation device stored in the RAM 1112. The individual strength representative value for one strength observation device is a value representative of the reception strength within a last predetermined time in the strength observation device. As an example, the individual strength representative value is an average value of the reception strengths of last N pieces. Such an individual strength representative value corresponds to a moving average value of the reception strength.

In the present embodiment, N may be a natural number of 2 or more, and is 5 in the present embodiment. In this case, the position determination unit F14 calculates the moving average value by use of the reception strength of the mobile terminal 1002 acquired (in other words, sampled) at the last five points in time. It is needless to say that N may be 10, 20, or the like. As another mode, N may be 1. The configuration in which N=1 corresponds to a configuration in which the latest reception strength is directly adopted as the individual strength representative value.

More specifically, in S1202, the position determination unit F14 calculates an average value with the last five reception strengths provided from the front area communication device 1013A as a population, as the individual strength representative value in the front area communication device 1013A. Similarly, the other vehicle interior communication devices 1013 such as the trunk area communication device 1013B, the rear area first communication device 1013C, and the rear area second communication device 1013D calculate the average with the last five reception strengths provided from the vehicle interior communication devices 1013 as a population.

In addition, the position determination unit F14 calculates, as an individual strength representative value in the right side first communication device 1014A, an average value with the last five reception strengths provided from the right side first communication device 1014A as a population. Similarly, the other vehicle exterior communication devices 1014 such as the right side second communication device 1014B, the left side first communication device 1014C, the left side second communication device 1014D, the rear first communication device 1014E, and the rear second communication device 1014F calculate the average with the last five reception strengths provided from each vehicle exterior communication device 1014 as a population.

The individual strength representative value of the strength observation device in which the number of reception strengths stored in the RAM 1112 is less than N may be calculated by substituting a value corresponding to a lower limit value of the reception strength detectable by the short-range communication device 1003 as the reception strength representative value of the missing data. The lower limit value of the reception strength detectable by the short-range communication device 1003 may be determined by the configuration of the short-range communication device 1003, for example, −60 dBm or the like.

According to the above mode, for example, even when only a part of the multiple strength observation devices included in the in-vehicle system 1000 can receive the signal from the mobile terminal 1002 due to the position of the mobile terminal 1002, a subsequent process can be performed. For example, even when the left side first communication device 1014C and the left side second communication device 1014D cannot receive the signal from the mobile terminal 1002 because the mobile terminal 1002 is present on the right side of the vehicle Hv, the individual strength representative values for the respective strength observation devices can be calculated.

In the present embodiment, the average value of the last N reception strengths is used as the individual strength representative value, but the present disclosure is not limited to the above example. The individual strength representative value may be a median value or a maximum value of the last N reception strengths. The individual strength representative value may be an average value of the reception strengths obtained by removing the maximum value and the minimum value from the last N reception strengths. The individual strength representative value is preferably a value obtained by removing a variation component of the instantaneous reception strength. When the process in S1202 is completed, the process proceeds to S1203.

Figure 28:
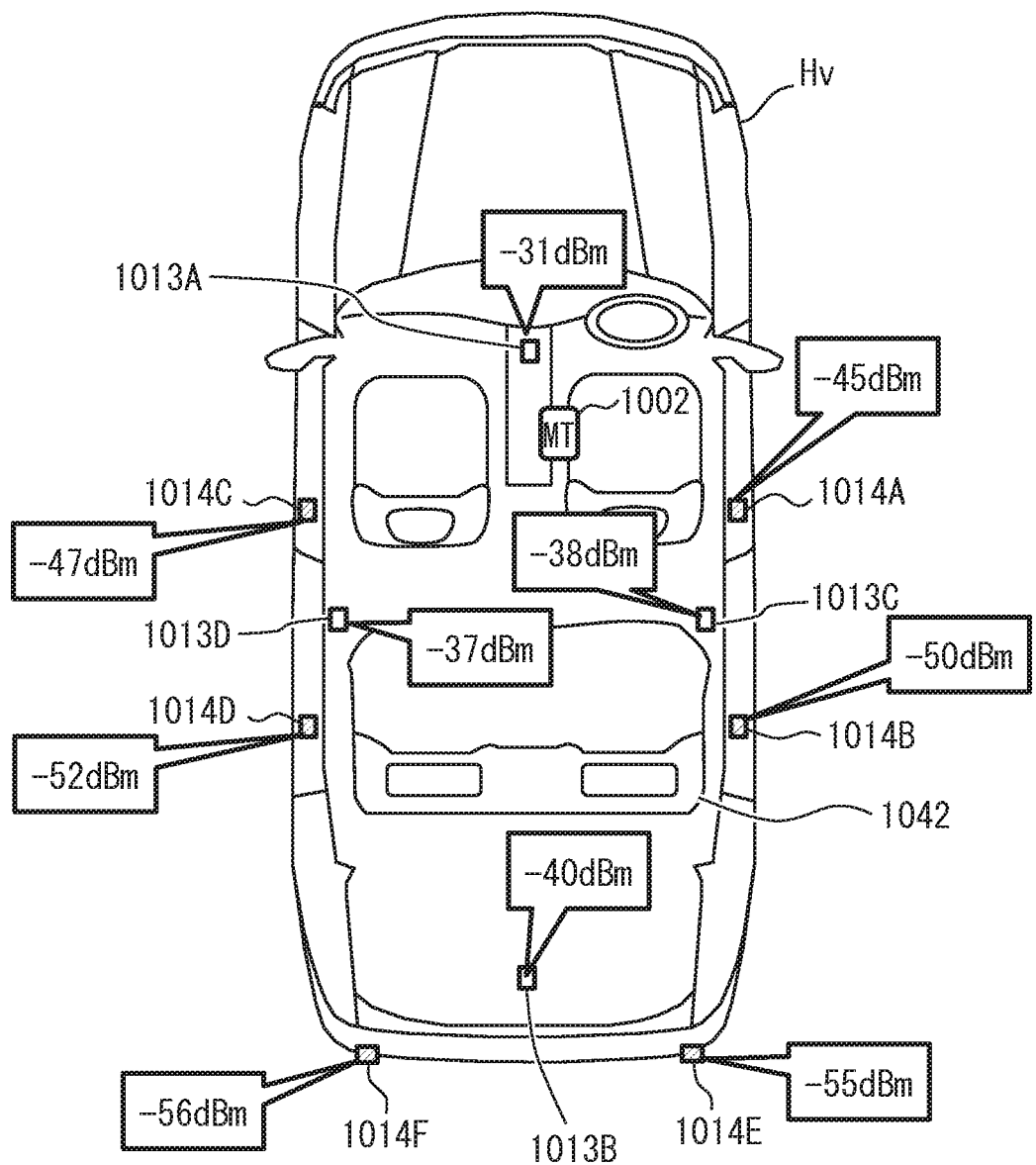
FIG. 28 is a diagram illustrating a method of determining an interior unit strength representative value and an exterior unit strength representative value.

In S1203, the position determination unit F14 determines an interior unit strength representative value Pa based on the individual strength representative values of the respective vehicle interior communication devices 1013. As an example, the interior unit strength representative value Pa is the maximum value of the individual strength representative values for each of the vehicle interior communication devices 1013. For example, as shown in FIG. 28, when the individual strength representative values of the various vehicle interior communication devices 1013 are −31 dBm, −37 dBm, −38 dBm, and −40 dBm, the interior unit strength representative value Pa is determined to be −31 dBm. When the process in S1203 is completed, the process proceeds to S1204. As another mode, the interior unit strength representative value Pa may be an average value or a median value of the individual strength representative values for each of the vehicle interior communication devices 1013.

In S1204, the position determination unit F14 determines an exterior unit strength representative value Pb based on the individual strength representative values of the vehicle exterior communication devices 1014. For example, as shown in FIG. 28, when the individual strength representative values of various vehicle exterior communication devices 1014 are −45 dBm, −50 dBm, −47 dBm, −52 dBm, −55 dBm, and −60 dBm, the exterior unit strength representative value Pb is determined to be −45 dBm. The exterior unit strength representative value Pb may be determined by the same rule as the interior unit strength representative value. In other words, the position determination unit F14 according to the present embodiment employs the maximum value of the individual strength representative values for each vehicle exterior communication device 1014 as the exterior unit strength representative value Pb. When the process in S1204 is completed, the process proceeds to S1205.

In S1205, the position determination unit F14 determines whether the interior unit strength representative value Pa is equal to or greater than a predetermined interior equivalent value Pin. As described above, the interior equivalent value Pin is a threshold for determining that the mobile terminal 1002 is present in the vehicle compartment. The interior equivalent value Pin may be designed based on the minimum value of the interior unit strength representative value which can be observed when the mobile terminal 1002 is present in the vehicle compartment. The minimum value of the interior unit strength representative value that can be observed when the mobile terminal 1002 is present in the vehicle compartment may be determined based on the result of a test for measuring the interior unit strength representative value at each observation point in the vehicle compartment.

Figure 29:
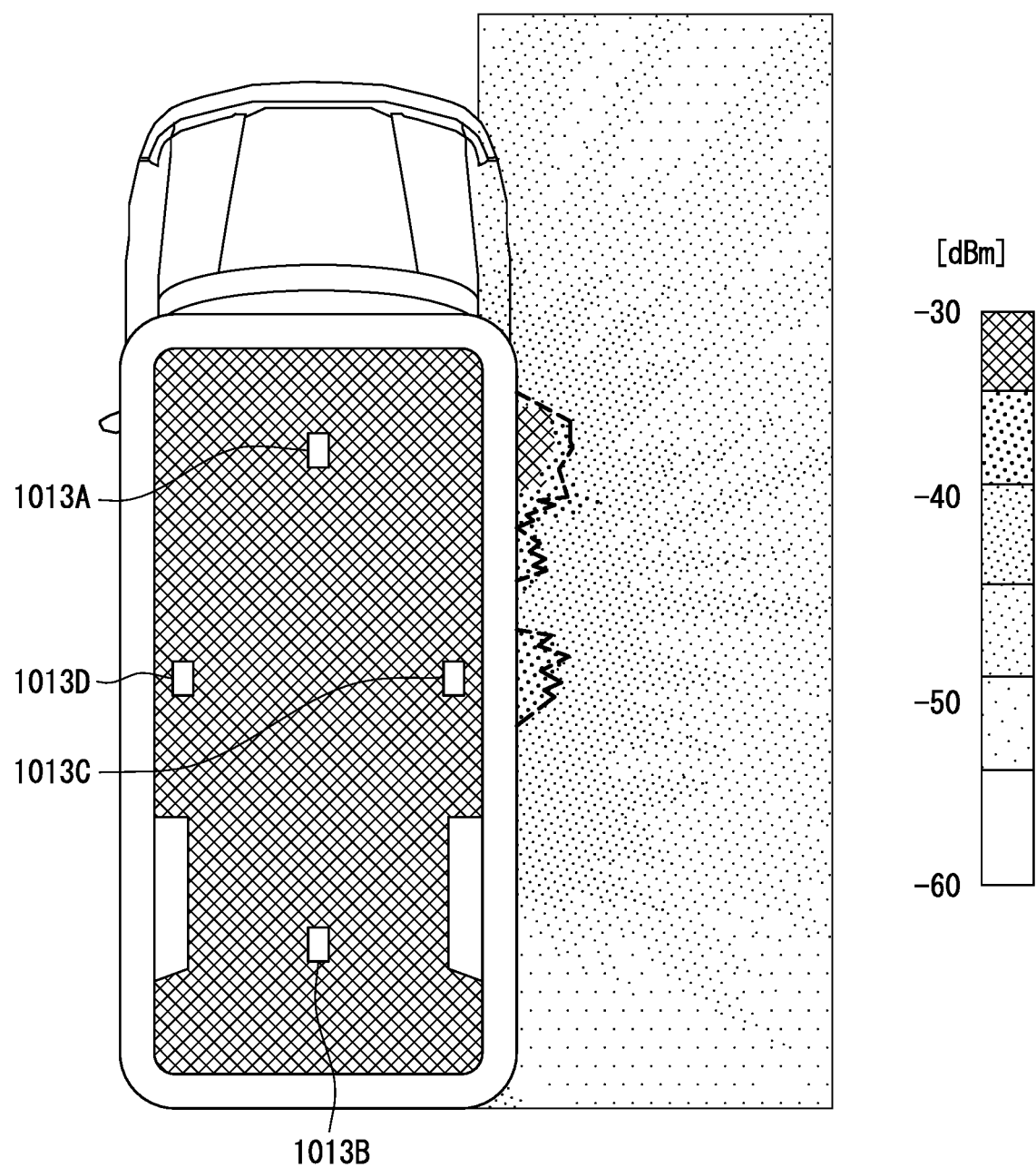
FIG. 29 is a diagram showing a result of measuring the interior unit strength representative value for each position of the mobile terminal.

FIG. 29 is a diagram showing a result of testing a relationship between the interior unit strength representative value Pa and the position of the mobile terminal 1002 in the vehicle interior and the vehicle exterior right region. The test result shown in FIG. 29 represents a value of the interior unit strength representative value when the mobile terminal 1002 is disposed at the same height as the windows of the vehicle Hv, specifically, at a position where a height from a road surface is 1.1 m, in a state where the doors of the vehicle Hv are closed.

If a test result is obtained that the minimum value of the interior unit strength representative value which can be observed when the mobile terminal 1002 is present in the vehicle compartment is −35 dBm, the interior equivalent value Pin may be set to −38 dBm which gives a predetermined margin to the minimum value −35 dBm. Since the interior equivalent value Pin is set to be equal to or less than the minimum value of the interior unit strength representative value which can be observed when the mobile terminal 1002 is present in the vehicle compartment, the situation that the interior unit strength representative value Pa is less than the interior equivalent value Pin means that the mobile terminal 1002 is present outside the vehicle compartment.

Since each of the vehicle interior communication devices 1013 is disposed so that the entire area in the vehicle interior becomes a strong electric field area, a region in which the interior unit strength representative value Pa is equal to or greater than the interior equivalent value Pin can be formed also in a part outside the vehicle compartment. In other words, the case in which the interior unit strength representative value Pa is equal to or greater than the interior equivalent value Pin includes a case in which the mobile terminal 1002 is present in the leakage region outside the vehicle compartment. A dashed line shown in FIG. 29 indicates the vehicle exterior region (that is, the leakage region) in which the interior unit strength representative value Pa is equal to or larger than the interior equivalent value Pin as a test result.

In the determination process of S1205, when the interior unit strength representative value Pa is equal to or larger than the interior equivalent value Pin, an affirmative determination is made in S1205, and the process proceeds to S1206. On the other hand, when the interior unit strength representative value Pa is less than the interior equivalent value Pin, a negative determination is made in S1205, and S1208 is executed.

In S1206, the position determination unit F14 determines whether the exterior unit strength representative value Pb is equal to or larger than the exterior equivalent value Pout. As described above, the exterior equivalent value Pout is a threshold value for determining that the mobile terminal 1002 is present outside the vehicle compartment. The exterior equivalent value Pout may be designed based on the maximum value of the exterior unit strength representative value which can be observed when the mobile terminal 1002 is present in the vehicle compartment. The maximum value of the exterior unit strength representative value that can be observed when the mobile terminal 1002 is present in the vehicle interior may be determined based on a result of a test for measuring the exterior unit strength representative value when the mobile terminal 1002 is disposed at each point in the vehicle compartment.

Figure 30:
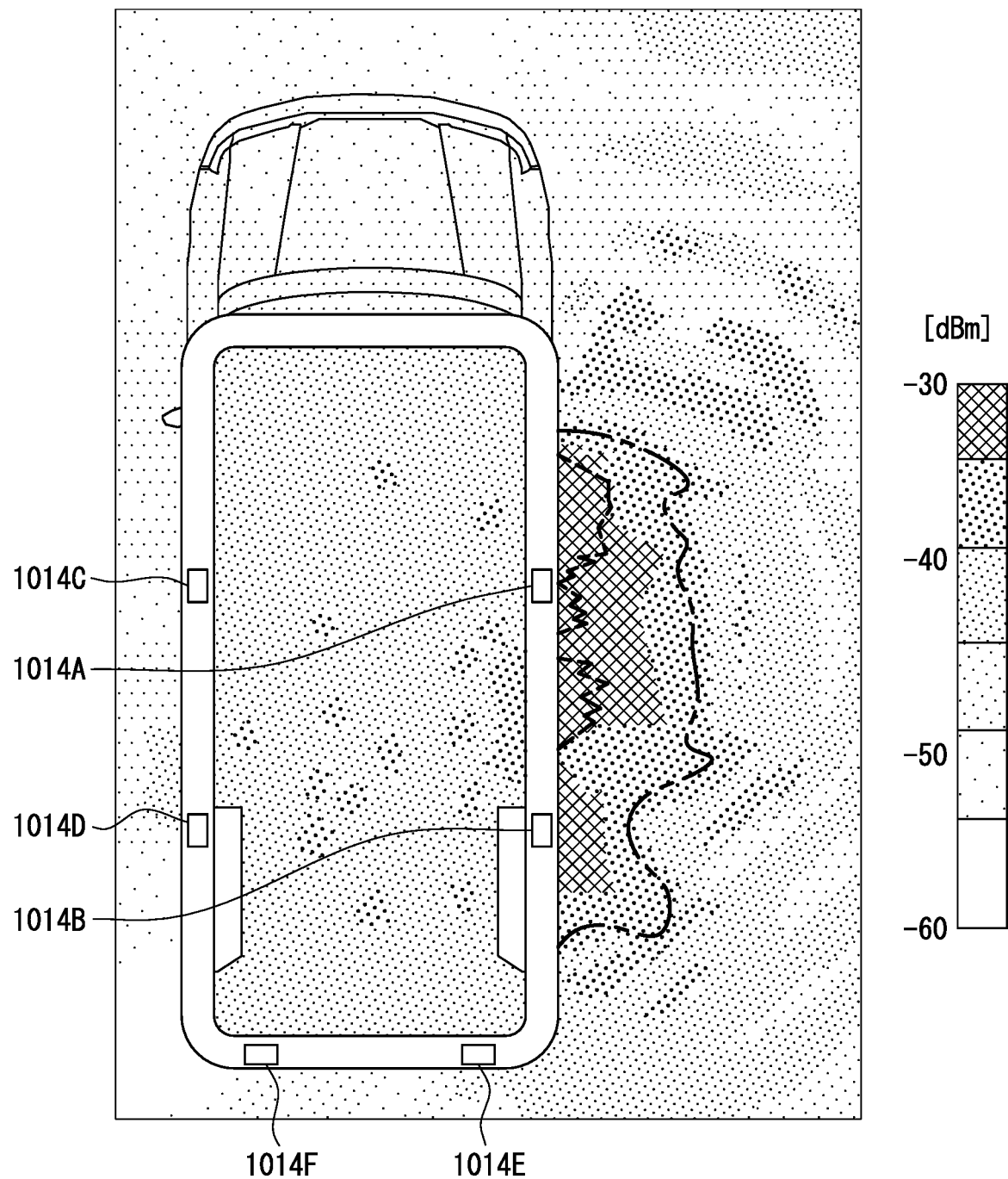
FIG. 30 is a diagram showing a result of measuring an exterior unit strength representative value for each position of the mobile terminal.

FIG. 30 is a diagram showing a result of testing a relationship between the exterior unit strength representative value Pb and the position of the mobile terminal 1002 in the vehicle interior and the vehicle exterior right region. The test result shown in FIG. 30 represents a value of the exterior unit strength representative value Pb when the mobile terminal 1002 is disposed at the same height as the windows of the vehicle Hv, specifically, at a position where a height from a road surface is 1.1 m, in a state where the doors of the vehicle Hv are closed.

If the test result that the maximum value of the exterior unit strength representative value Pb that can be observed when the mobile terminal 1002 is present in the vehicle compartment is −40 dBm is obtained, the exterior equivalent value Pout may be set to −37 dBm or the like in which a predetermined margin (3 dBm) is given to the maximum value −40 dBm. Since the exterior equivalent value Pout is set to the maximum value or more of the exterior unit strength representative value which can be observed when the mobile terminal 1002 is present in the vehicle interior, the situation that the exterior unit strength representative value Pb is equal to or more than the exterior equivalent value Pout means that the mobile terminal 1002 is present outside the vehicle compartment.

In addition, each of the vehicle exterior communication devices 1014 is mainly disposed so that the vehicle exterior region becomes a strong electric field area, and the leakage region of the vehicle interior communication device 1013 is included in the strong electric field area for the vehicle exterior communication device 1014. When the mobile terminal 1002 is present in the strong electric field area of the vehicle exterior communication device 1014, the vehicle exterior unit strength representative value Pb becomes a sufficiently high value (specifically, the exterior equivalent value Pout or more). Therefore, when the mobile terminal 1002 is present in the leakage region, the exterior unit strength representative value Pb can be expected to be equal to or greater than the exterior equivalent value Pout.

A one-dot chain line shown in FIG. 30 indicates a region in which the exterior unit strength representative value Pb is equal to or greater than the exterior equivalent value Pout outside the vehicle compartment (hereinafter, referred to as a vehicle exterior dominant region). A dashed line shown in FIG. 30 represents a vehicle exterior region (that is, a leakage region) in which the interior unit strength representative value Pa is equal to or greater than the interior equivalent value Pin, similarly to a broken line shown in FIG. 29.

As shown in FIG. 30, various vehicle exterior communication devices 1014 are provided so that the vehicle exterior dominant region covers the leakage region. As a result, even when the interior unit strength representative value Pa is equal to or greater than the interior equivalent value Pin due to the presence of the mobile terminal 1002 in the leakage region, the exterior unit strength representative value Pb is equal to or greater than the exterior equivalent value Pout. In other words, when the interior unit strength representative value Pa is equal to or larger than the interior equivalent value Pin, whether the mobile terminal 1002 is present in the vehicle interior or in the leakage region outside the vehicle compartment can be determined by comparing a magnitude of the exterior unit strength representative value Pb with the exterior equivalent value Pb.

In the determination process of S1206, when the exterior unit strength representative value Pb is equal to or larger than the exterior equivalent value Pout, an affirmative determination is made in S1206, and the process proceeds to S1208. On the other hand, when the exterior unit strength representative value Pb is less than the exterior equivalent value Pout, a negative determination is made in S1206, and S1207 is executed.

In S1207, the position determination unit F14 determines that the mobile terminal 1002 is present in the vehicle compartment, and the process flow ends. In S1208, the position determination unit F14 determines that the mobile terminal 1002 is present outside the vehicle compartment, and the flow ends. The determination results in S1207 and S1208 are stored in the RAM 1112 as the position information of the mobile terminal 1002, and are referred to by the vehicle control unit F15 or the like.

<Operation and Effects of Embodiment>

In the embodiment described above, the vehicle interior communication device 1013 is disposed so that the entire area in the vehicle compartment becomes a strong electric field area, in other words, the vehicle interior is filled with the radio waves of the short-range communication. According to the placement mode of the vehicle interior communication device 1013 described above, when the mobile terminal 1002 is present in the vehicle compartment, the interior unit strength representative value Pa becomes a sufficiently high value. The various vehicle exterior communication devices 1014 are disposed on the outer surface of the vehicle Hv so that the strong electric field area of the vehicle exterior communication device 1014 includes (in other words, covers) the leakage region of the vehicle interior communication device 1013.

The installation mode in which the vehicle exterior communication device 1014 covers the leakage region of the vehicle interior communication device 1013 is directed to a mode in which the exterior unit strength representative value Pb when the mobile terminal 1002 is present in the leakage region is installed to be sufficiently higher than the exterior unit strength representative value Pb which can be observed when the mobile terminal 1002 is present in the vehicle compartment. In other words, the vehicle exterior communication device 1014 is installed so that the reception strength at the vehicle exterior communication device 1014 when the mobile terminal 1002 is present in the leakage region is superior to the reception strength at the vehicle exterior communication device 1014 when the mobile terminal 1002 is present in the vehicle compartment.

According to the configuration in which the various strength observation devices are disposed in the manner described above, when the mobile terminal 1002 is present in the vehicle compartment, the individual strength representative value of at least one of the multiple vehicle interior communication devices 1013 is equal to or larger than the interior equivalent value Pin. Therefore, when the mobile terminal 1002 is present in the vehicle compartment, the interior unit strength representative value Pa is also equal to or larger than the interior equivalent value Pin. On the other hand, since the exterior equivalent value Pout is set to a sufficiently high value, when the mobile terminal 1002 is present in the vehicle compartment, the exterior unit strength representative value Pb is less than the exterior equivalent value Pout. Therefore, the authentication ECU 1011 can determine that the mobile terminal 1002 is present in the vehicle compartment based on the condition that the interior unit strength representative value Pa is equal to or greater than the interior equivalent value Pin and the exterior unit strength representative value Pb is less than the exterior equivalent value Pout.

When the mobile terminal 1002 is present in the leakage region outside the vehicle compartment, the exterior unit strength representative value Pb becomes equal to or larger than the exterior equivalent value Pout. This is because the vehicle exterior communication device 1014 is disposed so as to cover the leakage region of the vehicle interior communication device 1013 with a strong electric field area. Therefore, the authentication ECU 1011 can determine that the mobile terminal 1002 is present outside the vehicle compartment (specifically, the leakage region) based on the condition that the interior unit strength representative value Pa is equal to or greater than the interior equivalent value Pin and the exterior unit strength representative value Pb is equal to or greater than the exterior equivalent value Pout.

In addition, when the mobile terminal 1002 is present outside the vehicle compartment corresponding to the outside of the leakage region, the interior unit strength representative value Pa is less than the interior equivalent value Pin. Therefore, the authentication ECU 1011 can determine that the mobile terminal 1002 is present outside the vehicle compartment (specifically, outside the leakage region), based on the condition that the interior unit strength representative value Pa is less than the interior equivalent value Pin.

In other words, in the configuration described above, since the entire area in the vehicle interior is configured to be a strong electric field area, it can be determined that the mobile terminal 1002 is present in the vehicle interior even when the mobile terminal 1002 is present in a corner portion in the vehicle compartment. In addition, according to the configuration described above, the leakage region of the vehicle interior communication device 1013 is excluded from a vehicle interior determination area by use of the reception strength of the vehicle exterior communication device 1014. The vehicle interior determination area is an area in which the authentication ECU 1011 determines that the mobile terminal 1002 is present in the vehicle compartment based on the reception strength of the vehicle interior communication device 1013.

Figure 31:
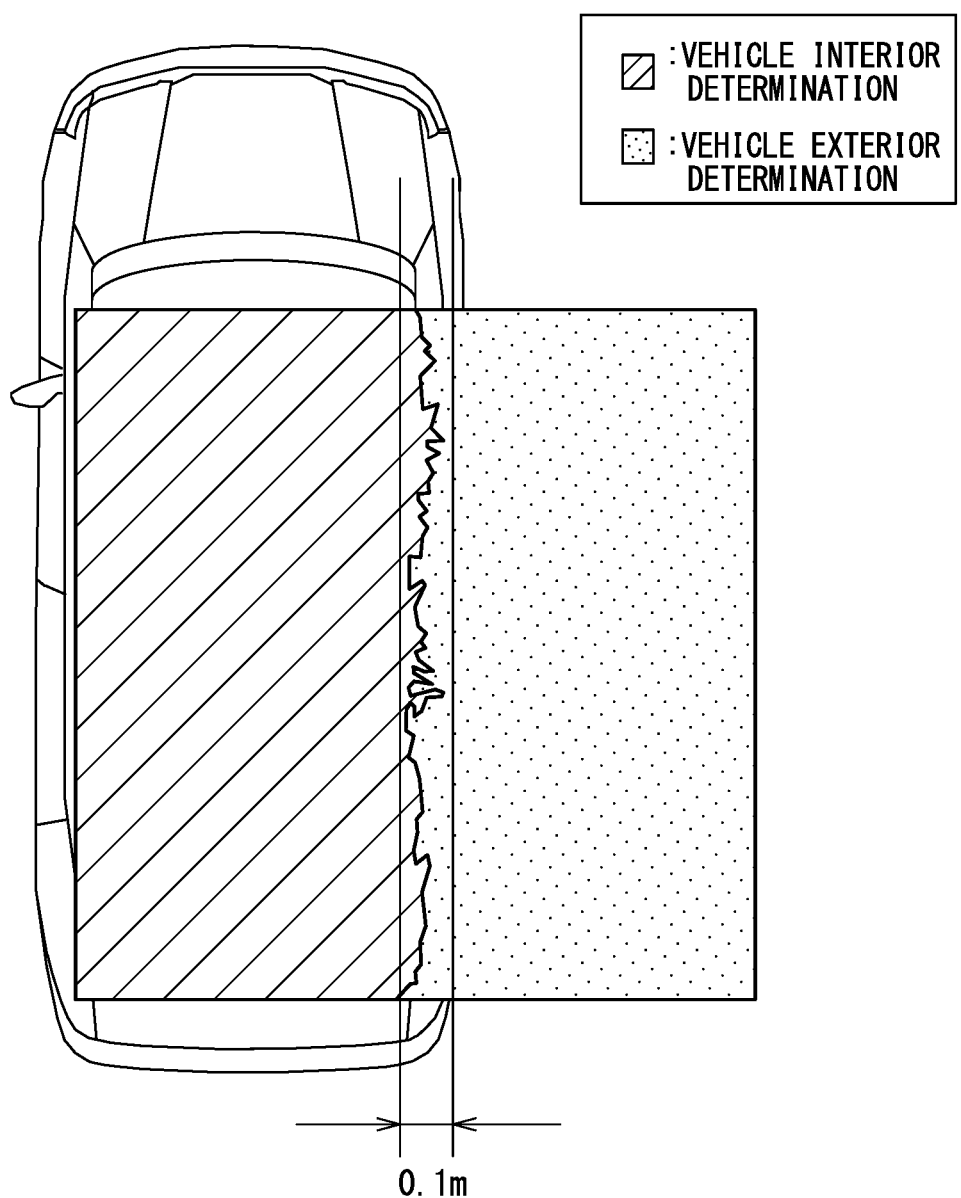
FIG. 31 is a diagram illustrating a determination accuracy of the position determination unit.

According to the configuration described above, as shown in FIG. 31, the determination of the vehicle interior or the vehicle exterior can be performed with a high accuracy. FIG. 31 is a diagram showing a result of testing the determination result of the position determination unit F14 in the test environment shown in FIG. 29 or FIG. 30. As shown in FIG. 31, according to the configuration of the present embodiment, the vehicle interior/vehicle exterior can be accurately determined in a region exceeding ±0.1 m of the window at a height in the vicinity of the window. This is equivalent to or higher than the determination accuracy of a vehicle electronic key system using the current LF, and the determination accuracy generally required in the technical field of the vehicle electronic key system can be sufficiently achieved.

The configuration described above is different from a conventional design concept in which the vehicle interior communication device 1013 is disposed so that a signal of the vehicle interior communication device 1013 does not leak to the vehicle exterior. The configuration described above is based on a technical idea that, on the assumption that the signal of the vehicle interior communication device 1013 leaks to the vehicle exterior, the possibility of erroneous determination in the leakage region is corrected by use of the reception strength of the vehicle exterior communication device 1014. Based on the technical idea described above, the strong electric field area of the vehicle interior communication device 1013 can be set to be larger. As a result, the number of vehicle interior communication devices 1013 disposed in the vehicle compartment can be reduced.

Incidentally, as another configuration (hereinafter, referred to as comparison configuration) for reducing the erroneous determination of the mobile terminal 1002 due to the placement location of the mobile terminal 1002, a configuration (hereinafter, referred to as assumed configuration) is also conceivable in which multiple vehicle interior communication devices whose output levels are narrowed down are distributed and disposed based on the configuration of the first comparison configuration. In the assumed configuration, the area is not separated by using the reception strength of the vehicle exterior communication device 1014 together. In the assumed configuration, the vehicle interior communication devices whose output levels are narrowed are densely disposed, thereby trying to perform both of the formation of a strong electric field area in the whole area of the vehicle compartment and the reduction of the leakage of radio waves to the vehicle exterior.

However, even if the assumed configuration described above is adopted, since the radio wave is continuously attenuated by the square of a distance, it is difficult to form an appropriate area in the vicinity of the window. Even when the mobile terminal is present outside the vehicle compartment at a location 10 cm or more away from the window, it can be erroneously determined that the mobile terminal is present in the vehicle compartment. In addition, in the assumed configuration, there is a problem that a large number of communication devices are required in order to bring the entire region of the vehicle compartment into the vehicle interior determination area. On the other hand, according to the embodiment described above, whether the mobile terminal 1002 is present in the vehicle compartment can be determined with a high accuracy while reducing the number of short-range communication devices 1003 disposed in the vehicle compartment.

Further, in the embodiment described above, the vehicle interior communication device 1013 is disposed in each area divided by the vehicle interior structure that can inhibit the propagation of radio waves, such as the front area, the rear area, and the trunk area. According to the installation mode described above, as shown in FIG. 29, since the entire region in the vehicle compartment becomes a strong electric field area, the possibility of erroneous determination that the mobile terminal 1002 is present outside the vehicle interior due to the placement location of the mobile terminal 1002 can be reduced.

In addition, the vehicle exterior communication device 1014 can be realized by using (in other words, diverting) the short-range communication device 1003 for forming a locking and unlocking area Lx outside the vehicle compartment, which will be described later as Modification 10. The locking and unlocking area Lx is an area for executing the locking/unlocking control of the door based on the user's pressing operation on the door handle button 1015 only when the mobile terminal 1002 is present in the area. The locking and unlocking area Lx is set to an area within 1 to 2 meters from various doors provided in the vehicle Hv including the trunk door. According to the configuration described above, the locking/unlocking control is performed only when the mobile terminal 1002 is present in the locking and unlocking area Lx in the vehicle exterior region, so that the security of the vehicle Hv can be enhanced.

In recent years, many vehicles have a vehicle control function using such a locking and unlocking area Lx as standard equipment. At present, a configuration in which the locking and unlocking area Lx is formed by use of the radio waves in the LF band is often employed, but in the future, it is expected that the locking and unlocking area Lx will be formed by providing the short-range communication device 1003 outside the vehicle compartment.

In other words, in the future, it can be expected that the short-range communication device 1003 for forming the locking and unlocking area Lx is disposed on the outer surface of the vehicle as the standard equipment. The short-range communication device 1003 for forming the locking and unlocking area Lx can be used as the vehicle exterior communication device 1014 described above. In other words, since the configuration described above can be realized by diversion of the equipment provided as the standard equipment, the introduction cost can be reduced.

While the embodiments of the present disclosure have been described above, the present disclosure is not limited to the embodiments described above, and various modifications to be described below are included in the technical scope of the present disclosure, and may be implemented by various modifications within a scope not departing from the spirit in addition to the modifications to be described below. For example, various modifications to be described below can be implemented in combination as appropriate within a scope that does not cause technical inconsistency.

Members having the same functions as those described in the above embodiment are denoted by the same reference numerals, and a description of the same members will be omitted. When only a part of the configuration is referred to, the configuration of the embodiment described above can be applied to other parts.

Third Embodiment

In the configuration described above, the vehicle interior communication device 1013 is disposed in each area divided by the vehicle interior structure that can inhibit the propagation of radio waves, such as the front area, the rear area, and the trunk area. As another embodiment, a configuration can be also employed in which only the front area communication device 1013A is used as the vehicle interior communication device 1013. In other words, only one vehicle interior communication device 1013 may be provided in the vehicle compartment.

Figure 32:
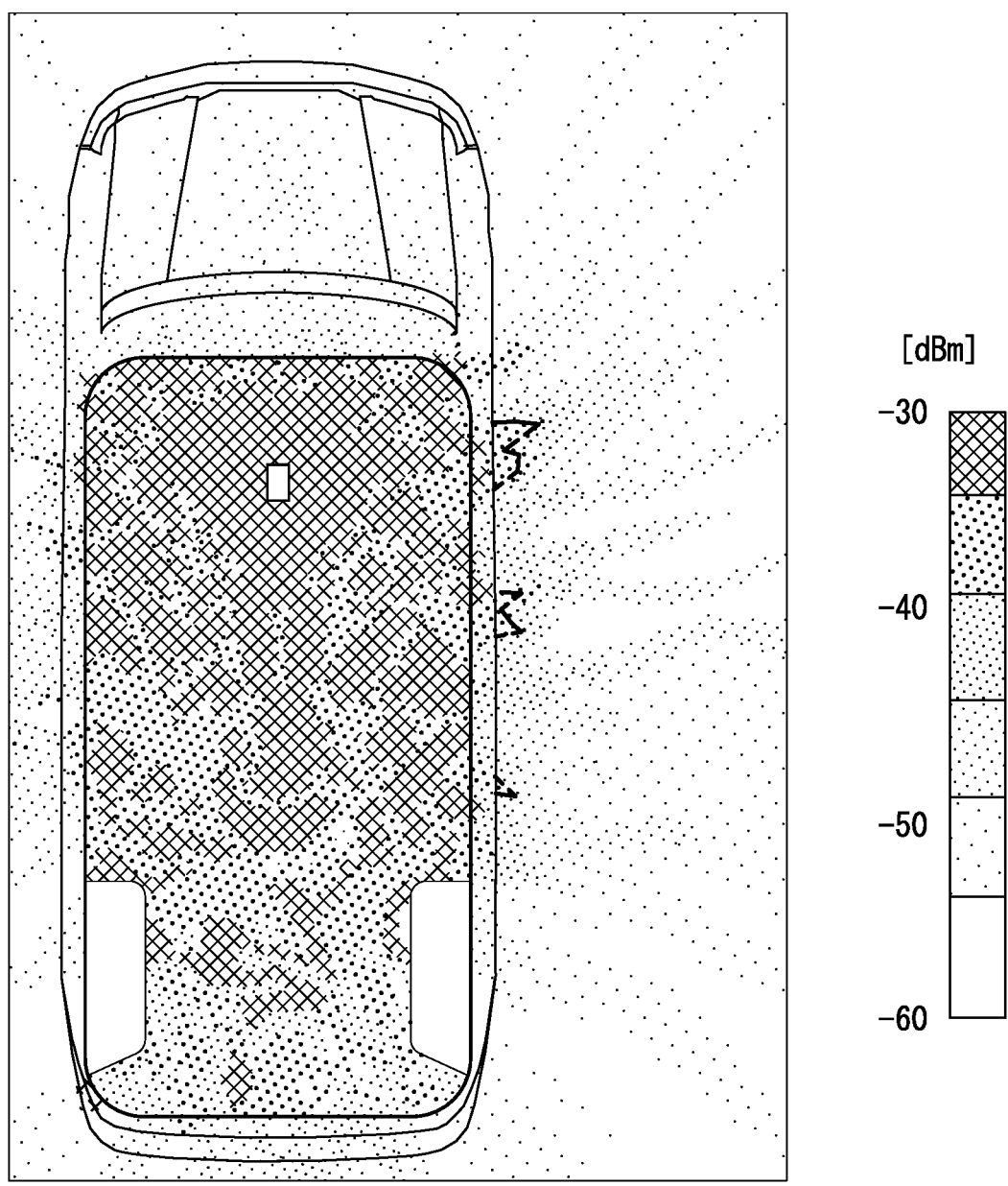
FIG. 32 is a diagram showing a result of measuring an interior unit strength representative value for each position of the mobile terminal according to a third embodiment.
Figure 33:
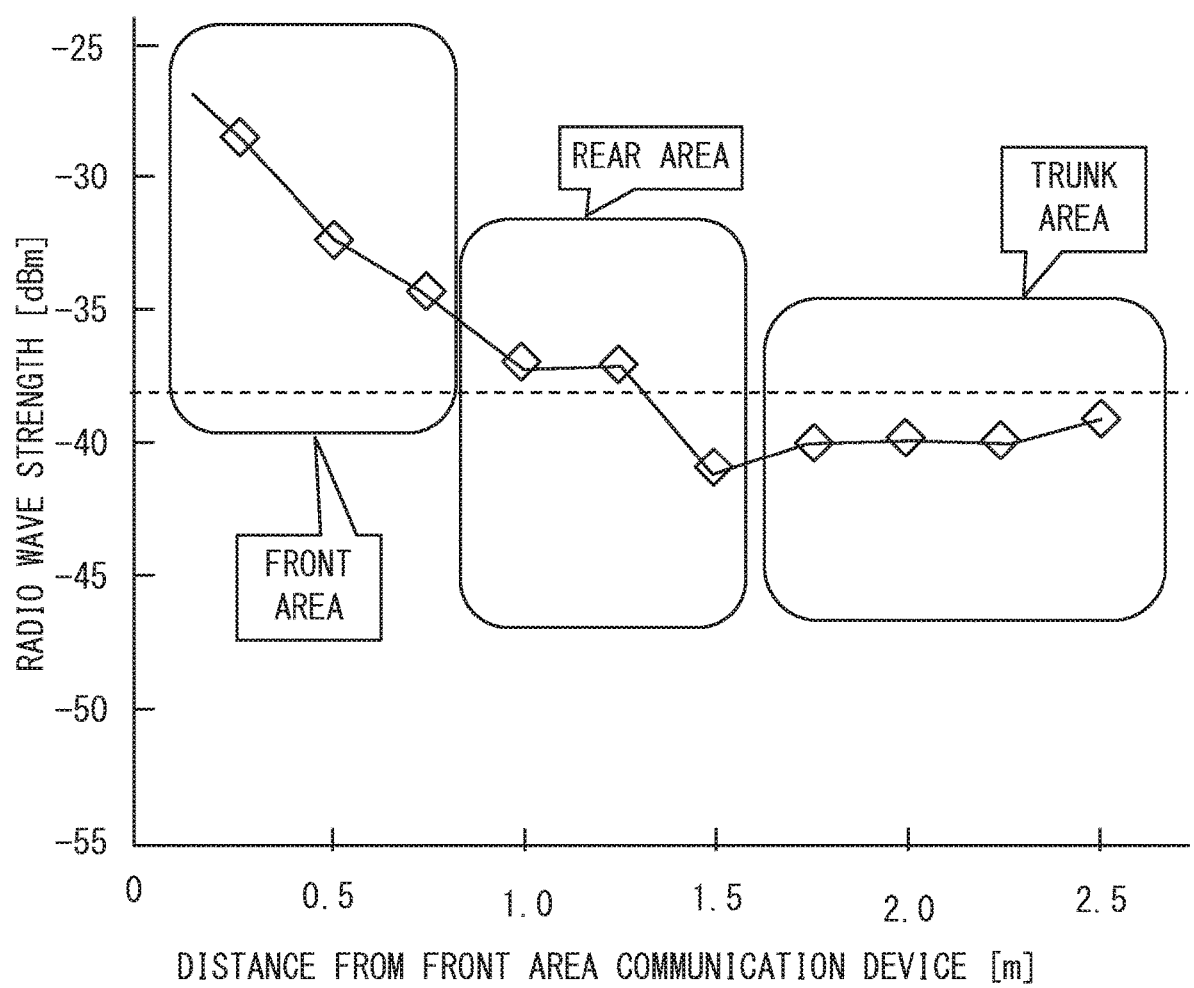
FIG. 33 is a graph showing a relationship between a distance from a front area communication device and a reception strength in the front area communication device according to the third embodiment.

In the configuration in which only the front area communication device 1013A is provided as the vehicle interior communication device 1013, as shown in FIGS. 32 and 33, the front area is a strong electric field area. However, in the configuration in which only the front area communication device 1013A is provided as the vehicle interior communication device 1013, in the rear area or the trunk area, a portion in which the reception strength of the signal from the mobile terminal 1002 falls below −38 dBm set as the interior equivalent value may occur. As shown in FIG. 33, since the trunk area is more distant than the rear area, and is also affected by the backrest portion 1042 of the rear seat, the trunk area is likely to be a weak electric field area. In addition, multiple dip points, which are points at which the radio wave strength drops sharply due to the multipath, can also be observed. Therefore, the configuration of the second embodiment can reduce the possibility of erroneously determining that the mobile terminal 1002 is present outside the vehicle compartment in a situation where the mobile terminal 1002 is present in the vehicle compartment, compared to the configuration in which the vehicle interior communication device 1013 is only the front area communication device 1013A.

Fourth Embodiment

Figure 34:
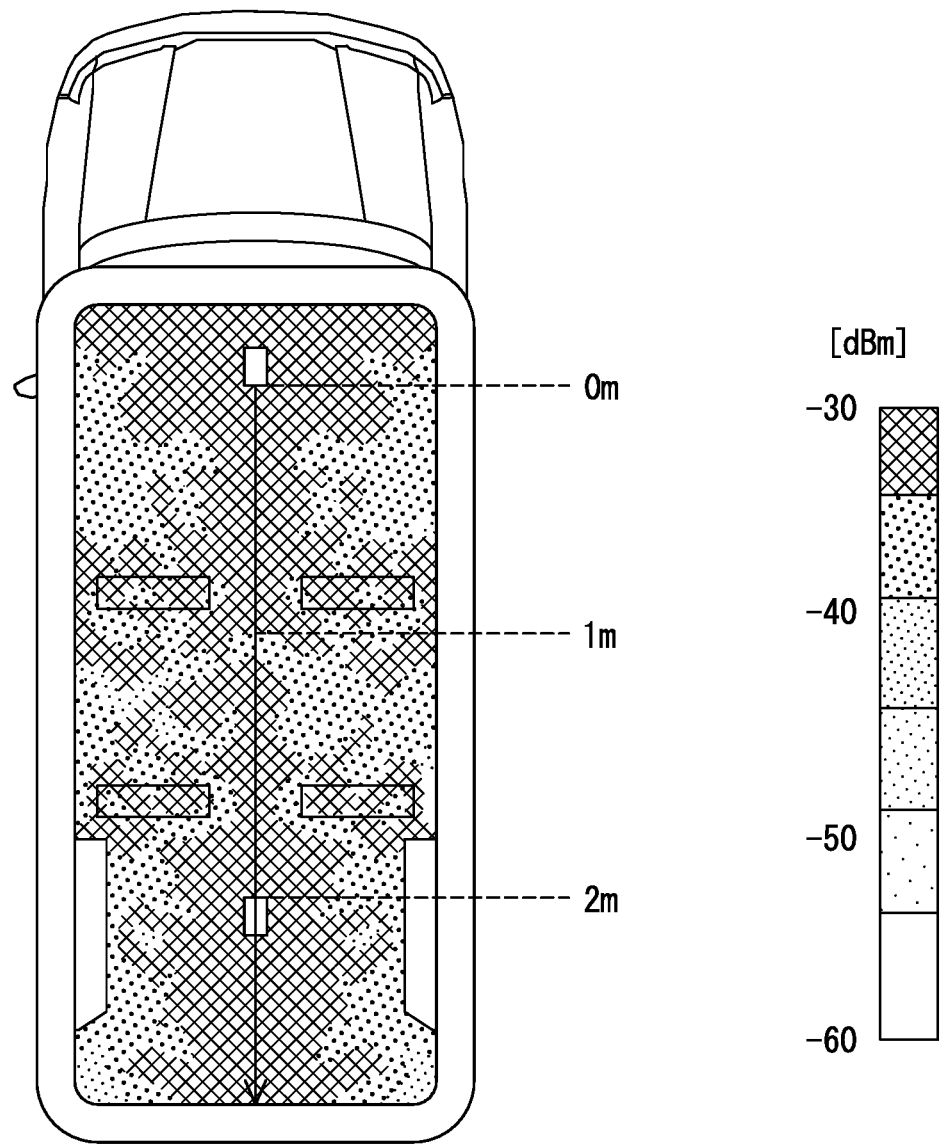
FIG. 34 is a diagram showing a result of measuring an interior unit strength representative value for each position of a mobile terminal according to a fourth embodiment.
Figure 35:
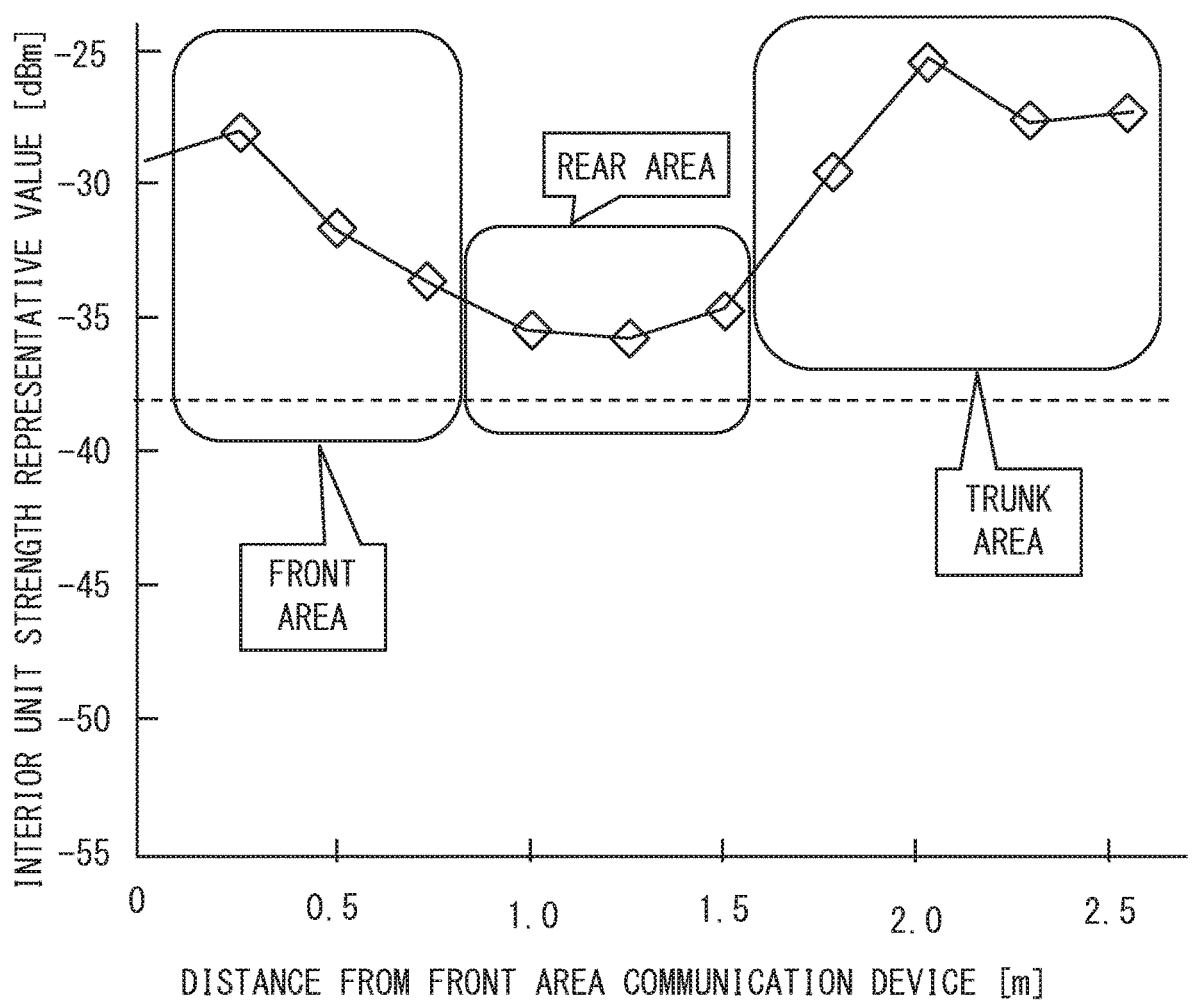
FIG. 35 is a graph showing a relationship between a distance from a front area communication device and an interior unit strength representative value according to the fourth embodiment.

As another embodiment, the in-vehicle system 1000 may adopt a configuration including only the front area communication device 1013A and the trunk area communication device 1013B as the vehicle interior communication device 1013. According to the configuration including the front area communication device 1013A and the trunk area communication device 1013B as the vehicle interior communication device 1013, as shown in FIGS. 34 and 35, compared to the configuration described in the third embodiment, the interior unit strength representative value Pa when the mobile terminal 1002 is present in the rear area or the trunk area can be increased. However, in the rear area, propagation of radio waves is easily inhibited by the backrest portion 1041 of the front seat and the backrest portion 1042 of the rear seat, and therefore, a weak electric field area is easily formed. In other words, from the viewpoint of reducing the possibility of erroneously determining that the mobile terminal 1002 is present outside the vehicle compartment even though the mobile terminal 1002 is present inside the vehicle compartment, the second embodiment in which the vehicle interior communication device 1013 is also provided in the rear area is more preferable.

In the second embodiment and the fourth embodiment, since the maximum value of the reception strength (that is, the interior unit strength representative value) in the multiple vehicle interior communication devices 1013 is defined as the reception strength of the signal from the mobile terminal 1002, an influence of a steep drop in the radio wave strength due to the multipath is hardly affected. The reason is as follows. The position of the dip point, which is a steep drop in the radio wave strength due to multipath, tends to change greatly by shifting the position of the antenna 1031 by a distance corresponding to one wavelength or more. Since the front area communication device 1013A and the trunk area communication device 1013B are separated from each other by a 2 m or more, the dip points formed by the respective vehicle interior communication devices 1013 are generated at different positions. For that reason, a portion serving as the dip point for a certain vehicle interior communication device 1013 does not easily become a dip point for the other vehicle interior communication device 1013.

Therefore, the dip points of the in-vehicle system 1000 as a whole are reduced according to the configuration in which the maximum value of the reception strengths at the two vehicle interior communication devices 1013 disposed at positions separated from each other by 0.1 m or more is handled as the reception strength of the signals from the mobile terminal 1002 for the in-vehicle system 1000. In other words, according to the second embodiment and the present embodiment, the dip points of the in-vehicle system 1000 as a whole can be reduced.

In the present embodiment, the configuration in which the in-vehicle system 1000 includes the front area communication device 1013A and the trunk area communication device 1013B as the vehicle interior communication device 1013 is disclosed, but the present disclosure is not limited to the above configuration. In addition, a configuration can be also employed in which the in-vehicle system 1000 includes the front area communication device 1013A and one rear area communication device as the vehicle interior communication device 1013. It is needless to say that a configuration can be also employed in which the in-vehicle system 1000 includes the front area communication device 1013A, the rear area first communication device 1013C, and the rear area second communication device 1013D as the vehicle interior communication device 1013. When the in-vehicle system 1000 includes the multiple vehicle interior communication devices 1013 and the antenna 1031 included in each of the vehicle interior communication devices 1013 is an omnidirectional antenna, it is preferable that those vehicle interior communication devices are disposed at a distance of one wavelength or more.

(Modification 5)

For each of the vehicle exterior communication devices 1014, a case is assumed in which the ease of receiving a signal from the mobile terminal 1002 (hereinafter, referred to as reception sensitivity) differs depending on the installation location, the installation posture, the internal configuration, and the like. Incidentally, the higher the reception sensitivity, the larger the above-mentioned strong electric field area. When the reception sensitivity differs for each vehicle exterior communication device 1014, there is a fear that the exterior equivalent value Pout cannot be appropriately determined in the configuration in which the exterior unit strength representative value Pb is determined by use of the individual strength representative value for each vehicle exterior communication device 1014 as it is.

For example, in the outer surface of the vehicle Hv, there is a place where a signal from the mobile terminal 1002 is present in the vehicle compartment can be easily received. Further, when the vehicle exterior communication device 1014 is mounted in such a place, there is a need to add a negative correction value in order to align the degree of leakage into the vehicle interior with the other vehicle exterior communication devices 1014. This is because, if the degrees of leakage of the vehicle exterior communication devices 1014 into the vehicle interior (in other words, reception sensitivities for the vehicle interior) are different from each other, the position of the mobile terminal 1002 cannot be properly determined by one exterior equivalent value Pout.

As a configuration to cope with such a concern, the position determination unit F14 may be configured to determine the exterior unit strength representative value Pb after performing correction according to the reception sensitivity of the vehicle exterior communication device 1014 on the individual strength representative value of each vehicle exterior communication device 1014.

For example, when the reception sensitivity of the rear first communication device 1014E is configured to be higher by about 5 dBm than the reception sensitivity of the other vehicle exterior communication devices 1014, a value obtained by subtracting about 5 dBm from the individual strength representative value calculated from the actual reception strength at the rear first communication device 1014E may be used as the individual strength representative value for the rear first communication device 1014E for determining the exterior unit strength representative value. In other words, as the individual strength representative value for each vehicle exterior communication device 1014, the exterior unit strength representative value may be determined by use of a value obtained by multiplying the representative value calculated from the actual reception strength by a correction corresponding to the reception sensitivity characteristic of the vehicle exterior communication device 1014. With execution of the above processing, the degree of leakage into the vehicle interior can be uniformly determined for each vehicle exterior communication device 1014 (in other words, the degree of leakage is apparently uniform), as a result of which, a threshold (that is, the exterior equivalent value Pout) with respect to the exterior unit strength representative value Pb can be set to an appropriate value.

The concept described above can be similarly applied to the interior unit strength representative value Pa. For each of the vehicle interior communication devices 1013, a case is assumed in which the ease of receiving a signal from the mobile terminal 1002 (hereinafter, referred to as reception sensitivity) differs depending on the installation location, the installation posture, the internal configuration, and the like. When the reception sensitivity differs for each vehicle interior communication device 1013, there is a fear that the interior equivalent value Pin cannot be appropriately determined in the configuration in which the interior unit strength representative value Pa is determined by use of the individual strength representative value for each vehicle interior communication device 1013 as it is.

For example, if there is a place in the vehicle interior where a signal from the mobile terminal 1002 which is present outside the vehicle compartment can be easily received, and the vehicle interior communication device 1013 is mounted in such a place, there is a need to add a negative correction value in order to align the degree of leakage to the vehicle exterior with the other vehicle interior communication devices 1013. This is because, if the degree of leakage of each of the vehicle interior communication devices 1013 to the vehicle exterior (in other words, the reception sensitivity to the vehicle exterior) is different from each other, the position of the mobile terminal 1002 cannot be properly determined with one interior equivalent value Pin.

Therefore, the position determination unit F14 may be configured to determine the interior unit strength representative value Pa after performing correction according to the reception sensitivity of the vehicle interior communication device 1013 on the individual strength representative value of each of the vehicle interior communication devices 1013. For example, when the trunk area communication device 1013B is configured to have a reception sensitivity lower than that of the other vehicle interior communication devices 1013 by about 5 dBm, a value obtained by adding about 5 dBm from the individual strength representative value calculated from the actual reception strength in the trunk area communication device 1013B may be used as the individual strength representative value for determining the interior unit strength representative value. In other words, as the individual strength representative value for each vehicle interior communication device 1013, the interior unit strength representative value Pa may be determined by use of a value obtained by multiplying the representative value calculated from the actual reception strength by a correction corresponding to the reception sensitivity characteristic of the vehicle interior communication device 1013. The correction amount for each short-range communication device 1003 may be registered in the flash memory 1113.

(Modification 6)

In the embodiment described above, the strength observation device has a configuration for identifying a communication partner by use of the terminal ID, but the present disclosure is not limited to the above configuration. For example, the mobile terminal 1002 may be configured to transmit a signal in which a specific code (hereinafter, referred to as an encryption code) indicating the mobile terminal 1002 is placed in a region where encryption is performed in a communication frame. In that case, the strength observation device specifies that the communication partner is the mobile terminal 1002 based on the condition that the received data includes the encryption code. The strength observation device also provides the reception strength for signals containing both the terminal ID and the cryptographic code to the authentication ECU 1011. According to the configuration in which the communication partner is specified by use of the cryptographic code as described above, another communication device can be inhibited from impersonating the mobile terminal 1002, and the security of the electronic key system for a vehicle can be enhanced.

(Modification 7)

Figure 36:
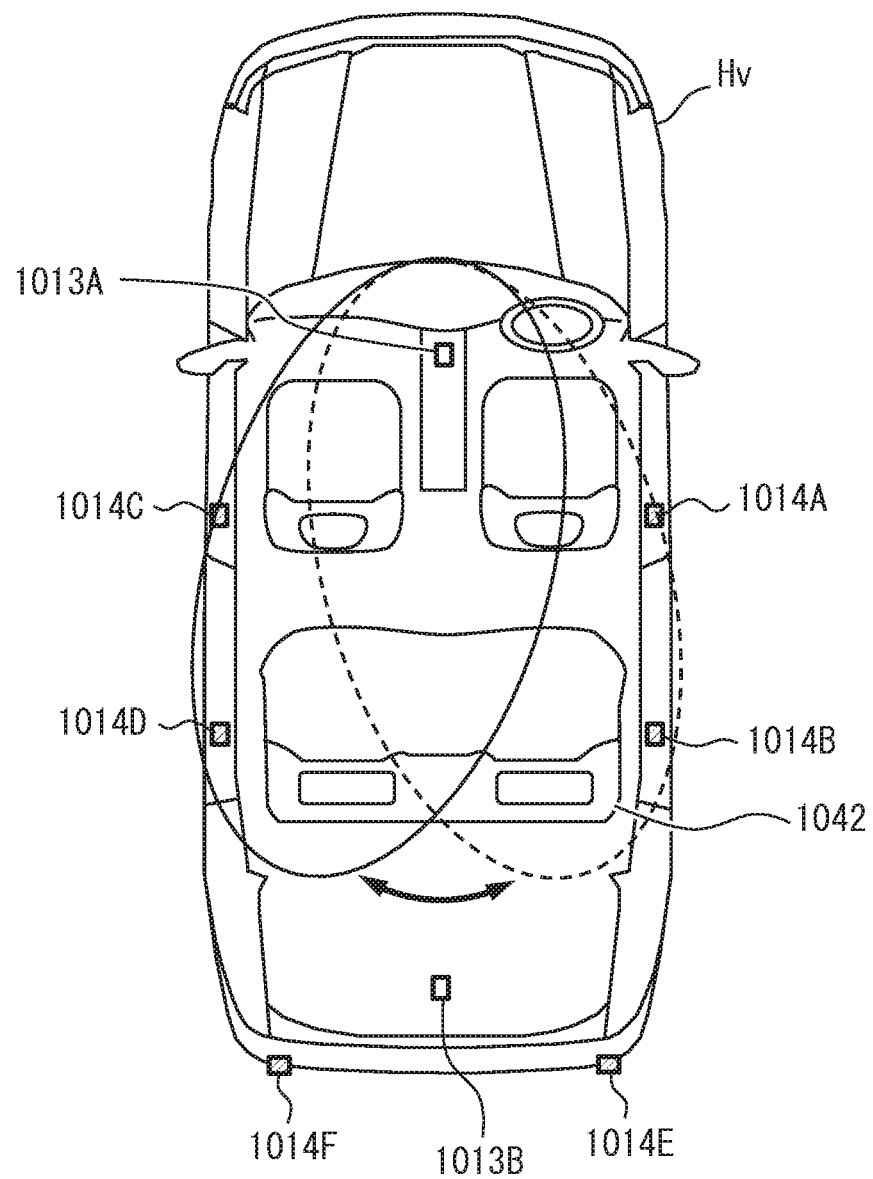
FIG. 36 is a diagram illustrating the configuration and operation of a front area communication device in Modification 7.

The front area communication device 1013A may include an antenna 1031 having directivity, and may be configured to be able to dynamically change a central direction of the directivity, (so-called main beam direction). In that instance, the authentication ECU 1011 sequentially changes the main beam direction of the front area communication device 1013A while a communication connection between the data communication device 1012 and the mobile terminal 1002 is established. FIG. 36 conceptually shows a movable range of the main beam.

If the main beam direction of the front area communication device 1013A is changed, an occurrence location of the dip point originating from a multipath changes, and therefore, an influence of the multipath is hardly received by dynamically changing the main beam direction. As a result, the individual strength representative value can be expected to be a value in which the influence of multipath is inhibited. The technical idea described above can be applied to other vehicle interior communication devices 1013.

(Modification 8)

In Modification 7 described above, a configuration has been described in which the individual strength representative value in which the influence of the multipath is inhibited is generated by sequentially changing the directivity of the front area communication device 1013A, but the configuration for generating the individual strength representative value in which the influence of the multipath is inhibited is not limited to the above example.

Figure 37:
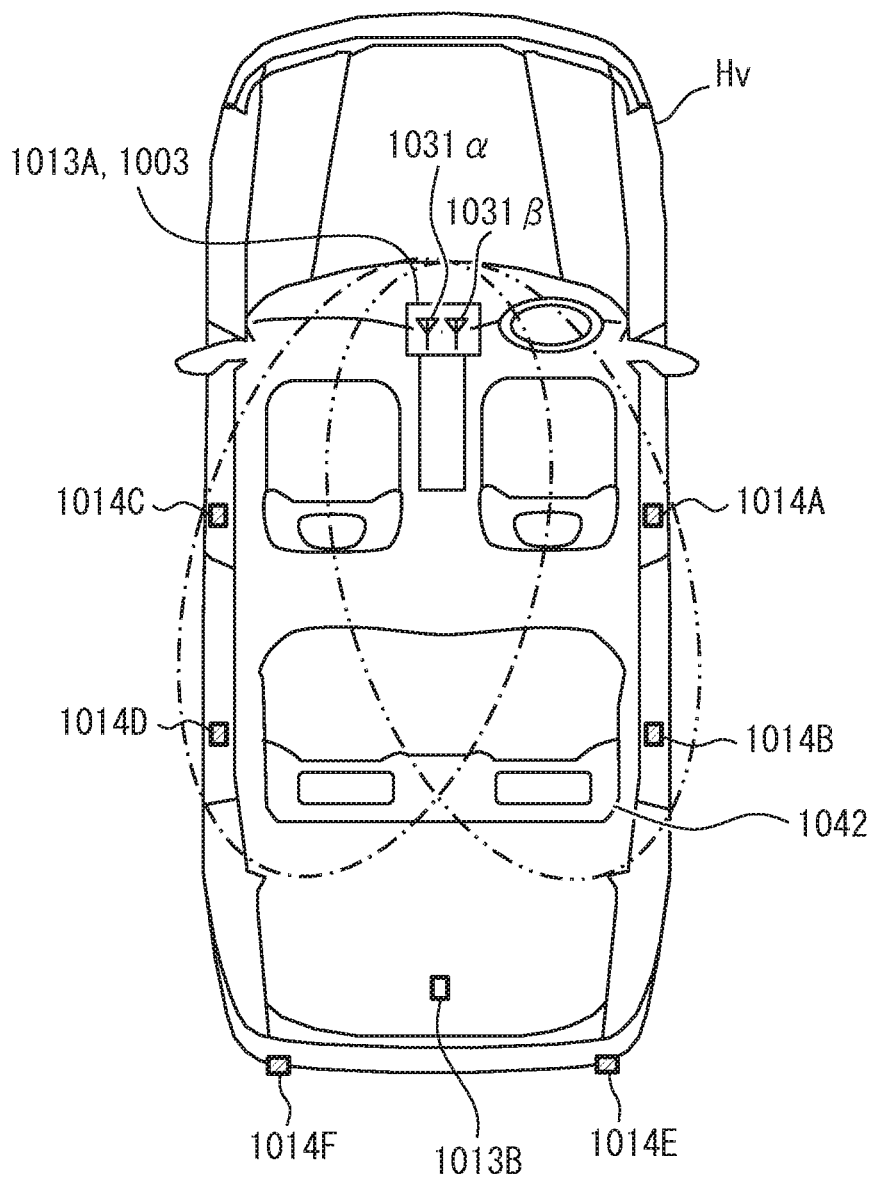
FIG. 37 is a diagram illustrating a configuration of a front area communication device in Modification 8.

For example, as shown in FIG. 37, as the front area communication device 1013A, a short-range communication device 1003 including an antenna 1031α and an antenna 1031β which form main beams in different directions may be disposed. In the figure, a one-dot chain line indicates the directivity of the antenna 1031α, and a two-dot chain line indicates the directivity of the antenna 1031β. Even with such a configuration, since the generation points of the dip points originating from the multipath are different between the antennas 1031α and 31β, the individual strength representative value in which the influence of the multipath is inhibited can be generated. According to the configuration of the modification, there is no need to set a distance between the antenna 1031α and the antenna 1031β to a distance corresponding to one wavelength or more.

The antenna 1031α and the antenna 1031β may be accommodated in separate housings. In other words, the vehicle interior communication devices in which the centers of directivity are oriented in different directions may be integrally configured or may be configured separately.

(Modification 9)

Figure 38:
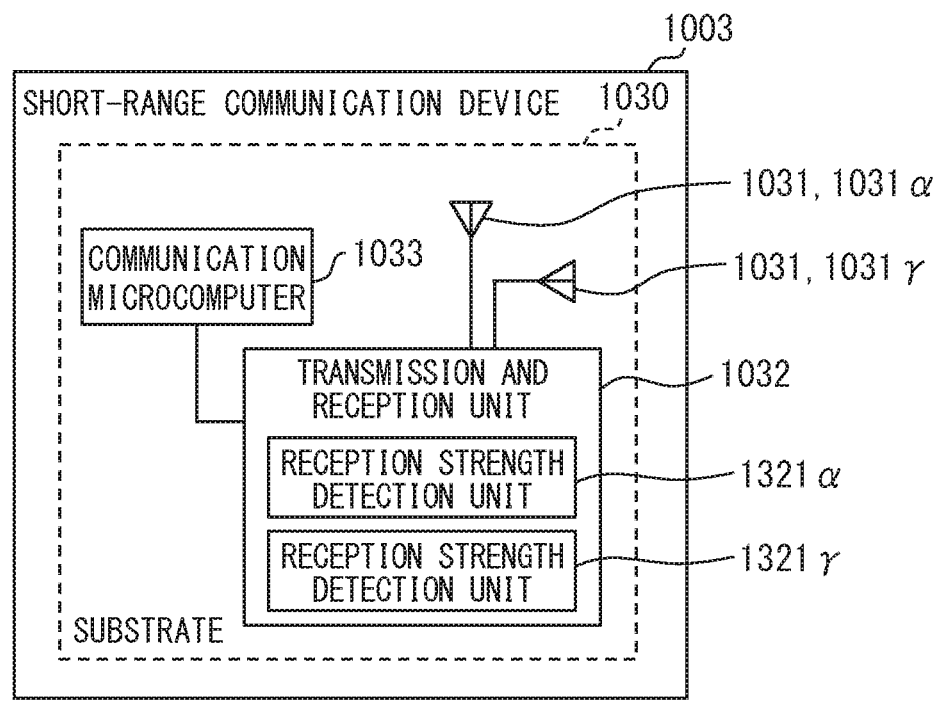
FIG. 38 is a block diagram showing a configuration of a short-range communication device in Modification 9.

In connection with Modification 8, as shown in FIG. 38, a short-range communication device 1003 having antennas 1031α and 1031γ whose polarization planes to be transmitted and received are different from each other may be disposed as the front area communication device 1013A. For example, the antenna 1031α is an antenna 1031 for transmitting and receiving a horizontally polarized wave, and the antenna 1031γ is an antenna 1031 for transmitting and receiving a vertically polarized wave. Even with the configuration described above, the same effects as in Modification 8 can be obtained.

A reception strength detection unit 1321α shown in FIG. 38 is configured to detect the reception strength of a signal received by the antenna 1031α. A reception strength detection unit 1321γ shown in FIG. 38 is configured to detect the reception strength of a signal received by the antenna 1031α.

The configuration including the antenna 1031α and the reception strength detection unit 1321α corresponds to a vehicle interior communication device that transmits and receives the vertically polarized wave. The configuration including the antenna 1031γ and the reception strength detection unit 1321γ corresponds to the vehicle interior communication device that transmits and receives the horizontally polarized wave. The antenna 1031α and the antenna 1031γ may be accommodated in separate housings. In other words, the vehicle interior communication device for transmitting and receiving the vertically polarized wave and the vehicle interior communication device for transmitting and receiving the vertically polarized wave may be integrally configured or may be configured separately.

In the above description, the antenna 1031α is an antenna 1031 that transmits and receives the vertically polarized wave, and the antenna 1031γ is an antenna 1031 that transmits and receives the horizontally polarized wave, however, the present disclosure is not limited to the above configuration. The antenna 1031α may be configured to transmit and receive radio waves having a polarization plane inclined by 45 degrees with respect to the vehicle horizontal plane, and the antenna 1031γ may be configured to transmit and receive radio waves having a polarization plane inclined by 135 degrees with respect to the vehicle horizontal plane. In this example, the polarization plane is a plane parallel to the direction in which the electric field vibrates with respect to a traveling direction of the radio wave, and corresponds to a vibration plane of the electric field.

The antenna 1031α and the antenna 1031γ may be configured so as to transmit and receive the linearly polarized wave having different electric field vibration directions by 45 degrees or more, ideally 90 degrees. If the radio wave to be transmitted and received by the antenna 1031α is the horizontally polarized wave, the antenna 1031γ may be configured to transmit and receive the linearly polarized wave having a polarization plane in which an angle with the vehicle horizontal plane is 45 degrees or more. The vibration direction of the electric field in the radio wave to be transmitted and received by the antenna 1031α corresponds to a first direction. The vibration direction of the electric field in the radio wave to be transmitted and received by the antenna 1031γ corresponds to a second direction. It is preferable that the first direction and the second direction are set to be different from each other by 90 degrees.

(Modification 10)

When the mobile terminal 1002 is determined to be present outside the vehicle compartment, the position determination unit F14 may determine whether the mobile terminal 1002 is present in the locking and unlocking area Lx of the vehicle Hv based on the individual strength representative value for each vehicle exterior communication device 1014.

For example, when the exterior unit strength representative value Pb is equal to or larger than a predetermined threshold (hereinafter, referred to as a locking and unlocking threshold), the position determination unit F14 determines that the mobile terminal 1002 is present in the locking and unlocking area Lx. On the other hand, when the exterior unit strength representative value Pb is less than the locking and unlocking threshold, the position determination unit F14 determines that the mobile terminal 1002 is not present in the locking and unlocking area Lx. As described above, the locking and unlocking area Lx is an area set as a condition for the vehicle control unit F15 to execute the process of controlling a locked-unlocked state of the door provided in the vehicle Hv.

The vehicle control unit F15 executes a process of controlling the locked-unlocked state of the door based on the condition that the mobile terminal 1002 is present in the locking and unlocking area Lx and the condition that the authentication of the mobile terminal 1002 is successful. The locking and unlocking area Lx is set to an area within several meters from various doors provided in the vehicle Hv outside the vehicle compartment. In this example, the term "door" includes not only a door for a driver's seat and a door for a front passenger seat, but also a trunk door.

Figure 39:
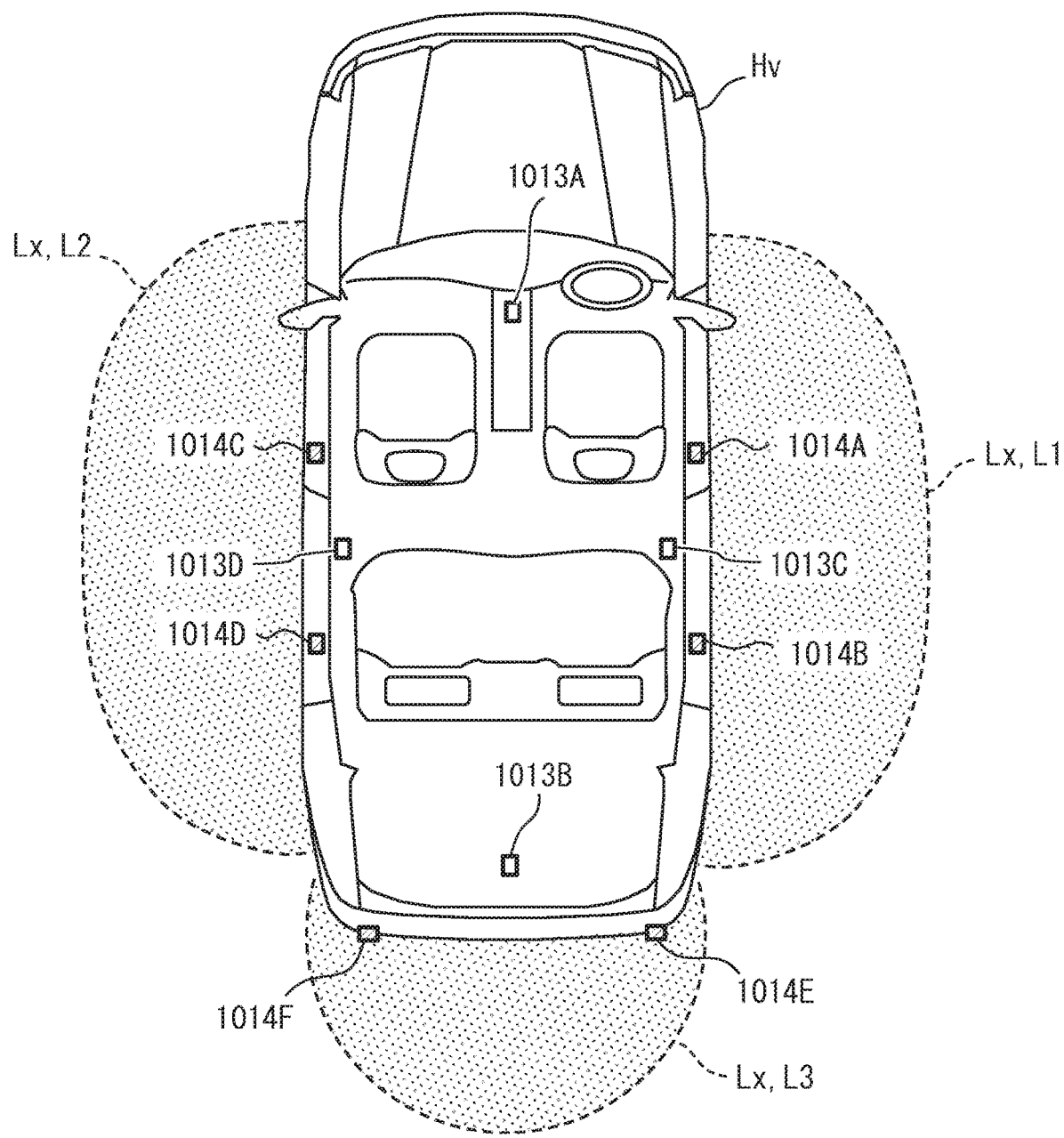
FIG. 39 is a diagram illustrating the operation of a position determination unit in Modification 10.

As shown in FIG. 39, the vehicle Hv preferably has a right locking and unlocking area L1, a left locking and unlocking area L2, and a trunk locking and unlocking area L3 for different doors as the locking and unlocking area Lx. Portions hatched by a dot pattern in FIG. 39 conceptually represents the locking and unlocking area Lx.

The right locking and unlocking area L1 is a locking and unlocking area Lx for controlling the locked-unlocked state of the door on the right side of the vehicle. The right locking and unlocking area L1 is set so as to include the vicinity of the front right door and the vicinity of the rear right door. The right locking and unlocking area L1 is formed by the right side first communication device 1014A and the right side second communication device 1014B. The right locking and unlocking area L1 may be divided into a locking and unlocking area Lx for the front right door and a locking and unlocking area Lx for the rear right door.

The left locking and unlocking area L2 is a locking and unlocking area Lx for controlling the locked-unlocked state of the door on the left side of the vehicle. The left locking and unlocking area L2 is set so as to include the vicinity of the front left door and the vicinity of the rear left door. The left locking and unlocking area L2 is formed by the left side first communication device 1014C and the left side second communication device 1014D. The left locking and unlocking area L2 may be divided into a locking and unlocking area Lx for the front left door and a locking and unlocking area Lx for the rear left door.

The trunk locking and unlocking area L3 is a locking and unlocking area Lx for controlling the locked-unlocked state of the trunk door. The trunk locking and unlocking area L3 is set so as to include the vicinity of the trunk door. The trunk locking and unlocking area L3 is formed by the rear first communication device 1014E and the rear second communication device 1014F. The vicinity of the door is a region within a predetermined distance (for example, 0.7 m or 1 m or 1.5 m) from the door handle.

In the case where the multiple locking and unlocking areas Lx for different doors are set in the vehicle Hv, the position determination unit F14 determines that the mobile terminal 1002 is present in the right locking and unlocking area L1, for example, when at least one of the individual strength representative value of the right side first communication device 1014A and the individual strength representative value of the right side second communication device 1014B is equal to or larger than the locking and unlocking threshold.

In addition, the position determination unit F14 determines that the mobile terminal 1002 is present in the left locking and unlocking area L2 when at least one of the individual strength representative value of the left side first communication device 1014C and the individual strength representative value of the left side second communication device 1014D is equal to or larger than the locking and unlocking threshold. Further, the position determination unit F14 determines that the mobile terminal 1002 is present in the trunk locking and unlocking area L3 when at least one of the individual strength representative value of the rear first communication device 1014E and the individual strength representative value of the rear second communication device 1014F is equal to or larger than the locking and unlocking threshold.

According to the configuration described above, the position determination unit F14 can specify whether the mobile terminal 1002 is present in the right locking and unlocking area L1, the left locking and unlocking area L2, the trunk locking and unlocking area L3, or any other area. The other area is a region that does not correspond to any of the right locking and unlocking area L1, the left locking and unlocking area L2, and the trunk locking and unlocking area L3.

The vehicle control unit F15 performs a vehicle control to lock or unlock the door provided on the right side of the vehicle on condition that the position determination unit F14 determines that the mobile terminal 1002 is present in the right locking and unlocking area L1. The vehicle control described above may be executed with the user's operation on the door handle button 1015 as a trigger, or may be automatically executed with the user's entry into the right locking and unlocking area L1 as a trigger.

When the multiple mobile terminals 1002 are registered in the in-vehicle system 1000 and the in-vehicle system 1000 can acquire signals from the multiple mobile terminals 1002, the position determination unit F14 may specify the position of each mobile terminal 1002 based on the reception strength of each mobile terminal 1002. According to the mode described above, convenience in the case where one vehicle Hv is shared by multiple users can be improved. Further, since the user seated in each seat can be specified from the terminal ID of the mobile terminal 1002, a service can be implemented according to the user. The service corresponding to the user includes, for example, automatic adjustment of the seat position, adjustment of the temperature and air volume of an air conditioner, and the like.

(Modification 11)

Figure 40:
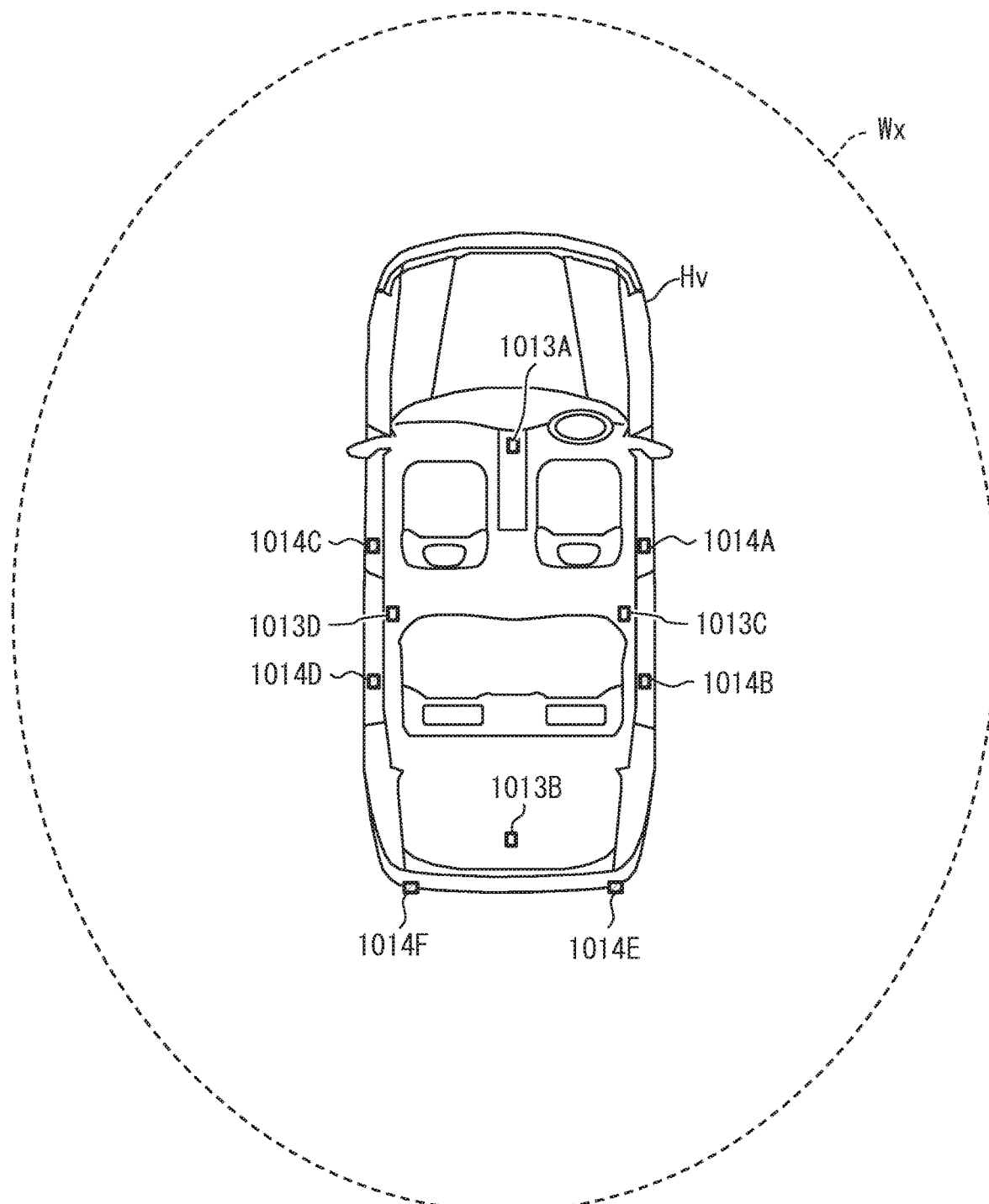
FIG. 40 is a diagram illustrating the operation of a position determination unit in Modification 11.

The position determination unit F14 may be configured to determine whether the mobile terminal 1002 is present in a welcome area Wx shown in FIG. 40 based on the exterior unit strength representative value Pb when the position determination unit F14 determines that the mobile terminal 1002 is present outside the vehicle compartment.

The welcome area Wx is an area in which the vehicle control unit F15 executes a predetermined welcome process based on the detection of the entry of the mobile terminal 1002 into the area by the position determination unit F14. The welcome process is, for example, a process of lighting the vehicle interior and the vehicle exterior, or a process of operating the air conditioner. It is preferable that the content of the vehicle control executed as the welcome process is configured to be appropriately changeable by the user.

The position determination unit F14 according to the present Modification 11 determines that the mobile terminal 1002 is present in the welcome area Wx when, for example, the exterior unit strength representative value Pb becomes equal to or larger than a predetermined approach detection threshold. The approach detection threshold corresponds to a parameter defining a region to be the welcome area Wx. The approach detection threshold is set so that a region outside the vehicle compartment, which is 5 m or less from the vehicle Hv, becomes the welcome area Wx, for example.

In the present modification, the welcome area Wx is formed by use of all the vehicle exterior communication devices 1014 included in the in-vehicle system 1000, but the present disclosure is not limited to the above example. The welcome area Wx may be formed by use of a part of the multiple vehicle exterior communication devices 1014 included in the in-vehicle system 1000. For example, the welcome area Wx may be formed by use of the right side first communication device 1014A, the left side first communication device 1014C, the rear first communication device 1014E, and the rear second communication device 1014F. In that case, when at least one of the individual strength representative values of the right side first communication device 1014A, the left side first communication device 1014C, the rear first communication device 1014E, and the rear second communication device 1014F is equal to or larger than the approach detection threshold, it is determined that the mobile terminal 1002 is present in the welcome area Wx.

(Modification 12)

The mobile terminal 1002 may have a function of remotely controlling the in-vehicle system 1000 (hereinafter, referred to as a remote control function). For example, the mobile terminal 1002 may have a function of operating an air conditioner of the vehicle Hv or automatically parking the vehicle Hv based on user's operation on the mobile terminal 1002. Those functions may be provided when a computer included in the mobile terminal 1002 executes predetermined application software (hereinafter, referred to as a remote control application).

In that case, the mobile terminal 1002 transmits a control signal corresponding to the content of the user's instruction (hereinafter, referred to as a command signal) to the in-vehicle system 1000 by a cryptographic communication with the data communication device 1012. The vehicle control unit F15 of the in-vehicle system 1000 executes the vehicle control according to a command signal transmitted from the mobile terminal 1002. The signals exchanged between the mobile terminal 1002 and the in-vehicle system 1000 include such a command signal.

The mobile terminal 1002 may be configured to acquire information indicating a state of the vehicle Hv from the in-vehicle system 1000 by a short-range communication and notify the user of the acquired information. The information indicating a state of the vehicle Hv includes the locked or unlocked state of the door, a vehicle interior temperature, the remaining amount of fuel, the remaining battery charge, and the like. The signal exchanged between the mobile terminal 1002 and the in-vehicle system 1000 includes a signal indicating the state of the vehicle Hv. Such a function may also be provided by causing a computer incorporated in the mobile terminal 1002 to execute predetermined application software (hereinafter, referred to as a state monitoring application).

(Modification 13)

In the various embodiments described above, the configuration in which two vehicle exterior communication devices 1014 are disposed on each of the right side surface and the left side surface of the vehicle Hv has been disclosed, but the present disclosure is not limited to the above configuration. One vehicle exterior communication device 1014 may be disposed on each of the right side surface and the left side surface of the vehicle Hv.

Figure 41:
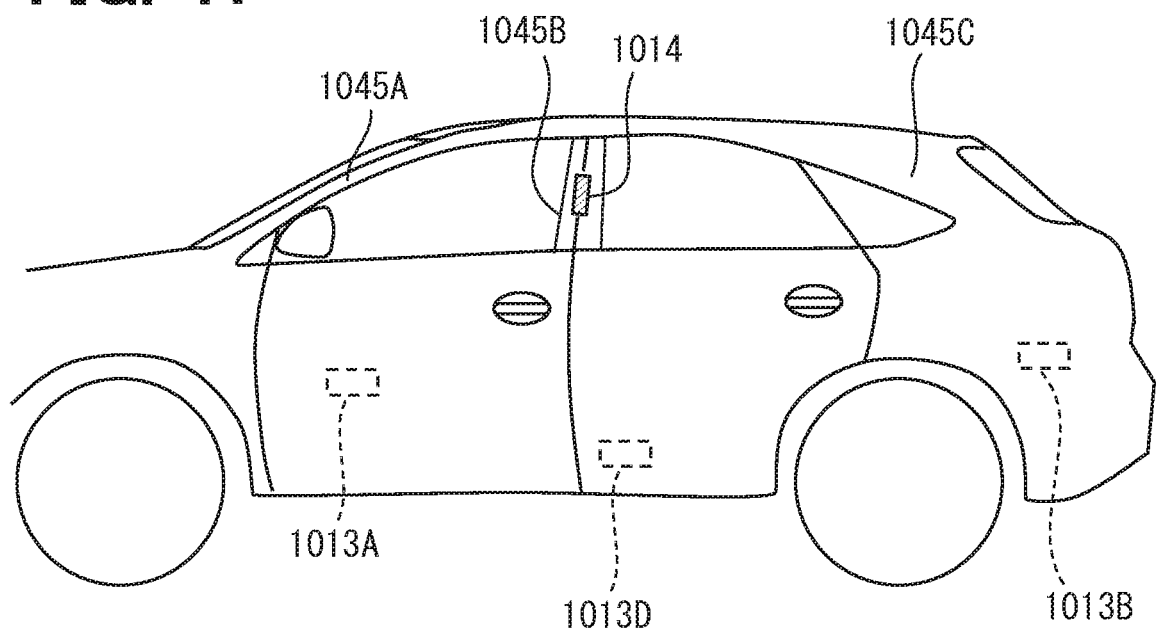
FIG. 41 is a diagram illustrating an installation position of a vehicle exterior communication device in Modification 13.
Figure 42:
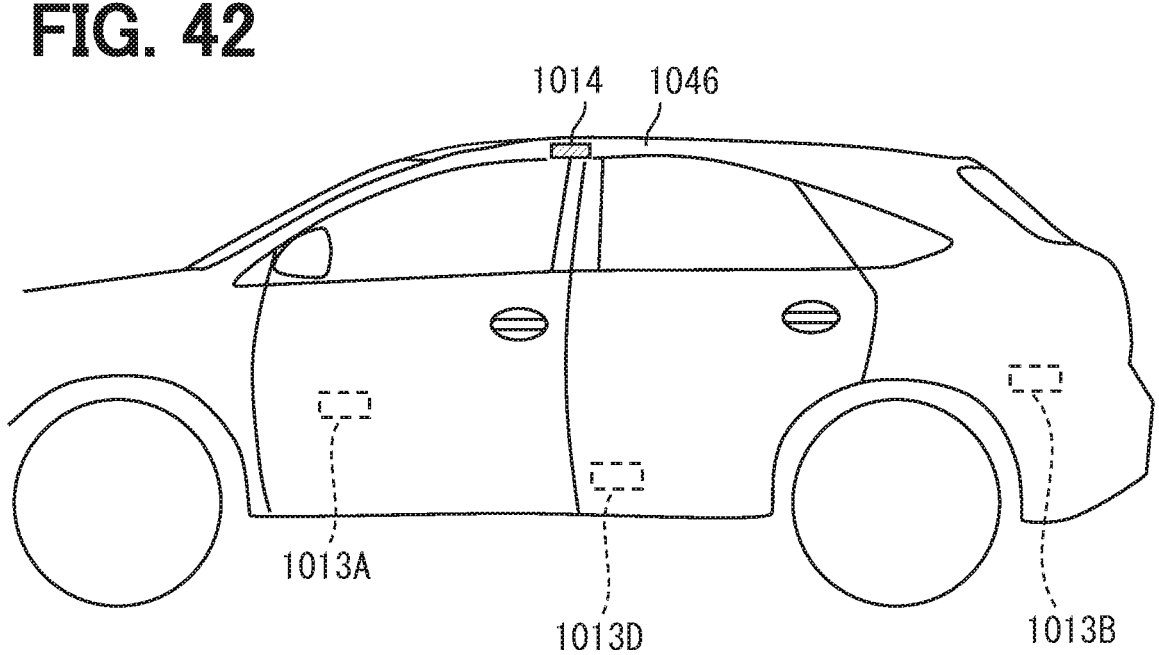
FIG. 42 is a diagram illustrating the installation position of the vehicle exterior communication device in Modification 13.

As shown in FIG. 41, the vehicle exterior communication device 1014 may be disposed in the B pillar 45B of the vehicle Hv. It is needless to say that the vehicle exterior communication device 1014 may be disposed in the A pillar 45A or the C pillar 45C. Further, as shown in FIG. 42, the vehicle exterior communication device 1014 may be disposed in the vicinity of a boundary between a side surface of the vehicle Hv and a roof portion (hereinafter, referred to as a side upper end) 1046. The configuration described above corresponds to a configuration in which the vehicle exterior communication device 1014 is provided in a portion positioned above the window. The side upper end 1046 corresponds to a portion of the roof portion of the vehicle Hv which comes in contact with an upper end of the door of the vehicle Hv.

The various pillars and the side upper end 1046 correspond to a window vicinity region on the outer surface of the vehicle Hv. In addition, a portion within one wavelength from a lower end of the window can also be included in the window vicinity region. In other words, the window vicinity region in this example is directed to an outer surface within one wavelength from the window frame portion. The various vehicle exterior communication devices 1014 are preferably disposed in an installation manner that brings the outer portion of the window into a strong electric field area. As parameters configuring the installation mode of the vehicle exterior communication device 1014, a mounting position, a mounting posture (in other words, directivity) and the like can be adopted.

(Modification 14)

In the embodiment described above, a mode in which the position determination system for a vehicle according to the present disclosure is applied to the vehicle Hv having the metal body is described, but the vehicle suitable as an application destination of the position determination system for a vehicle is not limited to the vehicle having the metal body.

For example, the various body panels configuring the body of the vehicle Hv may be made of a carbon-based resin filled with a sufficient amount of carbon to attenuate the propagation of radio waves by 5 dB or more. A vehicle having the body described above is also suitable as an application object of the position determination system for a vehicle.

The body panels of the vehicle Hv may be made of a general-purpose resin containing no carbon. In the case where the body panels of the vehicle Hv is made of a general-purpose resin containing no carbon, it is preferable that a specific metal pattern having a function of blocking the propagation of radio waves is provided on the surface of the body panels. The metal pattern (hereinafter, referred to as a shield pattern) which has a function of blocking the propagation of the radio waves is a pattern in which fine wire conductors such as silver nanowires are arranged in a lattice pattern at intervals of 12 wavelengths or less of radio waves, for example. In this example, the thin line indicates a line width of 50 μm or less.

The shield pattern described above can be realized by use of a well-known meta surface structure. The meta surface structure is a structure in which artificial structures called unit cells (Unit Cell) are repeatedly arranged. According to the meta surface structure, only radio waves (in this example, radio waves) in a specific frequency band can be selectively reflected or attenuated (that is, blocked). The body of the vehicle Hv may be configured to block the propagation of the radio waves by coating a paint containing metal powder or carbon powder on the body made of the general-purpose resin. Further, a film for blocking the propagation of the radio waves (hereinafter, referred to as a shield film) may be attached to the body. A vehicle having the body described above is also suitable as an application object of the position determination system for a vehicle. Part or all of the body of the vehicle Hv may be made of a general-purpose resin.

The units and/or functions provided by the authentication ECU 1011 may be provided by software stored in a tangible memory device and a computer executing the software, only software, only hardware, or a combination of the software and the hardware. For example, if the authentication ECU 1011 is provided by a hardware-based electronic circuit, the authentication ECU 1011 may be provided by a digital circuit or an analog circuit that includes a number of logic circuits. The authentication ECU 1011 may also be provided by a single computer or a set of computer resources linked by a data communication device.

A flowchart or a process of the flowchart described in the present disclosure includes multiple parts (or steps), and each part is expressed, for example, as S1101. Furthermore, each part may be divided into multiple sub-parts, while the multiple parts may be combined into one part. In addition, each unit configured in this manner may be referred to as a circuit, a device, a module, or a means.

Each or the combination of the above multiple parts can be realized with or without the inclusion of the functions of an associated device as not only (i) a part of software combined with a hardware unit (for example, a computer), but also (ii) a part of hardware (for example, integrated circuit, wired logic circuit). Further, the hardware part can be configured inside the microcomputer.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A position determination system for determining a position of a mobile terminal, comprising:
    a vehicle interior receiver configured to receive a radio signal transmitted from the mobile terminal using a radio wave in a predetermined frequency band through a vehicle interior antenna installed in a vehicle compartment of a vehicle;
    a vehicle interior strength detector configured to detect a reception strength of the radio signal received by the vehicle interior receiver as a vehicle interior strength;
    a vehicle exterior antenna configured to receive the radio signal arriving from a vehicle exterior;
    a vehicle exterior receiver configured to receive the radio signal transmitted from the mobile terminal through the vehicle exterior antenna;
    a vehicle exterior strength detector configured to detect a reception strength of the radio signal received by the vehicle exterior receiver as a vehicle exterior strength; and
    a position determination unit configured to determine whether the mobile terminal is present outside the vehicle compartment based on the vehicle interior strength detected by the vehicle interior strength detector and the vehicle exterior strength detected by the vehicle exterior strength detector, wherein
    the vehicle exterior antenna is disposed in a predetermined region in a vicinity of a window of the vehicle in an outer surface portion of the vehicle,
    a frequency of the radio signal is 1 GHz or more, and the predetermined region is set to a region in which the distance from the window is 1 time or less of the wavelength of the radio wave.

2. The position determination system according to claim 1, wherein
the vehicle exterior antenna is configured to be disposed in a pillar of the vehicle in a posture receiving the radio signal from the mobile terminal which is present outside the vehicle compartment.

3. The position determination system according to claim 1, wherein
the vehicle exterior antenna is configured to be disposed at a position where a distance from an upper end of the window falls within a predetermined distance in the vicinity of the window in a posture receiving the radio signal from the mobile terminal which is present outside the vehicle compartment.

4. The position determination system according to claim 1, wherein
the vehicle interior antenna is configured to be disposed at a position lower than a lower end of the window.

5. The position determination system according to claim 1, wherein
the vehicle exterior antenna is configured to be attached to a surface outside the vehicle compartment of a portion where a metal member is disposed on the vehicle, in the predetermined region being regarded as the vicinity of the window on a side surface of the vehicle.

6. The position determination system according to claim 1, wherein
the vehicle exterior antenna is an antenna having directivity, and is configured to be disposed in such a posture that a center of the directivity is directed to the vehicle exterior.

7. The position determination system according to claim 1, wherein
the position determination unit is configured to determine that the mobile terminal is present outside the vehicle compartment when the vehicle exterior strength detected by the vehicle exterior strength detector is higher than the vehicle interior strength detected by the vehicle interior strength detector.

8. The position determination system according to claim 1, further comprising
a vehicle control unit that performs at least one of unlocking of a door of the vehicle, locking of the door, and starting of a driving source of the vehicle based on a determination result of the position determination unit.

9. The position determination system according to claim 1, wherein
the vehicle exterior antenna is disposed within 5 cm from the window of the vehicle.

10. The position determination system according to claim 1, wherein
the radio signal communicated between (i) the mobile terminal and (ii) the vehicle interior antenna and the vehicle exterior antenna is based on Bluetooth.

11. A position determination system for determining a position of a mobile terminal by performing a wireless communication with the mobile terminal, the position determination system comprising:
a vehicle interior communication device configured to be installed in a vehicle compartment of a vehicle, receive a radio signal transmitted from the mobile terminal, and detect a reception strength of the received radio signal;
a vehicle exterior communication device configured to be installed on an outer surface of the vehicle, receive the radio signal transmitted from the mobile terminal, and detect a reception strength of the received radio signal; and
a position determination unit configured to determine a position of the mobile terminal based on at least one of an interior unit strength that is the reception strength detected by the vehicle interior communication device, and an exterior unit strength that is the reception strength detected by the vehicle exterior communication device, wherein
the position determination unit is configured to determine that the mobile terminal is present in the vehicle compartment based on a condition that the interior unit strength is equal to more than a predetermined interior equivalent value for determining that the mobile terminal is present in the vehicle compartment, and the exterior unit strength is less than a predetermined exterior equivalent value for determining that the mobile terminal is present outside the vehicle compartment.

12. The position determination system according to claim 11, wherein
the vehicle exterior communication device is configured to be disposed to cover a leakage region, which is a region in which the interior unit strength is equal to or more than the interior equivalent value in the outside of the vehicle compartment, with a strong electric field area in which the exterior unit strength is equal to or more than a predetermined level.

13. The position determination system according to claim 11, wherein
the position determination unit is configured to determine that the mobile terminal is present outside the vehicle compartment when the interior unit strength is less than the interior equivalent value and when the exterior unit strength is equal to or more than the exterior equivalent value.

14. The position determination system according to claim 11, wherein
the vehicle interior communication device is one of a plurality of vehicle interior communication devices,
each of the plurality of vehicle interior communication devices is configured to be disposed to bring a different region in the vehicle interior into a strong electric field area, and
the position determination unit is configured to calculate an interior unit strength representative value, which is a representative value of the reception strength of the radio signal in the vehicle interior, based on the interior unit strength acquired by each of the plurality of vehicle interior communication devices, and determine the position of the mobile terminal by using the interior unit strength representative value instead of the interior unit strength.

15. The position determination system according to claim 14, wherein
the plurality of vehicle interior communication devices are configured to be disposed apart from each other by a distance corresponding to one or more of a wavelength of the radio signal used for the wireless communication with the mobile terminal.

16. The position determination system according to claim 14, wherein
the plurality of vehicle interior communication devices are disposed in such a manner that centers of directivity of the plurality of vehicle interior communication devices are oriented in different directions.

17. The position determination system according to claim 14, wherein
the position determination unit is configured to calculate the interior unit strength representative value by using a value obtained by adding a correction amount corresponding to a reception sensitivity of the vehicle interior communication device to the interior unit strength acquired by the vehicle interior communication device.

18. The position determination system according to claim 14, wherein
the plurality of vehicle interior communication devices include the vehicle interior communication device configured to transmit and receive a linearly polarized wave whose vibration direction of an electric field is a predetermined first direction, and the vehicle interior communication device configured to transmit and receive a linearly polarized wave whose vibration direction of the electric field is a second direction different from the first direction by 45 degrees or more.

19. The position determination system according to claim 14, wherein
at least one of the plurality of vehicle interior communication devices is disposed in each area separated by a backrest portion of a seat.

20. The position determination system according to claim 11, wherein
the vehicle interior communication device is configured to cause a center direction of directivity of the vehicle interior communication device to sequentially change, and
the position determination unit is configured to calculate an individual strength representative value representative of the interior unit strength acquired by the vehicle interior communication device within a last predetermined time by using a plurality of reception strengths acquired while the center direction of directivity of the vehicle interior communication device changes, and is configured to determine the position of the mobile terminal by using the individual strength representative value as the interior unit strength.

21. The position determination system according to claim 11, wherein
the vehicle exterior communication device is one of a plurality of vehicle exterior communication devices,
each of the plurality of vehicle exterior communication devices is configured to be disposed to bring a different region in the vehicle exterior into a strong electric field area, and
the position determination unit is configured to calculate an exterior unit strength representative value, which is a representative value of the reception strength of the radio signal in the vehicle exterior, based on the exterior unit strength acquired by each of the plurality of vehicle exterior communication devices, and determine the position of the mobile terminal by using the exterior unit strength representative value instead of the exterior unit strength.

22. The position determination system according to claim 21, wherein
the vehicle exterior communication device is configured to be disposed in a region in a vicinity of a window, which falls within a predetermined distance from a frame portion of the window, on the outer surface.

23. The position determination system according to claim 21, wherein
the vehicle exterior communication device is configured to be disposed to bring a vicinity of the window outside the vehicle compartment into the strong electric field area.

24. The position determination system according to claim 21, wherein
the position determination unit is configured to calculate the exterior unit strength representative value by using a value obtained by adding a correction amount corresponding to a reception sensitivity of the vehicle exterior communication device to the exterior unit strength acquired by the vehicle exterior communication device.

25. The position determination system according to claim 21, wherein
a locking and unlocking threshold for determining whether the mobile terminal is present in a locking and unlocking area, which is an area for executing a process of controlling a locked-unlocked state of a door provided in the vehicle, is set in advance as a threshold different from the interior equivalent value and the exterior equivalent value, and
the position determination unit is configured to determine that the mobile terminal is present in the locking and unlocking area based on a condition that the reception strength or the exterior unit strength representative value in a predetermined one of the vehicle exterior communication device is equal to or more than the locking and unlocking threshold.

26. The position determination system according to claim 11, wherein
the interior equivalent value is set to a value corresponding to a minimum value of the interior unit strength being observed when the mobile terminal is present in the vehicle compartment.

27. The position determination system according to claim 11, wherein
the exterior equivalent value is set to a value corresponding to a maximum value of the exterior unit strength being observed when the mobile terminal is present in the vehicle compartment.

* * * * *